United States Patent
Hoss et al.

(10) Patent No.: US 11,259,899 B2
(45) Date of Patent: Mar. 1, 2022

(54) ORTHODONTIC DEVICE

(71) Applicant: AADvance Technologies, LLC, San Diego, CA (US)

(72) Inventors: Kami Hoss, San Diego, CA (US); Steven Howard, La Jolla, CA (US); Jacob Moebius, Solana Beach, CA (US)

(73) Assignee: AADvance Technologies, LLC, San Diego, CA (US)

( * ) Notice: Subject to any disclaimer, the term of this patent is extended or adjusted under 35 U.S.C. 154(b) by 0 days.

(21) Appl. No.: 17/065,281

(22) Filed: Oct. 7, 2020

(65) Prior Publication Data
US 2022/0000586 A1    Jan. 6, 2022

Related U.S. Application Data

(60) Provisional application No. 63/047,979, filed on Jul. 3, 2020.

(51) Int. Cl.
*A61C 7/28* (2006.01)

(52) U.S. Cl.
CPC .................................. *A61C 7/287* (2013.01)

(58) Field of Classification Search
CPC ................................ A61C 7/141; A61C 7/287
See application file for complete search history.

(56) References Cited

U.S. PATENT DOCUMENTS

| | | | |
|---|---|---|---|
| 3,975,823 A | 8/1976 | Sosnay | |
| 5,017,133 A | 5/1991 | Miura | |
| 5,044,947 A | 9/1991 | Sachdeva et al. | |
| 5,080,584 A | 1/1992 | Karabin | |
| 5,344,315 A | 9/1994 | Hanson | |
| 6,071,118 A | 6/2000 | Damon | |
| 6,071,119 A * | 6/2000 | Christoff | A61C 7/285 433/13 |
| 6,132,209 A | 10/2000 | Devanathan | |
| 6,139,317 A | 10/2000 | Goldschmied | |
| 6,258,182 B1 | 7/2001 | Schetky et al. | |
| 6,506,049 B2 * | 1/2003 | Hanson | A61C 7/282 433/11 |
| 6,648,640 B2 | 11/2003 | Rubbert et al. | |
| 6,963,788 B2 | 11/2005 | Abels et al. | |
| 7,063,531 B2 | 6/2006 | Maijer et al. | |

(Continued)

OTHER PUBLICATIONS

Pacheco, M. et al., "Evaluation of friction in self-ligating brackets subjected to sliding mechanics: an in vitro study," Dental Press J Orthod, Jan.-Feb. 2011, vol. 16, No. 1, pp. 107-115.

(Continued)

*Primary Examiner* — Ralph A Lewis

(74) *Attorney, Agent, or Firm* — Knobbe, Martens, Olson & Bear LLP

(57) ABSTRACT

An orthodontic device can include a bracket configured to support an orthodontic wire. The orthodontic device can include a locking assembly coupled to the bracket and switchable between a plurality of operational modes. The plurality of operational modes can comprise a first sliding mode in which the orthodontic wire is slidable relative to the bracket and a second locked mode in which the orthodontic wire is slidably locked relative to the bracket.

30 Claims, 43 Drawing Sheets

(56) References Cited

U.S. PATENT DOCUMENTS

| | | | |
|---|---|---|---|
| 7,104,791 B2 | 9/2006 | Hanson | |
| 7,186,115 B2 | 3/2007 | Goldberg et al. | |
| 7,210,927 B2 | 5/2007 | Abels et al. | |
| 7,283,891 B2 | 10/2007 | Butscher et al. | |
| 7,335,021 B2 | 2/2008 | Nikodem | |
| 7,621,743 B2 | 11/2009 | Bathen et al. | |
| 7,661,281 B2 | 2/2010 | Rubbert et al. | |
| 7,686,613 B2 | 3/2010 | Pospisil et al. | |
| 7,845,941 B2 | 12/2010 | Minium | |
| 7,857,618 B2 * | 12/2010 | Abels | A61C 7/12 433/11 |
| 8,162,660 B2 | 4/2012 | Rudman | |
| 8,220,195 B2 | 7/2012 | Maijer et al. | |
| 8,246,348 B2 | 8/2012 | Heiser | |
| 8,251,696 B2 | 8/2012 | Rodriguez et al. | |
| 8,376,739 B2 | 2/2013 | Dupray et al. | |
| 8,382,917 B2 | 2/2013 | Johnson | |
| 8,500,445 B2 | 8/2013 | Borri | |
| 8,550,814 B1 | 10/2013 | Collins | |
| 8,568,139 B2 * | 10/2013 | Roncone | A61C 7/30 433/11 |
| 8,678,818 B2 | 3/2014 | Dupray et al. | |
| 8,685,184 B2 | 4/2014 | Johnson et al. | |
| 8,708,698 B2 | 4/2014 | Antignano | |
| 8,714,973 B2 | 5/2014 | Zucchi et al. | |
| 8,920,165 B2 | 12/2014 | Wang et al. | |
| 8,961,172 B2 | 2/2015 | Dupray et al. | |
| 8,979,528 B2 | 3/2015 | Macchi et al. | |
| 9,022,781 B2 | 5/2015 | Kuo et al. | |
| 9,089,386 B2 | 7/2015 | Hagelganz et al. | |
| 9,127,338 B2 | 9/2015 | Johnson | |
| 9,198,740 B2 | 12/2015 | Damon et al. | |
| 9,226,803 B2 * | 1/2016 | Cosse | A61C 7/28 |
| 9,241,775 B2 | 1/2016 | Romano et al. | |
| RE45,904 E | 3/2016 | Rudman | |
| 9,328,406 B2 | 5/2016 | Johnson et al. | |
| 9,345,558 B2 | 5/2016 | Oda et al. | |
| 9,358,081 B2 | 6/2016 | Chen | |
| 9,427,291 B2 | 8/2016 | Khoshnevis et al. | |
| 9,468,505 B2 | 10/2016 | Sommer et al. | |
| 9,480,541 B2 * | 11/2016 | Falcone | A61C 7/287 |
| 9,492,246 B2 * | 11/2016 | Lin | A61C 7/287 |
| 9,492,247 B2 | 11/2016 | Ruiz-Vela et al. | |
| 9,532,853 B2 * | 1/2017 | Huang | A61C 7/30 |
| 9,554,875 B2 | 1/2017 | Gualano | |
| 9,572,971 B2 | 2/2017 | Su | |
| 9,603,677 B2 | 3/2017 | Lopes | |
| 9,615,899 B2 | 4/2017 | Lopes | |
| 9,839,495 B2 | 12/2017 | Forster | |
| 2003/0049582 A1 | 3/2003 | Abels et al. | |
| 2004/0131989 A1 | 7/2004 | Dellinger | |
| 2006/0008761 A1 | 1/2006 | Allred | |
| 2006/0199137 A1 | 9/2006 | Abels et al. | |
| 2006/0246392 A1 | 11/2006 | Vigolo | |
| 2007/0072143 A1 | 3/2007 | Sommer | |
| 2007/0082315 A1 | 4/2007 | Sabater | |
| 2007/0134612 A1 | 6/2007 | Contencin | |
| 2008/0063995 A1 | 3/2008 | Farzin-Nia et al. | |
| 2009/0325118 A1 | 12/2009 | Lewis et al. | |
| 2010/0062387 A1 | 3/2010 | Hilliard | |
| 2010/0112508 A1 | 5/2010 | Lopes | |
| 2010/0129765 A1 | 5/2010 | Mohr et al. | |
| 2010/0151403 A1 | 6/2010 | Tuneberg et al. | |
| 2010/0193979 A1 | 8/2010 | Goldberg et al. | |
| 2010/0203463 A1 | 8/2010 | Huff et al. | |
| 2010/0261131 A1 | 10/2010 | Ruiz-Vela et al. | |
| 2010/0285420 A1 | 11/2010 | Oda | |
| 2011/0195371 A1 | 8/2011 | Hirsch | |
| 2011/0212407 A1 | 9/2011 | Hilliard | |
| 2011/0269093 A1 | 11/2011 | Waugh, Jr. | |
| 2011/0287378 A1 | 11/2011 | Dupray et al. | |
| 2012/0129119 A1 | 5/2012 | Oda | |
| 2012/0129120 A1 | 5/2012 | Foerster | |
| 2012/0231409 A1 | 9/2012 | Farzin-Nia et al. | |
| 2013/0045455 A1 | 2/2013 | Farzin-Nia | |
| 2013/0157215 A1 | 6/2013 | Xu | |
| 2013/0236847 A1 | 9/2013 | Shin | |
| 2013/0266907 A1 | 10/2013 | Lopes | |
| 2013/0309624 A1 | 11/2013 | Smith et al. | |
| 2013/0309626 A1 | 11/2013 | Arunachalam Perumal Athithan et al. | |
| 2014/0038120 A1 | 2/2014 | Lin et al. | |
| 2014/0120491 A1 | 5/2014 | Khoshnevis et al. | |
| 2014/0134562 A1 | 5/2014 | Wu et al. | |
| 2014/0205962 A1 | 7/2014 | Damon et al. | |
| 2014/0212828 A1 | 7/2014 | Falcone et al. | |
| 2014/0272750 A1 | 9/2014 | Lai | |
| 2014/0272752 A1 | 9/2014 | Huang | |
| 2014/0272753 A1 | 9/2014 | Sommer et al. | |
| 2014/0272754 A1 | 9/2014 | Curley | |
| 2014/0295369 A1 | 10/2014 | Nobrega | |
| 2014/0370454 A1 | 12/2014 | Rudman | |
| 2014/0370455 A1 | 12/2014 | Allesee | |
| 2015/0072299 A1 | 3/2015 | Alauddin et al. | |
| 2015/0157422 A1 | 6/2015 | Cosse et al. | |
| 2015/0173858 A1 | 6/2015 | Duprey et al. | |
| 2015/0173860 A1 | 6/2015 | Oda | |
| 2015/0182304 A1 | 7/2015 | Gualano | |
| 2015/0182307 A1 | 7/2015 | Yick | |
| 2015/0190213 A1 | 7/2015 | Wang | |
| 2015/0230887 A1 | 8/2015 | Damon et al. | |
| 2015/0238281 A1 | 8/2015 | Alauddin et al. | |
| 2015/0238282 A1 | 8/2015 | Kuo et al. | |
| 2015/0265377 A1 | 9/2015 | Wu et al. | |
| 2015/0374461 A1 | 12/2015 | Johnson | |
| 2016/0015482 A1 | 1/2016 | Hagelganz et al. | |
| 2016/0030138 A1 | 2/2016 | Miqui | |
| 2016/0030139 A1 | 2/2016 | Braun | |
| 2016/0045284 A1 | 2/2016 | Damon et al. | |
| 2016/0045285 A1 | 2/2016 | Damon et al. | |
| 2016/0045286 A1 | 2/2016 | Damon et al. | |
| 2016/0120623 A1 | 5/2016 | Curley | |
| 2016/0135929 A1 | 5/2016 | Sommer et al. | |
| 2016/0175072 A1 | 6/2016 | Andreiko et al. | |
| 2016/0184056 A1 | 6/2016 | Oda et al. | |
| 2016/0242873 A1 | 8/2016 | Johnson et al. | |
| 2016/0278883 A1 | 9/2016 | Fasci et al. | |
| 2016/0354181 A1 | 12/2016 | Sommer et al. | |
| 2016/0361141 A1 | 12/2016 | Tong et al. | |
| 2016/0361142 A1 | 12/2016 | Tong et al. | |
| 2016/0374781 A1 | 12/2016 | Sommer et al. | |
| 2017/0000588 A1 | 1/2017 | Alauddin et al. | |
| 2017/0014207 A1 | 1/2017 | Merly | |
| 2017/0014208 A1 | 1/2017 | Falcone et al. | |
| 2017/0027666 A1 | 2/2017 | Ruiz-Vela et al. | |
| 2017/0086949 A1 | 3/2017 | Huang | |
| 2018/0289451 A1 | 10/2018 | Hayashi | |
| 2019/0021819 A1 | 1/2019 | Sommer et al. | |

OTHER PUBLICATIONS

Ribeiro, G. et al., "Understanding the basis of space closure in Orthodontics for a more efficient orthodontic treatment," Dental Press J. Orthod., Mar.-Apr. 2016, vol. 21, No. 2, pp. 115-125.

PCT Invitation to Pay Additional Fees, dated Sep. 15, 2021 in International Appl. No. PCT/US2021/040296, 2 pages.

International Search Report and Written Opinion, dated Dec. 20, 2021 in International App. No. PCT/US2021/040296, 27 pages.

* cited by examiner

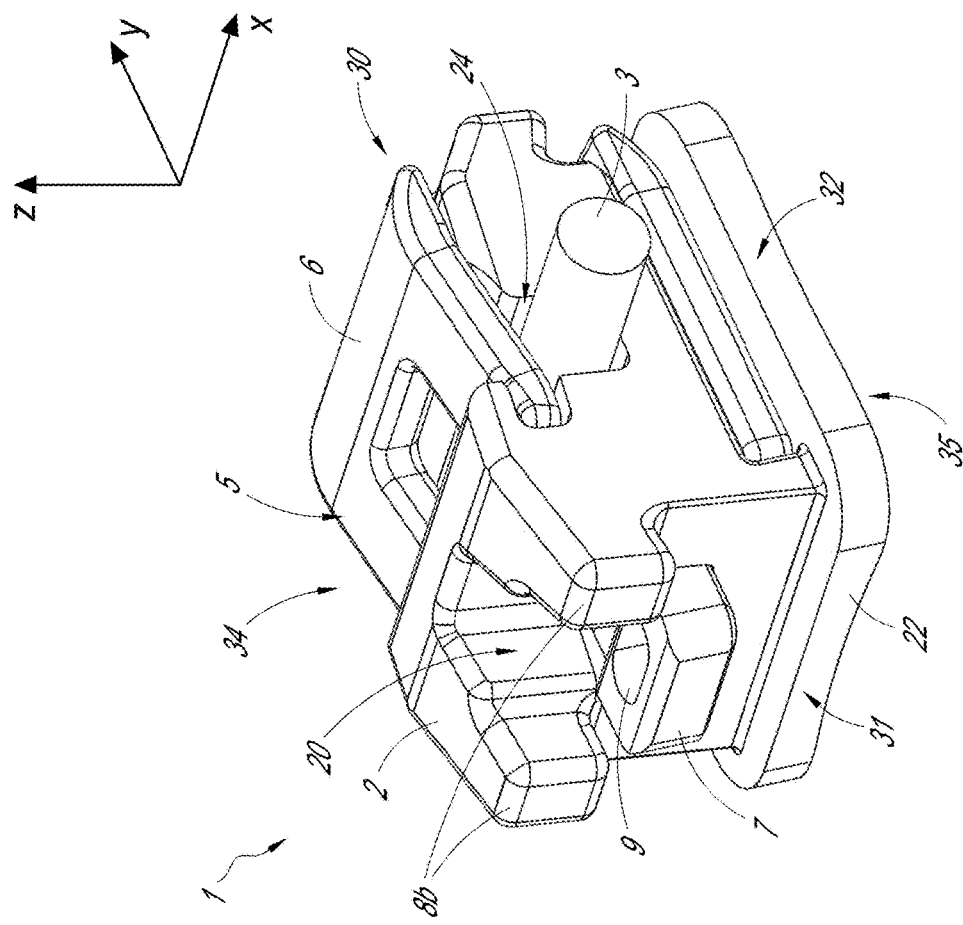
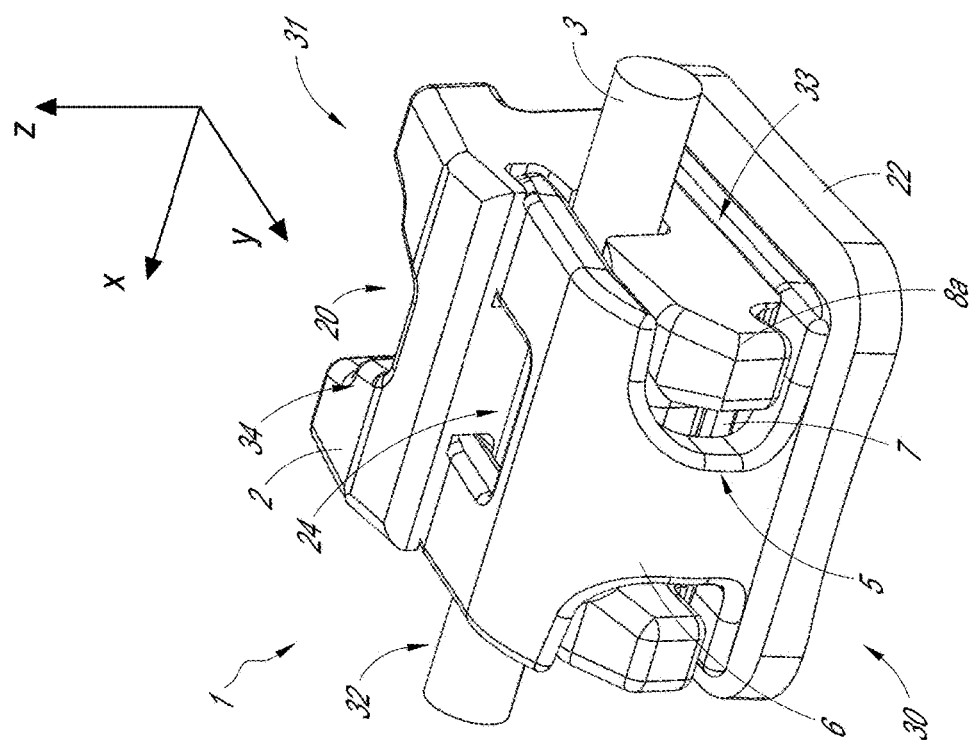
FIG. 2B
FIG. 2A

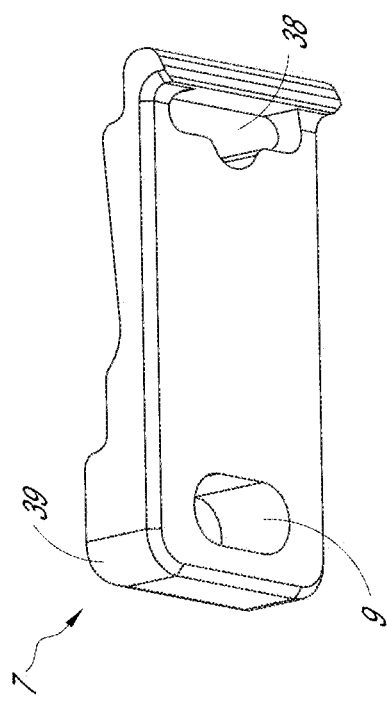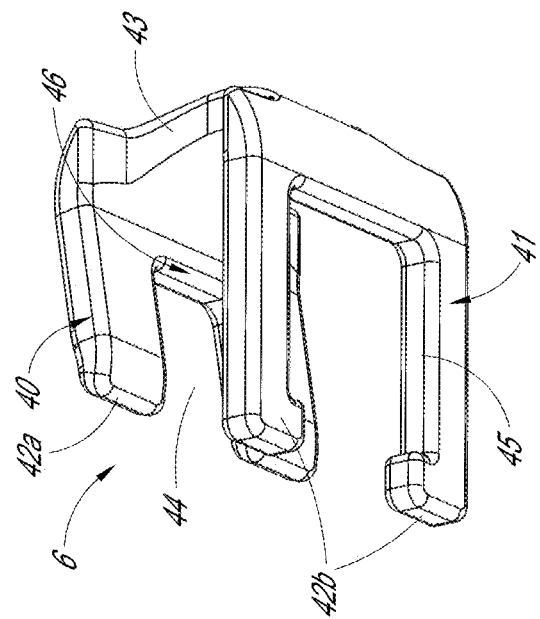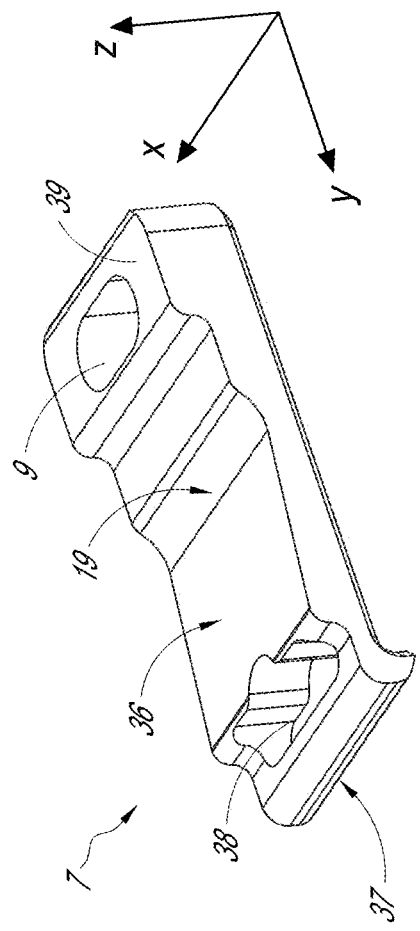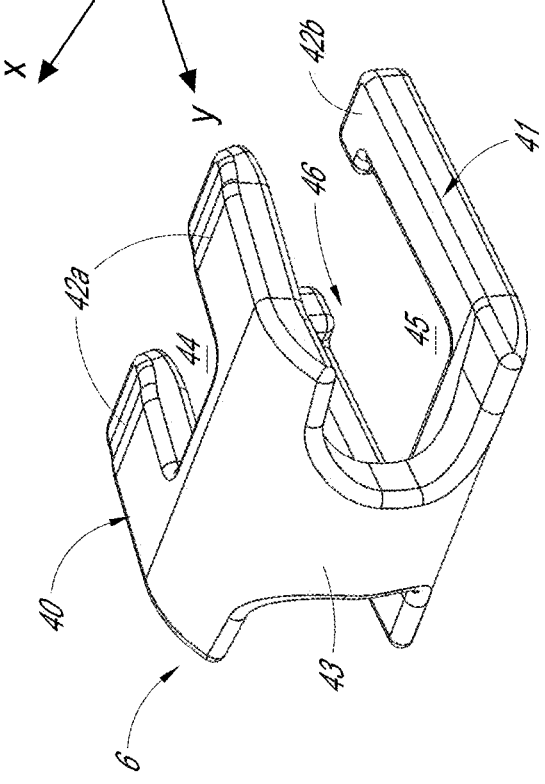

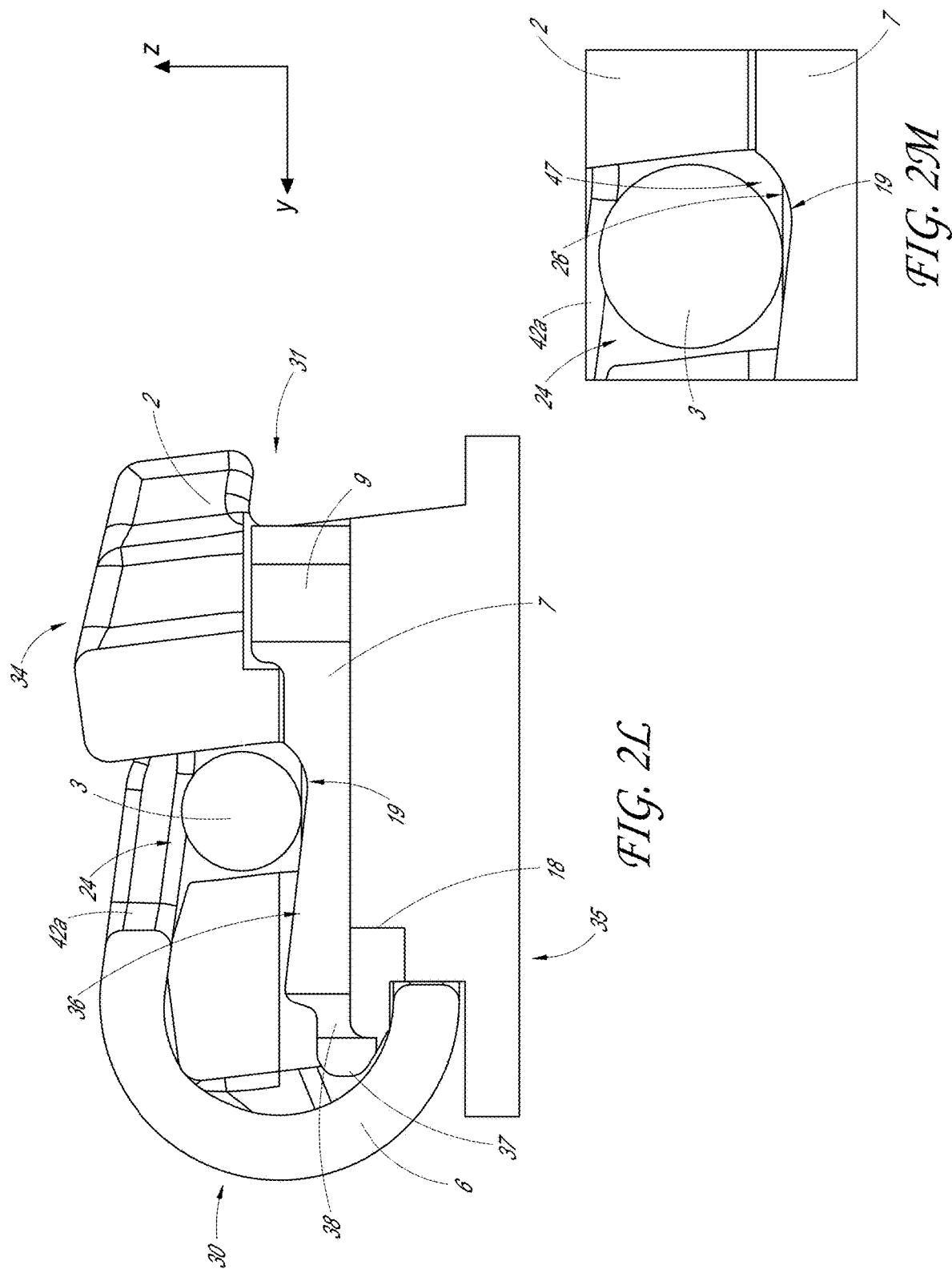

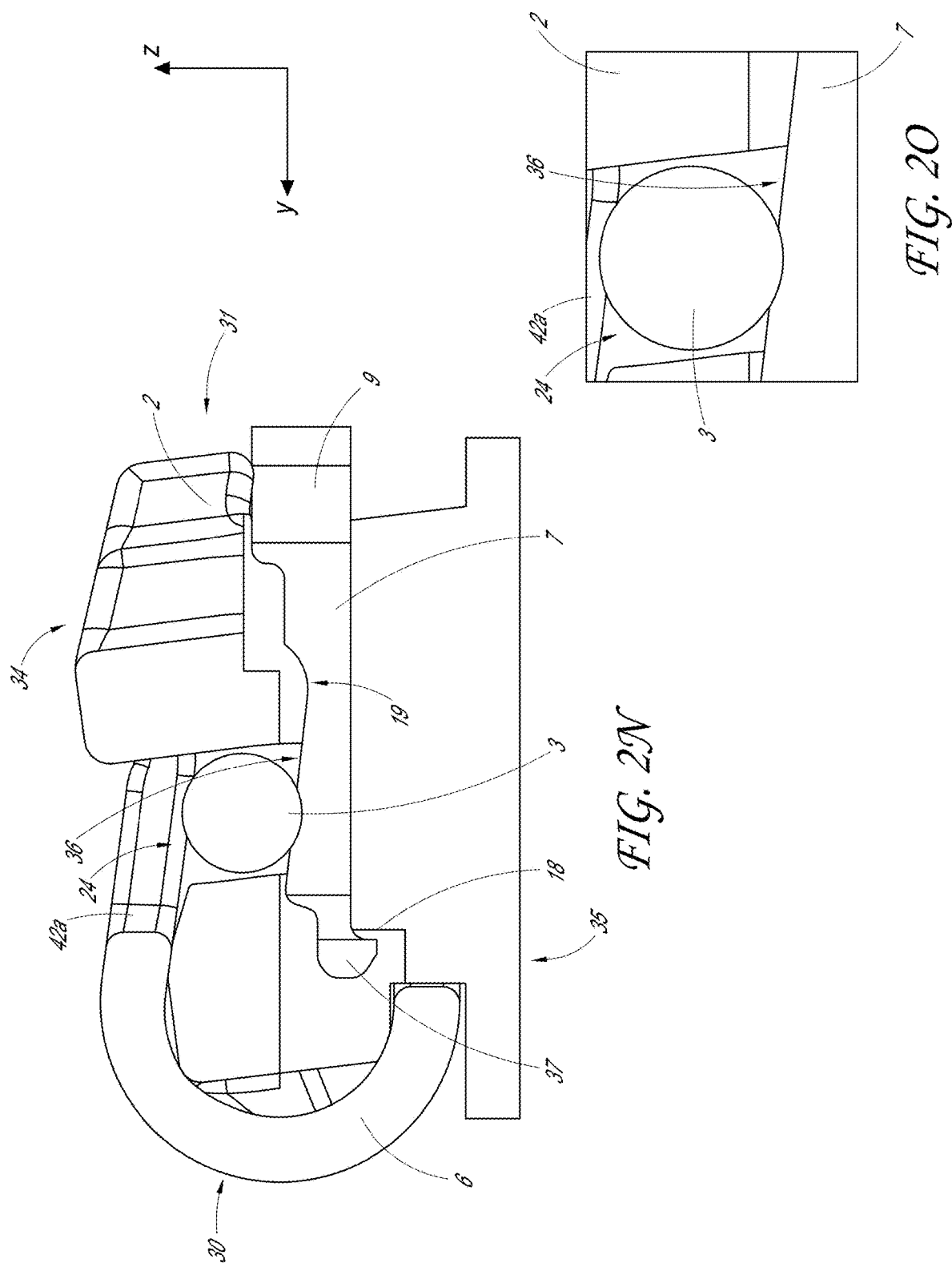

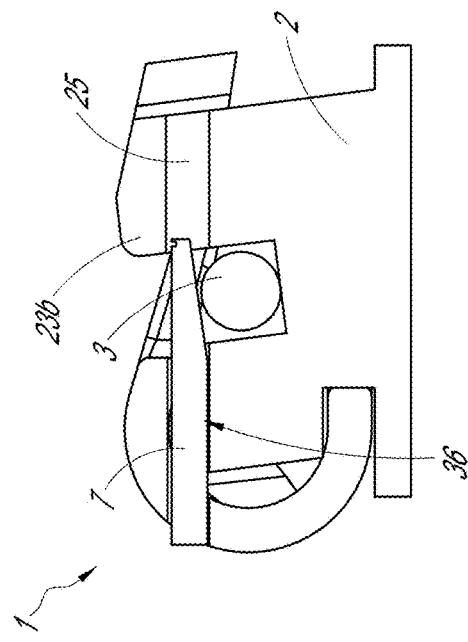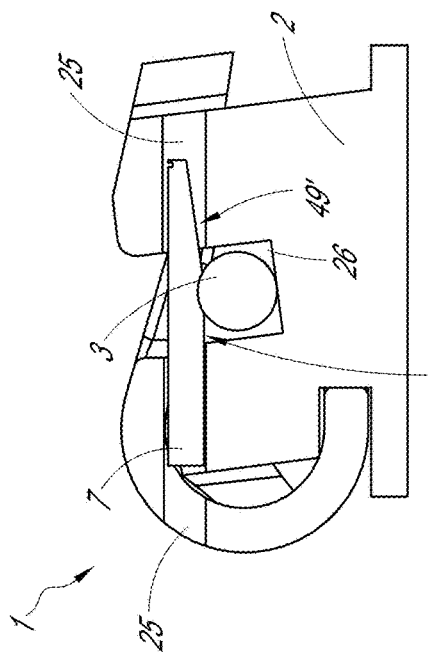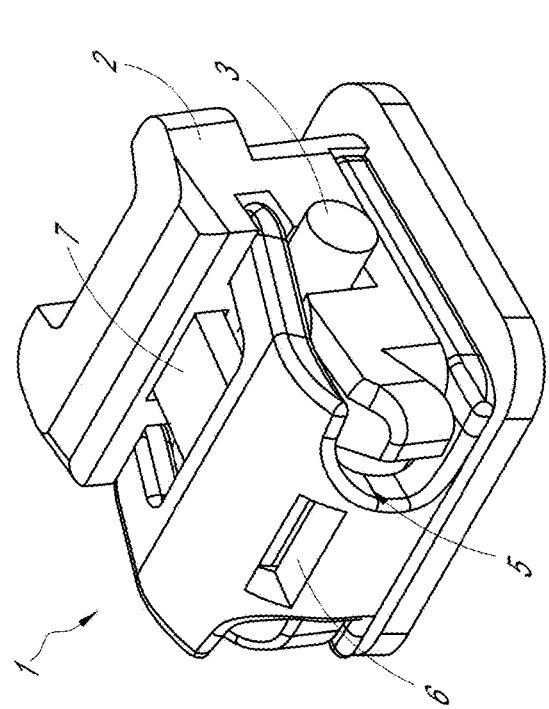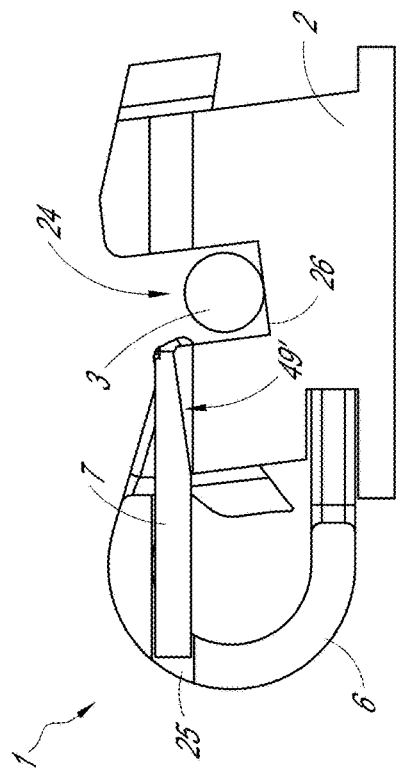

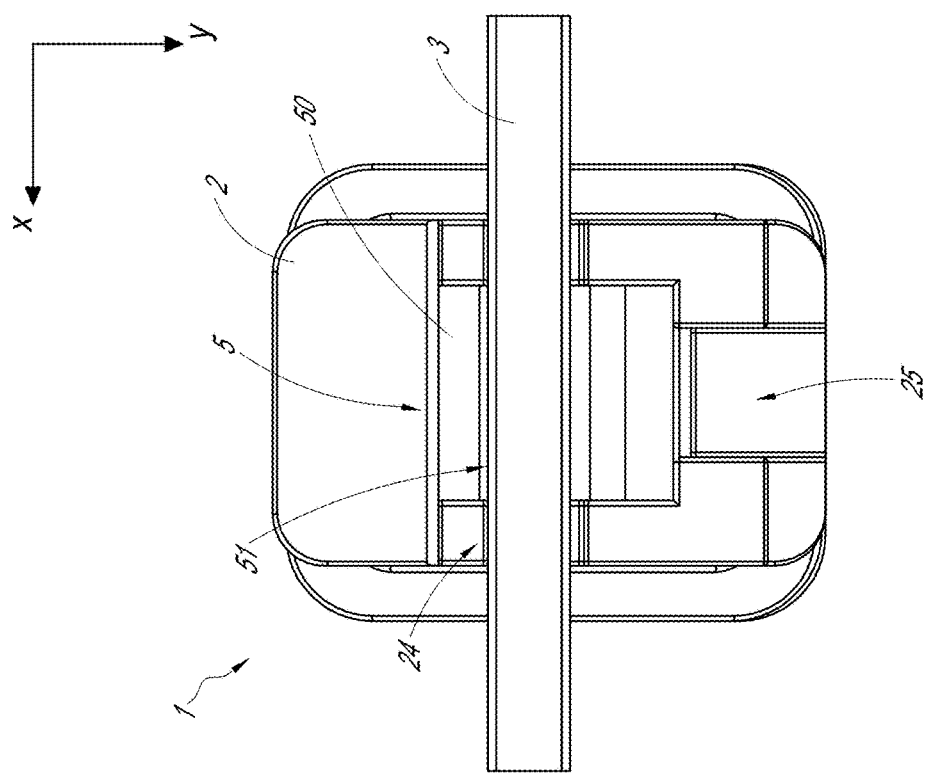
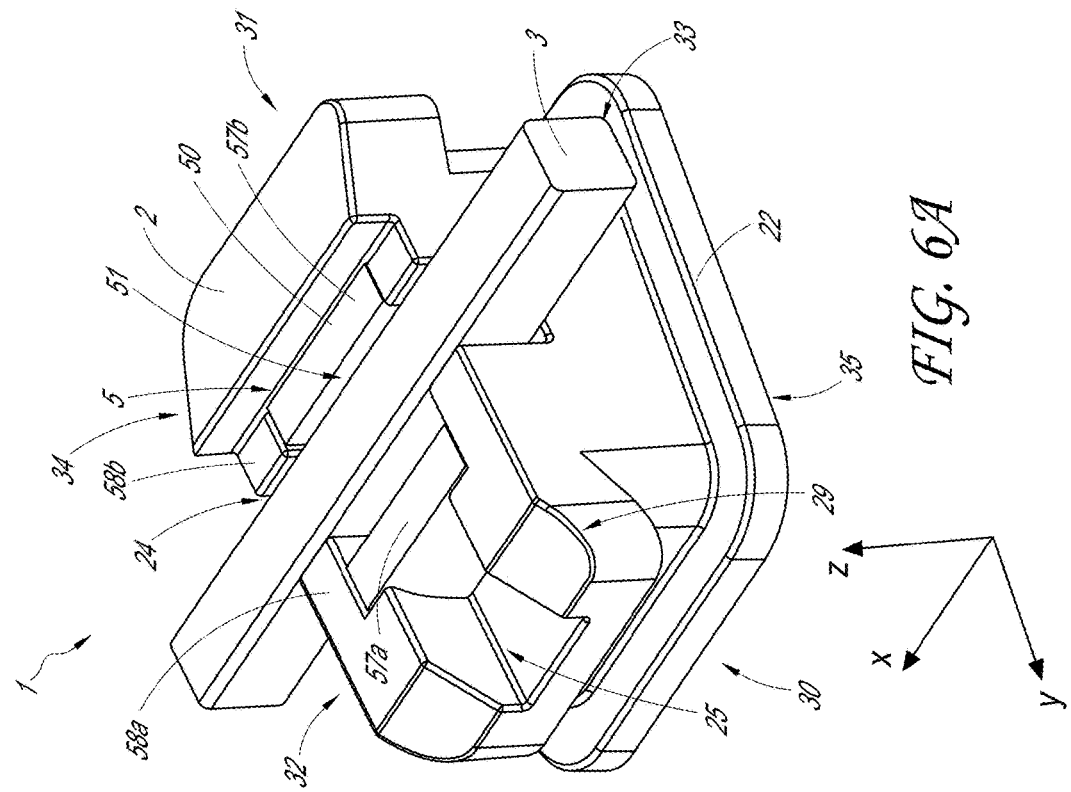
FIG. 6A
FIG. 6B

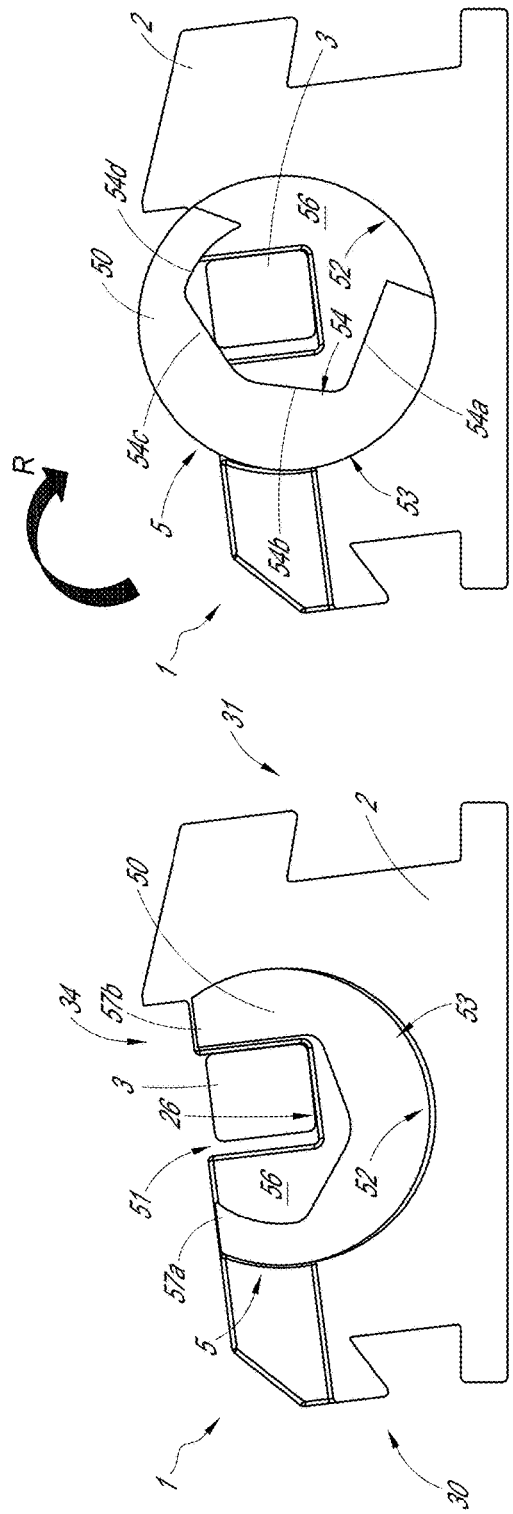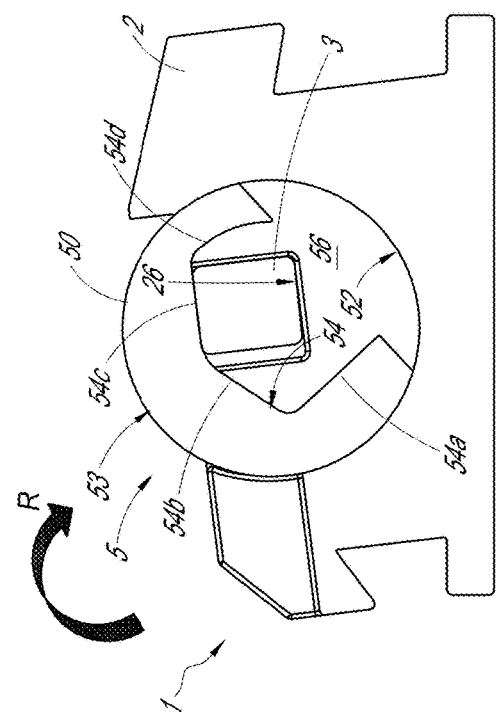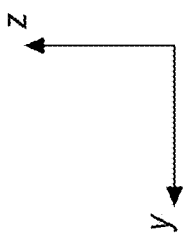

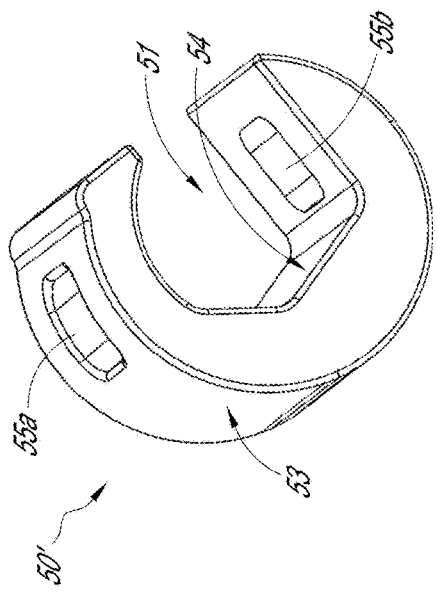
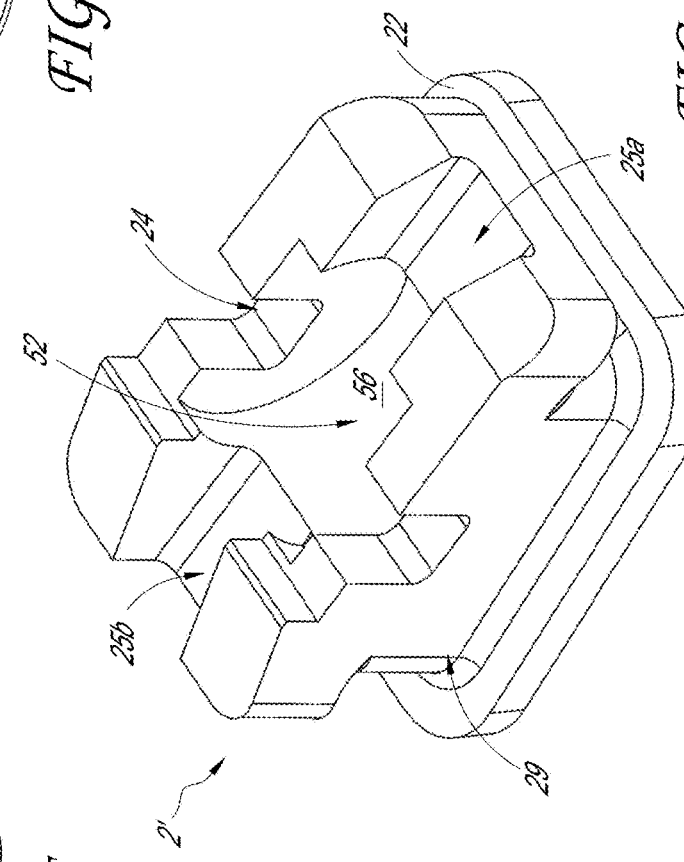
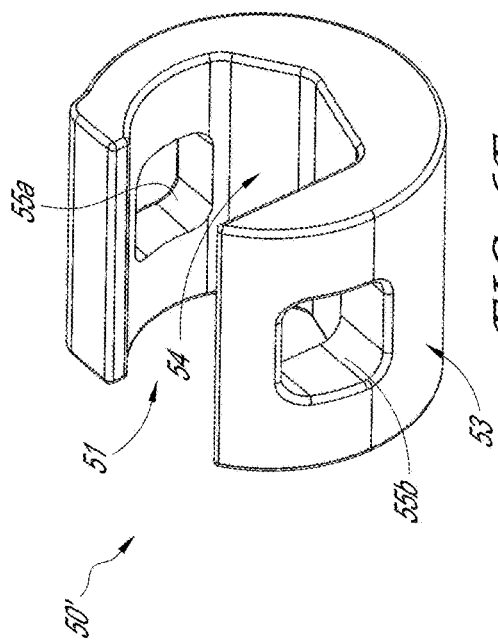

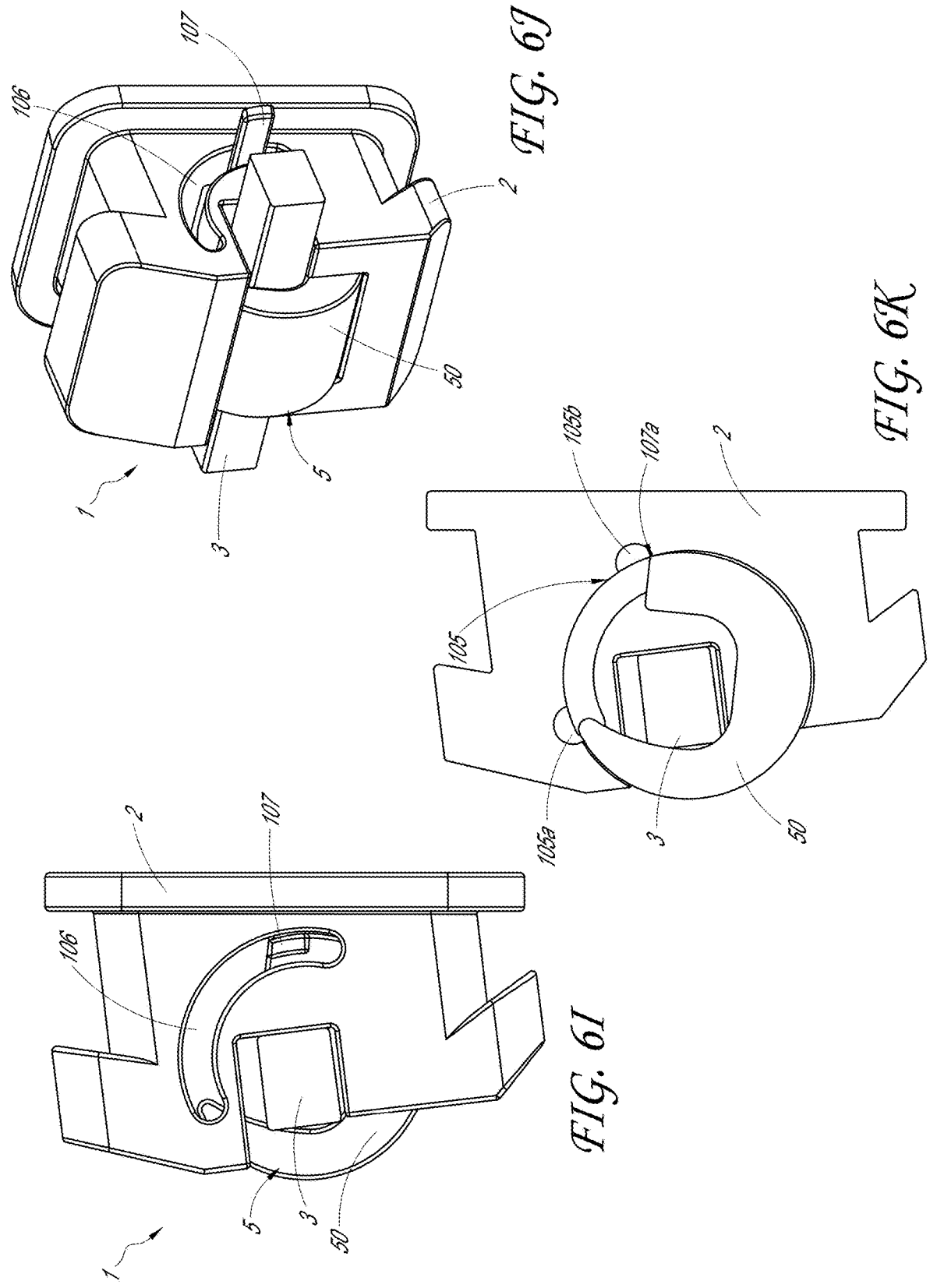

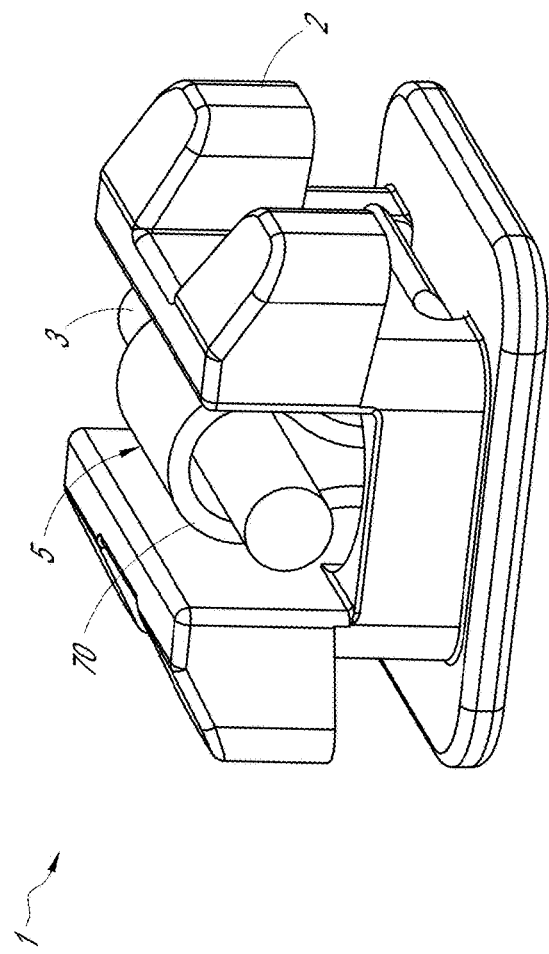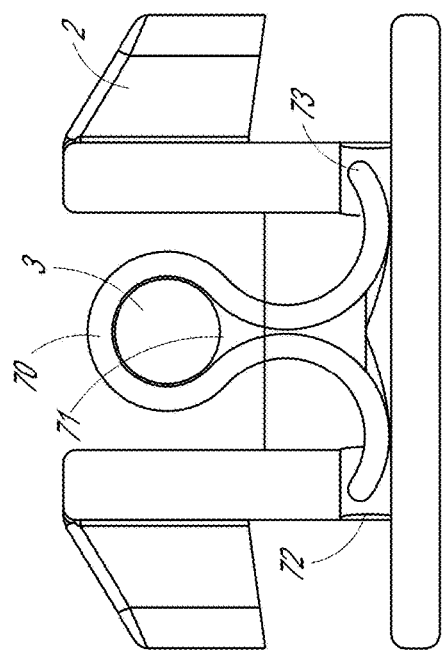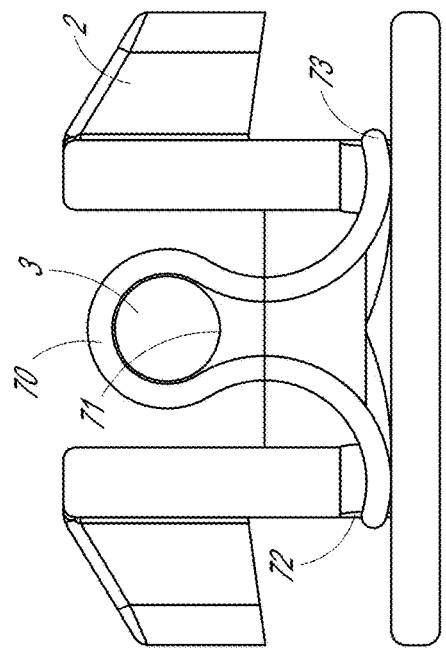

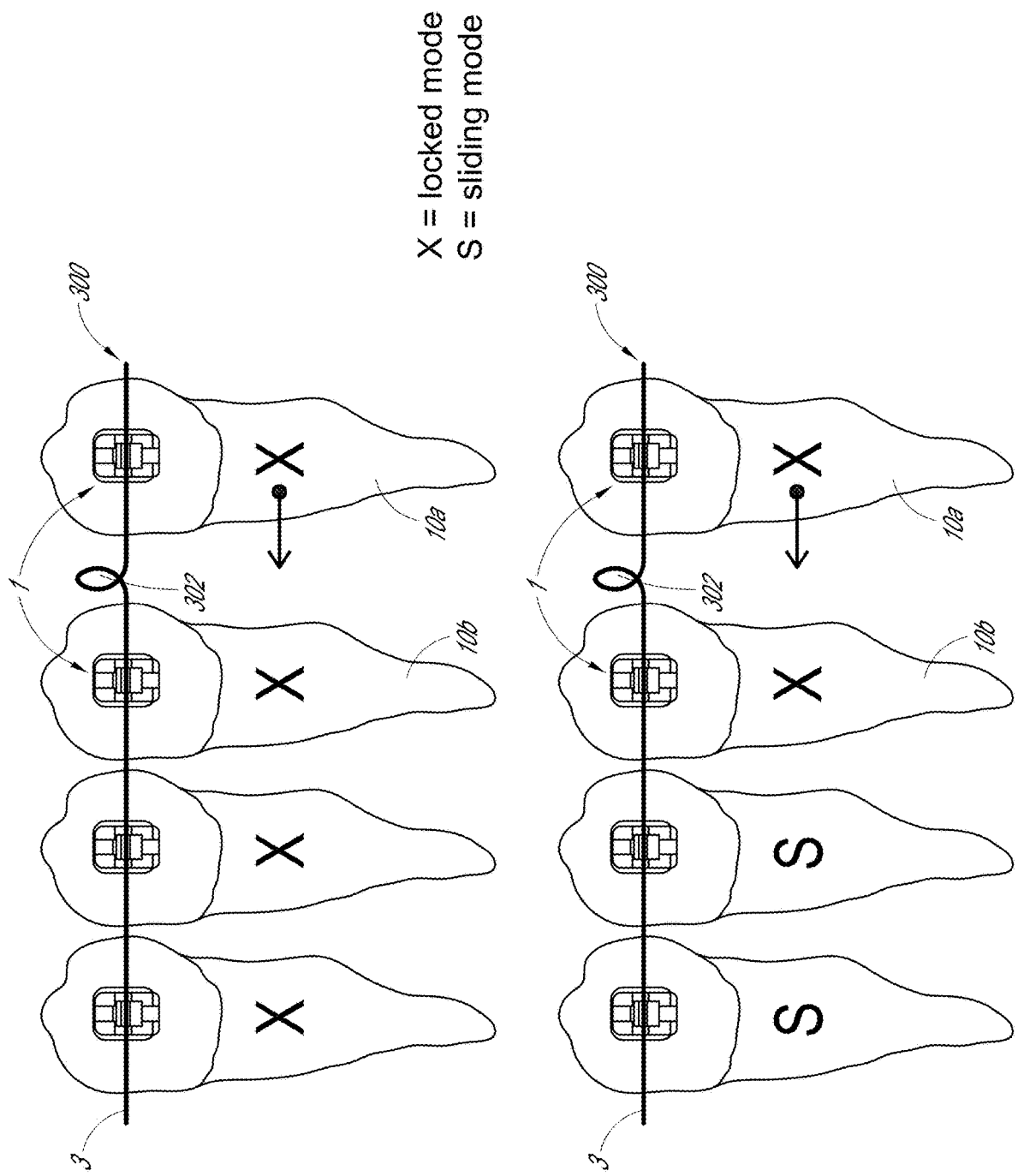

X = locked mode
S = sliding mode

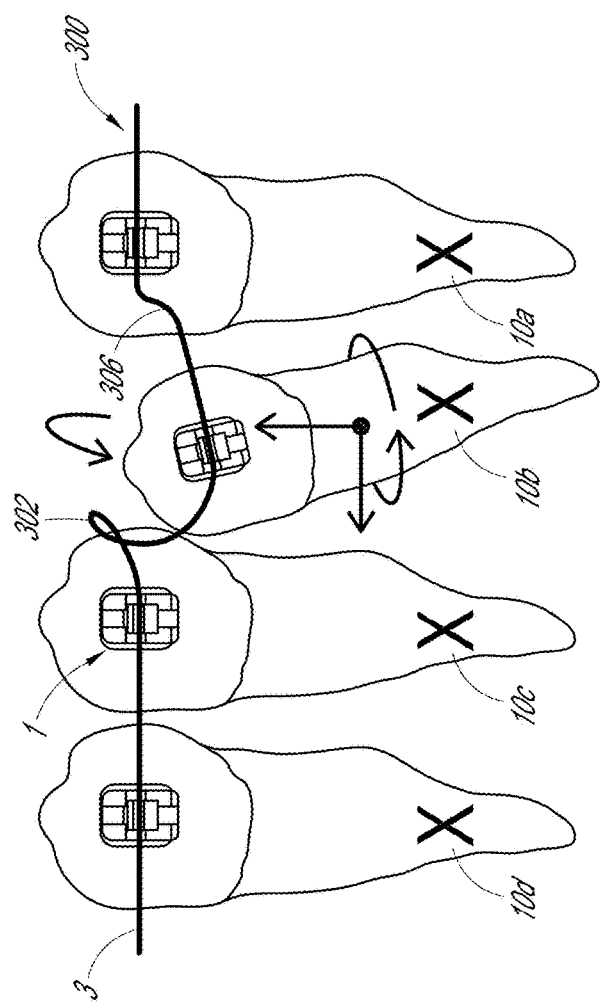
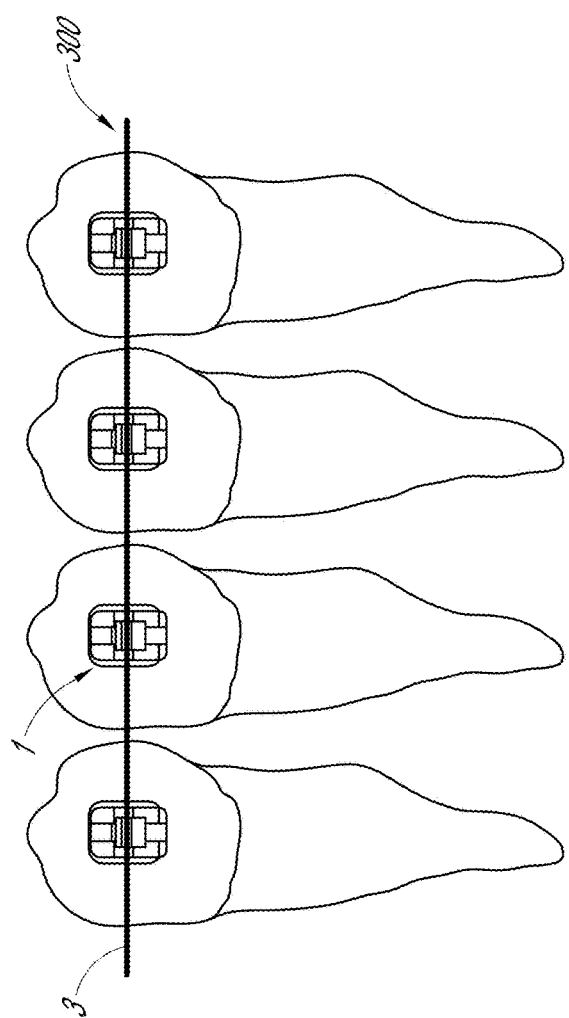
FIG. 29A
FIG. 29B

ORTHODONTIC DEVICE

CROSS-REFERENCE TO RELATED APPLICATIONS

This application claims priority to U.S. Provisional Patent Application No. 63/047,979, filed Jul. 3, 2020, the entire contents of which are incorporated by reference in their entirety and for all purposes.

BACKGROUND

Field

The field relates to an orthodontic device.

Description of the Related Art

Orthodontic braces devices are used to correct dental malocclusion, which can generally be described as an abnormal alignment of a patient's teeth and/or the manner in which the upper and lower teeth fit together. Dental malocclusion is a significant problem in dental public health because of its adverse effects on teeth, bone, muscles, and/or nerve tissue. In addition to preventing or reducing physical discomfort, infection, and/or injury to maxillofacial tissues, braces or other orthodontic devices are often used to improve a patient's dental aesthetics. In orthodontic braces devices, a bracket is attached to a tooth, and an orthodontic wire (e.g., an archwire) is inserted into a wire retention cavity of the bracket. In traditional devices, ligatures (for example, elastic bands or steel ligatures) are used secure the wire to the bracket. In self-ligating devices, a wire can be inserted into the bracket and secured mechanically without using ligatures. In both traditional and self-ligating devices, the wire slides laterally relative to the bracket.

Current traditional and self-ligating orthodontic devices are applied and adjusted over numerous treatment appointments with the clinician. Such devices may be used for many months or years and may be painful to the patient. Moreover, current orthodontic devices can create unpredictable, unsustained quality of outcomes, as well as poor aesthetics due to the visibility of the braces. In some cases, a clinician can make an adjustment to the braces to align one tooth, which can undesirably induce misalignments in other teeth. Accordingly, there remains a continuing need for improved orthodontic devices.

SUMMARY

In one embodiment, orthodontic device is disclosed. The orthodontic device can include a bracket configured to support an orthodontic wire. The orthodontic device can include a locking assembly to be coupled to the bracket and movable between a plurality of operational modes, the plurality of operational modes comprising a first sliding mode in which the orthodontic wire is slidable relative to the bracket and a second locked mode in which the orthodontic wire is slidably locked relative to the bracket.

In some embodiments, the locking assembly in the second locked mode can prevent sliding of the orthodontic wire when the orthodontic wire is subject to typical orthodontic forces. The locking assembly in the second locked mode can prevent sliding of the orthodontic wire during use of the orthodontic device. The locking assembly can be configured to apply a continuously variable frictional force to the wire. The locking assembly can be configured to apply the continuously variable frictional force to the wire to move between the first sliding mode and the second locked mode. The locking assembly can be configured to adjust a frictional force to the wire in a step-wise manner. The locking assembly can be configured to move between the first sliding mode and the second locked mode in a step-wise manner. The orthodontic device can comprise a third open mode in which the orthodontic wire is insertable into and removable from the bracket. The orthodontic device can comprise the orthodontic wire. The locking assembly can comprise a clip and a wedge member that cooperate to slidably lock the orthodontic wire in the second locked mode. The bracket can comprise a retention cavity sized and shaped to receive and support the orthodontic wire, the retention cavity extending along a lateral axis of the orthodontic device. The clip and wedge member can be movable along a transverse axis of the orthodontic device, the transverse axis non-parallel to the lateral axis. In the first sliding mode, the clip can be configured to be positioned over the orthodontic wire to retain the orthodontic wire in the retention cavity of the bracket. The wedge member in the first sliding mode can be disposed at a first position along the transverse axis, and the wedge member in the second locked mode can be disposed at a second position along the transverse axis that is different from the first position. In the second locked mode, a wedge surface of the wedge member can contact and exert a locking force against the orthodontic wire. In the second locked mode, the orthodontic wire can be vertically disposed between the clip and the wedge member, the wedge member and the clip cooperating to clamp the orthodontic wire. The orthodontic device can comprise a transverse cavity extending through the bracket transverse to the retention cavity, the wedge member disposed in the transverse cavity. The locking assembly can comprise a rotary member configured to rotate about a rotational direction to switch from the first sliding mode to the second locked mode. The rotary member can be disposed in an interior cavity of the bracket, the rotary member comprising an outer bearing surface that rotates relative to a curved follower surface of the bracket. The rotary member can be configured to rotate about a lateral axis parallel to the orthodontic wire. The rotary member can comprise an inner cam surface having a plurality of component surfaces that engage with the orthodontic wire to switch between the first sliding mode and the second locked mode. The plurality of component surfaces can be angled relative to one another and include at least two different surface profiles. The locking assembly in the second locked mode can exert a locking force against the orthodontic wire that is at least 50 cN. The locking assembly in the second locked mode can exert a locking force against the orthodontic wire that is at least 100 cN. The locking assembly in the second locked mode can exert a locking force against the orthodontic wire that is in a range of 50 cN to 2000 cN. The locking assembly in the second locked mode can exert a locking force against the orthodontic wire that is in a range of 100 cN to 2000 cN.

In another embodiment an orthodontic device is disclosed. The orthodontic device can comprise a bracket configured to support an orthodontic wire. The orthodontic device can comprise a fixation mechanism to be coupled to the bracket, the fixation mechanism configured to operate in a manner that allows sliding of the orthodontic wire relative to the bracket and in a manner that prevents sliding of the orthodontic wire relative to the bracket.

In some embodiments, the fixation mechanism can be movable from a first configuration that allows sliding of the orthodontic wire relative to the bracket to a second configuration that prevents sliding of the orthodontic wire relative to the bracket when the orthodontic wire is subject to typical orthodontic forces. The orthodontic device can comprise the orthodontic wire. The fixation mechanism can be configured to apply a continuously variable frictional force to the wire. The fixation mechanism can be configured to adjust a frictional force to the wire in a step-wise manner. The fixation mechanism can comprise a clip and a wedge member that cooperate to slidably lock the orthodontic wire in the second configuration. The bracket can comprise a retention cavity sized and shaped to receive and support the orthodontic wire, the retention cavity extending along a lateral axis of the orthodontic device. The clip and wedge member can be movable along a transverse axis of the orthodontic device, the transverse axis non-parallel to the lateral axis. In the first configuration, the clip can be configured to be positioned over the orthodontic wire to retain the orthodontic wire in the retention cavity of the bracket. The wedge member in the first configuration can be disposed at a first position along the transverse axis, and wherein the wedge member in the second configuration is disposed at a second position along the transverse axis that is different from the first position. In the second configuration, a wedge surface of the wedge member can contact and exert a locking force against the orthodontic wire. In the second configuration, the orthodontic wire can be vertically disposed between the clip and the wedge member, the wedge member and the clip cooperating to clamp the orthodontic wire. The orthodontic device can comprise a transverse cavity extending through the bracket transverse to the retention cavity, the wedge member disposed in the transverse cavity. The fixation mechanism can comprise a rotary member configured to rotate about a rotational direction to switch from the first configuration to the second configuration. The rotary member can be disposed in an interior cavity of the bracket, the rotary member comprising an outer bearing surface that rotates relative to a curved follower surface of the bracket. The rotary member can be configured to rotate about a lateral axis parallel to the orthodontic wire. The rotary member can comprise an inner cam surface having a plurality of component surfaces that engage with the orthodontic wire to switch between the first configuration and the second configuration. The plurality of component surfaces can be angled relative to one another and include at least two different surface profiles. The fixation mechanism in the second configuration can exert a locking force against the orthodontic wire that is at least 50 cN. The fixation mechanism in the second configuration can exert a locking force against the orthodontic wire that is at least 100 cN. The fixation mechanism in the second configuration can exert a locking force against the orthodontic wire that is in a range of 50 cN to 2000 cN. The fixation mechanism in the second configuration can exert a locking force against the orthodontic wire that is in a range of 100 cN to 2000 cN.

In another embodiment, an orthodontic device is disclosed. The orthodontic device can comprise a bracket configured to support an orthodontic wire. The orthodontic device can comprise a fixation mechanism to be coupled to the bracket, the fixation mechanism movable from a first configuration that allows sliding of the orthodontic wire relative to the bracket to a second configuration that prevents sliding of the orthodontic wire relative to the bracket when the orthodontic wire is subject to typical orthodontic forces.

In some embodiments, the fixation mechanism in the second configuration can prevent sliding of the orthodontic wire during use of the orthodontic device. The orthodontic device can comprise the orthodontic wire. The fixation mechanism can be configured to apply a continuously variable frictional force to the wire. The fixation mechanism can be configured to adjust a frictional force to the wire in a step-wise manner. The fixation mechanism can comprise a clip and a wedge member that cooperate to slidably lock the orthodontic wire in the second configuration. The bracket can comprise a retention cavity sized and shaped to receive and support the orthodontic wire, the retention cavity extending along a lateral axis of the orthodontic device. The clip and wedge member can be movable along a transverse axis of the orthodontic device, the transverse axis non-parallel to the lateral axis. In the first configuration, the clip can be configured to be positioned over the orthodontic wire to retain the orthodontic wire in the retention cavity of the bracket. The wedge member in the first configuration can be disposed at a first position along the transverse axis, and the wedge member in the second configuration can be disposed at a second position along the transverse axis that is different from the first position. In the second configuration, a wedge surface of the wedge member can contact and exert a locking force against the orthodontic wire. In the second configuration, the orthodontic wire can be vertically disposed between the clip and the wedge member, the wedge member and the clip cooperating to clamp the orthodontic wire. The orthodontic device can comprise a transverse cavity extending through the bracket transverse to the retention cavity, the wedge member disposed in the transverse cavity. The fixation mechanism can comprise a rotary member configured to rotate about a rotational direction to switch from the first configuration to the second configuration. The rotary member can be disposed in an interior cavity of the bracket, the rotary member comprising an outer bearing surface that rotates relative to a curved follower surface of the bracket. The rotary member can be configured to rotate about a lateral axis parallel to the orthodontic wire. The rotary member can comprise an inner cam surface having a plurality of component surfaces that engage with the orthodontic wire to switch between the first configuration and the second configuration. The plurality of component surfaces can be angled relative to one another and include at least two different surface profiles. The fixation mechanism in the second configuration can exert a locking force against the orthodontic wire that is at least 50 cN. The fixation mechanism in the second configuration can exert a locking force against the orthodontic wire that is at least 100 cN. The fixation mechanism in the second configuration can exert a locking force against the orthodontic wire that is in a range of 50 cN to 2000 cN. The fixation mechanism in the second configuration can exert a locking force against the orthodontic wire that is in a range of 100 cN to 2000 cN.

In another embodiment, an orthodontic device is disclosed. The orthodontic device can include a bracket having a retention cavity sized and shaped to receive and support an orthodontic wire, the retention cavity extending along a lateral axis of the orthodontic device. The orthodontic device can include a clip to be coupled to the bracket and to be positioned over the orthodontic wire in use, the clip configured to move along a transverse axis of the orthodontic device to retain the orthodontic wire in the retention cavity, the transverse axis non-parallel relative to the lateral axis. The orthodontic device can include a wedge member to be coupled to the bracket, the wedge member configured to move along the transverse axis, the orthodontic wire to be disposed between the wedge member and the clip with the wedge member disposed between the orthodontic wire and the bracket, the wedge member including a tapered wedge surface that engages the orthodontic wire. The clip and the wedge member can serve as a frictional adjustment mechanism configured to exert an adjustable frictional force against the orthodontic wire, including a range of sliding frictional forces in which the orthodontic wire is slidable relative to the bracket and at least one non-sliding frictional force that prevents sliding of the orthodontic wire in use when the orthodontic wire is subject to typical orthodontic forces.

In some embodiments, the frictional adjustment mechanism can be adjustable to apply a continuously variable frictional force against the orthodontic wire. The wedge member can be configured to exert a non-sliding force against the orthodontic wire to prevent sliding that is at least 50 cN. The wedge member can be configured to exert a non-sliding force against the orthodontic wire to prevent sliding that is in a range of 100 cN to 2000 cN. The orthodontic device can include the orthodontic wire. The wedge member can include one or a plurality of tooling apertures sized to receive a tool to adjust the frictional force against the orthodontic wire.

In another embodiment, an orthodontic device is disclosed. The orthodontic device can include a bracket having a retention cavity sized and shaped to receive and support an orthodontic wire, the retention cavity extending along a lateral axis of the orthodontic device. The orthodontic device can include a frictional adjustment mechanism comprising a clip and a wedge member that cooperate to exert an adjustable frictional force against the orthodontic wire, the clip and the wedge member to be coupled to the bracket and movable along a transverse axis that is non-parallel to the lateral axis. The frictional adjustment mechanism can configured to exert a range of sliding frictional forces in which the orthodontic wire is slidable relative to the bracket and at least one non-sliding frictional force that prevents sliding of the orthodontic wire in use when the orthodontic wire is subject to typical orthodontic forces.

In some embodiments, the frictional adjustment mechanism can be configured to exert a non-sliding force against the orthodontic wire to prevent sliding that is at least 50 cN. The frictional adjustment mechanism can be configured to exert a non-sliding force against the orthodontic wire to prevent sliding that is in a range of 100 cN to 2000 cN. The frictional adjustment mechanism can be adjustable to apply a continuously variable frictional force against the orthodontic wire. In use, the orthodontic wire can be disposed between the wedge member and the clip with the wedge member disposed between the orthodontic wire and the bracket. In use, the orthodontic wire can be disposed between the bracket and the wedge member, the wedge member disposed between the wire and the clip. The wedge member can include a tapered wedge surface that engages the orthodontic wire. The orthodontic device can include the orthodontic wire. The wedge member can include one or a plurality of tooling apertures sized to receive a tool to adjust the frictional force against the orthodontic wire.

In another embodiment, an orthodontic device is disclosed. The orthodontic device can include a bracket having a retention cavity sized and shaped to receive and support an orthodontic wire, the retention cavity extending along a lateral axis of the orthodontic device. The orthodontic device can include a clip to be coupled to the bracket, the clip configured to move along a transverse axis of the orthodontic device, the transverse axis non-parallel relative to the lateral axis. The orthodontic device can include a wedge member to be coupled to the bracket, the wedge member configured to move along the transverse axis. The clip, the wedge member, and the bracket can be configured to cooperate to exert an adjustable frictional force against the orthodontic wire. The clip and the wedge member can serve as a frictional adjustment mechanism adjustable to exert a range of sliding and non-sliding frictional forces against the orthodontic wire in use. The frictional adjustment mechanism can be adjustable to exert a non-sliding frictional force against the orthodontic wire that prevents sliding of the orthodontic wire when the orthodontic wire is subject to typical orthodontic forces. The wedge member can be configured to exert a non-sliding force against the orthodontic wire to prevent sliding that is at least 50 cN. The wedge member can be configured to exert a non-sliding force against the orthodontic wire to prevent sliding that is in a range of 100 cN to 2000 cN. The clip, the wedge member, and the bracket can be configured to cooperate to move between a plurality of operational modes, the plurality of operational modes comprising a first sliding mode in which the orthodontic wire is slidable relative to the bracket and a second locked mode in which the orthodontic wire is slidably locked relative to the bracket. The clip and the wedge member can serve as a frictional adjustment mechanism adjustable to apply a continuously variable frictional force against the wire. In the first sliding mode, the clip can be configured to be positioned over the orthodontic wire to retain the orthodontic wire in the retention cavity of the bracket. The wedge member in the first sliding mode can be disposed at a first position along the transverse axis, and the wedge member in the second locked mode can be disposed at a second position along the transverse axis that is different from the first position. In the second locked mode, a wedge surface of the wedge member can contact and exert a locking force against the orthodontic wire. In the second locked mode, the orthodontic wire can be vertically disposed between the clip and the wedge member, the wedge member and the clip cooperating to clamp the orthodontic wire. In the second locked mode, the orthodontic wire can be vertically disposed between the bracket and the wedge member, the wedge member disposed between the wire and the clip. The wedge member can include a tapered wedge surface that engages the orthodontic wire. The orthodontic device can include the orthodontic wire. The wedge member can include one or a plurality of tooling apertures sized to receive a tool to adjust the frictional force against the orthodontic wire.

In another embodiment, an orthodontic device is disclosed. The orthodontic device can comprise a bracket configured to support an orthodontic wire that extends along a lateral axis, the bracket including an interior cavity and a curved follower surface. The orthodontic device can comprise a rotary member to be coupled to the bracket in the interior cavity and configured to rotate about the lateral axis to exert an adjustable frictional force against the orthodontic wire, the rotary member comprising an outer bearing surface that rotates relative to the curved follower surface of the bracket and an inner cam surface that engages with the orthodontic wire to adjust the frictional force.

In some embodiments, the rotary member can be configured to rotate about the lateral axis to move between a plurality of operational modes, the plurality of operational modes comprises a first sliding mode in which the orthodontic wire is slidable relative to the bracket and a second locked mode in which the orthodontic wire is slidably locked relative to the bracket. The inner cam surface can comprise a plurality of component surfaces that engage with the orthodontic wire. The plurality of component surfaces can be angled relative to one another and can include at least two different surface profiles. The rotary member in the second locked mode can exert a locking force against the orthodontic wire that is at least 50 cN.

In one embodiment, a method of orthodontic treatment is disclosed. The method can include securing a first orthodontic device to a first tooth. The method can include adjusting the first orthodontic device to exert a sliding frictional force against an orthodontic wire such that the orthodontic wire is slidable relative to the first orthodontic device. The method can include securing a second orthodontic device to a second tooth. The method can include adjusting the second orthodontic device to exert a non-sliding frictional force against the orthodontic wire that prevents sliding of the orthodontic wire relative to the second orthodontic device when the orthodontic wire is subject to typical orthodontic forces in use.

In some embodiments, the method can include adjusting the first orthodontic device to exert a second non-sliding frictional force against the orthodontic wire that prevents sliding of the orthodontic wire relative to the orthodontic device. Adjusting the first orthodontic device can comprise moving a clip along an axis transverse to the orthodontic wire to position the clip over the orthodontic wire. Adjusting the first orthodontic device to exert the second non-sliding frictional force can comprise moving a wedge member along the axis transverse to the orthodontic wire to exert the second non-sliding force against the orthodontic wire. Adjusting the first orthodontic device to exert the second non-sliding frictional force can comprise rotating a rotatable member such that an internal cam surface of the rotatable member exerts the second non-sliding force against the orthodontic wire. The method can include securing a third orthodontic device to a third tooth and adjusting the third orthodontic device such that the orthodontic wire is slidable or non-slidable relative to the third orthodontic device.

In another embodiment, a method of orthodontic treatment is disclosed. The method can include securing an orthodontic device to a tooth. The method can include adjusting the orthodontic device to exert a sliding frictional force against an orthodontic wire such that the orthodontic wire is slidable relative to the orthodontic device. The method can include adjusting the orthodontic device to exert a non-sliding frictional force against the orthodontic wire that prevents sliding of the orthodontic wire relative to the orthodontic device.

In some embodiments, the method can include adjusting the orthodontic device to exert the sliding frictional force in a first treatment procedure before adjusting the orthodontic device to exert the non-sliding frictional force in a second treatment procedure. The method can include securing a second orthodontic device to a second tooth, adjusting the second orthodontic device to exert a second sliding frictional force against the orthodontic wire such that the orthodontic wire is slidable relative to the orthodontic device, and adjusting the second orthodontic device to exert a second non-sliding frictional force against the orthodontic wire that prevents sliding of the orthodontic wire relative to the orthodontic device. The non-sliding frictional force can prevent sliding of the orthodontic wire when the orthodontic wire is subject to typical orthodontic forces in use. Adjusting the orthodontic device can comprise moving a clip along an axis transverse to the orthodontic wire to position the clip over the orthodontic wire. Adjusting the orthodontic device to exert the non-sliding frictional force can comprise moving a wedge member along the axis transverse to the orthodontic wire to exert the non-sliding frictional force against the orthodontic wire. Adjusting the orthodontic device to exert the non-sliding frictional force can comprise rotating a rotatable member such that an internal cam surface of the rotatable member exerts the non-sliding frictional force against the orthodontic wire.

In another embodiment, a method of orthodontic treatment is disclosed. The method can include securing a first orthodontic device to a first tooth, the first orthodontic device having a first plurality of support modes including a first sliding mode and a second non-sliding mode. The method can include securing a second orthodontic device to a second tooth, the second orthodontic device having a second plurality of support modes including a first sliding mode and a second non-sliding mode. The method can include placing the first orthodontic device into the first sliding mode. The method can include placing the second orthodontic device into the second non-sliding mode.

In some embodiments, the first and second orthodontic devices in the second non-sliding mode can prevent sliding of an orthodontic wire when the orthodontic wire is subject to typical orthodontic forces in use. The method can include inserting an orthodontic wire into a retention cavity of a bracket of the first orthodontic device. Placing the first orthodontic device in the first sliding mode can comprise rotating a rotatable member over the orthodontic wire. Placing the first orthodontic device in the first sliding mode can comprise moving a clip along an axis transverse to the orthodontic wire to position the clip over the orthodontic wire. Placing the second orthodontic device in the second non-sliding mode can comprise rotating a rotatable member such that an internal cam surface of the rotatable member exerts a locking force against the orthodontic wire. Placing the second orthodontic device in the second non-sliding mode comprises moving a wedge member along an axis transverse to the orthodontic wire to exert a locking force against the orthodontic wire. The method can include placing the first orthodontic device into the second non-sliding mode. Placing the first orthodontic device into the second non-sliding mode can comprise switching the first orthodontic device into the second non-sliding mode in a step-wise manner. Placing the first orthodontic device into the second non-sliding mode can comprise continuously increasing a frictional force against the orthodontic wire. The method can include placing the second orthodontic device into the first sliding mode. Placing the second orthodontic device into the first sliding mode can comprise switching the second orthodontic device into the first sliding mode in a step-wise manner. Placing the second orthodontic device into the first sliding mode can comprise continuously increasing a frictional force against the orthodontic wire.

In another embodiment, a method of orthodontic treatment is disclosed. The method can include securing an orthodontic device to a tooth, the orthodontic device having a first plurality of operational modes including a first sliding mode and a second non-sliding mode. The method can include placing the orthodontic device into one of the first sliding mode and the second non-sliding mode. The method can include moving the orthodontic device into the other of the first sliding mode and the second non-sliding mode.

In some embodiments, the method can include securing a second orthodontic device to a second tooth, the second orthodontic device having a second plurality of operational modes including a first sliding mode and a second non-sliding mode, placing the second orthodontic device into one of the first sliding mode and the second non-sliding mode, and moving the second orthodontic device into the other of the first sliding mode and the second non-sliding mode. Moving the orthodontic device can comprise adjusting the orthodontic device to exert a continuously varying frictional force against the orthodontic wire. Moving the orthodontic device can comprise switching the orthodontic device into the second non-sliding mode in a step-wise manner In another embodiment, a method for designing an orthodontic treatment system is disclosed. The method can include determining an orthodontic force profile to be applied to a patient's teeth to treat the patient based on malocclusion characteristics of the patient's teeth. The method can include, based on the determined orthodontic force profile, selecting a first sliding mode for a first orthodontic device to be secured to a first tooth. The method can include, based on the determined orthodontic force profile, selecting a second non-sliding mode for a second orthodontic device to be secured to a second tooth.

In some embodiments, the method can include obtaining image data of a patient's teeth and processing the obtained image data to determine malocclusion characteristics of the patient. The method can include manufacturing the first and second orthodontic devices. The method can include selecting the first sliding mode and selecting the second locked mode based on a look-up table (LUT) that maps a plurality of clinical scenarios to operational modes of the first and second orthodontic devices.

In another embodiment, a system for creating a patient-specific orthodontic system is disclosed. The system can comprise an orthodontic design system having processing electronics configured to determine an orthodontic force profile to be applied to a patient's teeth to treat the patient based on malocclusion characteristics of the patient's teeth. The processing electronics can be configured to, based on the determined orthodontic force profile, select a first sliding mode for a first orthodontic device to be secured to a first tooth. The processing electronics can be configured to, based on the determined orthodontic force profile, select a second non-sliding mode for a second orthodontic device to be secured to a second tooth.

In some embodiments, the processing electronics can be configured to obtain image data of a patient's teeth and to process the obtained image data to determine malocclusion characteristics of the patient. The system can include an imaging device configured to capture the image data. The system can include a manufacturing system configured to manufacture the first and second orthodontic devices. The processing electronics can be configured to select the first sliding mode and to select the second locked mode based on a look-up table (LUT) that maps a plurality of clinical scenarios to operational modes of the first and second orthodontic devices.

In another embodiment, a bracket for an orthodontic device is disclosed. The bracket can include a base configured to be affixed to a tooth. The bracket can include a support portion extending from the base. The bracket can include a retention cavity extending through the support portion along a lateral axis of the bracket, the retention cavity sized and shaped to receive and support an orthodontic wire. The bracket can include a transverse cavity extending at least partially through the support portion along a transverse axis of the bracket that is non-parallel to the lateral axis, the transverse cavity sized and shaped to receive a wedge member.

In some embodiments, the transverse cavity can be disposed vertically between the base and the retention cavity.

In another embodiment, a bracket for an orthodontic device is disclosed. The bracket can include a base configured to be affixed to a tooth. The bracket can include a support portion extending from the base, the support portion including an interior cavity and a curved follower surface exposed to the interior cavity, the interior cavity and the curved follower surface sized and shaped to mate with a rotary locking member. The bracket can include a retention cavity extending along a lateral axis, the retention cavity sized and shaped to receive and support an orthodontic wire.

In some embodiments, the bracket can include a transverse cavity disposed transverse to the retention cavity and extending to the interior cavity.

In another embodiment, an orthodontic device is disclosed. The orthodontic device can include a bracket configured to support an orthodontic wire. The orthodontic device can include a braking assembly to be coupled to the bracket, the braking assembly configured to operate in a manner that allows sliding of the orthodontic wire relative to the bracket and provides adjustable friction that increases the braking effect on the orthodontic wire to prevent sliding of the orthodontic wire relative to the bracket in use.

In some embodiments, the braking assembly can be adjustable to exert a non-sliding frictional force against the orthodontic wire that prevents sliding of the orthodontic wire when the orthodontic wire is subject to typical orthodontic forces. The braking assembly can be configured to apply a continuously variable frictional force against the wire. The braking assembly can be configured to apply the continuously variable frictional force to the wire to move between a first sliding mode and a second non-sliding mode. The braking assembly can be configured to adjust a frictional force to the wire in a step-wise manner. The braking assembly can be configured to move between a first sliding mode and a second non-sliding mode in a step-wise manner. The orthodontic device can include the orthodontic wire. The braking assembly can comprise a clip and a wedge member that cooperate to slidably lock the orthodontic wire to prevent sliding of the orthodontic wire relative to the bracket. The bracket can comprise a retention cavity sized and shaped to receive and support the orthodontic wire, the retention cavity extending along a lateral axis of the orthodontic device. The clip and wedge member can be movable along a transverse axis of the orthodontic device, the transverse axis non-parallel to the lateral axis. The orthodontic device can include a transverse cavity extending through the bracket transverse to the retention cavity, the wedge member disposed in the transverse cavity. The braking assembly can comprise a rotary member configured to rotate about a rotational direction to increase the braking effect. The rotary member can be disposed in an interior cavity of the bracket, the rotary member comprising an outer bearing surface that rotates relative to a curved follower surface of the bracket. The rotary member can be configured to rotate about a lateral axis parallel to the orthodontic wire. The rotary member can comprise an inner cam surface having a plurality of component surfaces that engage with the orthodontic wire. The plurality of component surfaces can be angled relative to one another and include at least two different surface profiles. The braking assembly can be configured to exert a non-sliding force against the orthodontic wire to prevent sliding that is at least 50 cN. The braking assembly can be configured to exert a non-sliding force against the orthodontic wire to prevent sliding that is at least 100 cN. The braking assembly can be configured to exert a non-sliding force against the orthodontic wire to prevent sliding that is in a range of 50 cN to 2000 cN. The braking assembly can be configured to exert a non-sliding force against the orthodontic wire to prevent sliding that is in a range of 100 cN to 2000 cN.

In another embodiment, an orthodontic device is disclosed. The orthodontic device can include a bracket configured to support an orthodontic wire. The orthodontic device can include a frictional adjustment mechanism to be coupled to the bracket, the frictional adjustment mechanism adjustable to exert a range of sliding and non-sliding frictional forces against the orthodontic wire in use.

In some embodiments, the frictional adjustment mechanism can be adjustable to exert a non-sliding frictional force against the orthodontic wire that prevents sliding of the orthodontic wire when the orthodontic wire is subject to typical orthodontic forces. The frictional adjustment mechanism can be adjustable to exert a non-sliding frictional force against the orthodontic wire that prevents sliding of the orthodontic wire during use of the orthodontic device. The frictional adjustment mechanism can be configured to apply a continuously variable frictional force against the wire. The frictional adjustment mechanism can be configured to apply the continuously variable frictional force to the wire to move between a first sliding mode and a second non-sliding mode. The frictional adjustment mechanism can be configured to adjust a frictional force to the wire in a step-wise manner. The frictional adjustment mechanism can be configured to move between a first sliding mode and a second non-sliding mode in a step-wise manner. The orthodontic device can include the orthodontic wire. The frictional adjustment mechanism can comprise a clip and a wedge member that cooperate to slidably lock the orthodontic wire to prevent sliding of the orthodontic wire relative to the bracket. The bracket can comprise a retention cavity sized and shaped to receive and support the orthodontic wire, the retention cavity extending along a lateral axis of the orthodontic device. The clip and wedge member can be movable along a transverse axis of the orthodontic device, the transverse axis non-parallel to the lateral axis. The orthodontic device can include a transverse cavity extending through the bracket transverse to the retention cavity, the wedge member disposed in the transverse cavity. The frictional adjustment mechanism can comprise a rotary member configured to rotate about a rotational direction to increase the braking effect. The rotary member can be disposed in an interior cavity of the bracket, the rotary member comprising an outer bearing surface that rotates relative to a curved follower surface of the bracket. The rotary member can be configured to rotate about a lateral axis parallel to the orthodontic wire. The rotary member can comprise an inner cam surface having a plurality of component surfaces that engage with the orthodontic wire. The plurality of component surfaces can be angled relative to one another and include at least two different surface profiles. The frictional adjustment mechanism can be configured to exert a non-sliding force against the orthodontic wire to prevent sliding that is at least 50 cN. The frictional adjustment mechanism can be configured to exert a non-sliding force against the orthodontic wire to prevent sliding that is at least 100 cN. The frictional adjustment mechanism can be configured to exert a non-sliding force against the orthodontic wire to prevent sliding that is in a range of 50 cN to 2000 cN. The frictional adjustment mechanism can be configured to exert a non-sliding force against the orthodontic wire to prevent sliding that is in a range of 100 cN to 2000 cN.

For purposes of this summary, certain aspects, advantages, and novel features of certain disclosed inventions are summarized. It is to be understood that not necessarily all such advantages may be achieved in accordance with any particular embodiment of the invention. Thus, for example, those skilled in the art will recognize that the inventions disclosed herein may be embodied or carried out in a manner that achieves one advantage or group of advantages as taught herein without necessarily achieving other advantages as may be taught or suggested herein. Further, the foregoing is intended to summarize certain disclosed inventions and is not intended to limit the scope of the inventions disclosed herein.

BRIEF DESCRIPTION OF THE DRAWINGS

FIG. 2A is a schematic front, top, right side perspective view of an orthodontic device, according to one embodiment.

FIG. 2B is a schematic rear, top, left perspective view of the device of FIG. 2A.

FIG. 2E is a schematic front, top, right side perspective view of a wedge member of the device of FIGS. 2A-2D.

FIG. 2F is a schematic rear, bottom, left side perspective view of the wedge member of FIG. 2E.

FIG. 2G is a schematic front, top, right side perspective view of a clip used in the device of FIGS. 2A-2D.

FIG. 2H is a schematic rear, bottom, left side perspective view of the clip of FIG. 2G.

FIG. 2L is a schematic side sectional view of the orthodontic device of FIGS. 2A-2D in a sliding support mode, taken along section A-A of FIG. 2C.

FIG. 2M is a magnified view of the device shown in FIG. 2L.

FIG. 2N is a schematic side sectional view of the orthodontic device of FIGS. 2A-2D in a locked support mode, taken along section A-A of FIG. 2D.

FIG. 2O is a magnified view of the device shown in FIG. 2N.

FIG. 5A is a front, top, right side perspective view of an orthodontic device, according to another embodiment.

FIG. 5B is a schematic side sectional view of the orthodontic device of FIG. 5A in an open mode.

FIG. 5C is a schematic side sectional view of the orthodontic device of FIG. 5A in a sliding mode.

FIG. 5D is a schematic side sectional view of the orthodontic device of FIG. 5A in a locked mode.

FIG. 6A is a schematic front, top, right side perspective view of the orthodontic device with rotary member in an open mode, according to one embodiment.

FIG. 6B is a top plan view of the orthodontic device of FIG. 6B.

FIG. 6C is a schematic side sectional view of the orthodontic device of FIG. 6A, shown in the open mode.

FIG. 6D is a schematic side sectional view of the orthodontic device of FIG. 6A, shown in a sliding mode.

FIG. 6E is a schematic side sectional view of the orthodontic device of FIG. 6A, shown in a locked mode.

FIG. 6F is a first schematic perspective view of a rotary member according to another embodiment.

FIG. 6G is a second schematic perspective view of the rotary member of FIG. 6F.

FIG. 6H is a schematic perspective view of a bracket that can be used in cooperation with the rotary member of FIGS. 6F-6G.

FIGS. 6I-6K illustrate an orthodontic device having a detent mechanism to provide tactile feedback to the clinician indicative of the mode in which the device is placed, according to one embodiment.

FIG. 9A is a schematic perspective view of an orthodontic device that includes a locking assembly comprising a crimp device, according to another embodiment.

FIG. 9B is a schematic side sectional view of the orthodontic device of FIG. 9A in a sliding mode.

FIG. 9C is a schematic side sectional view of the orthodontic device of FIG. 9A in a locked mode.

FIGS. 16A-31 illustrate examples of methods of orthodontic treatment, according to various embodiments disclosed herein.

Figure 1A:
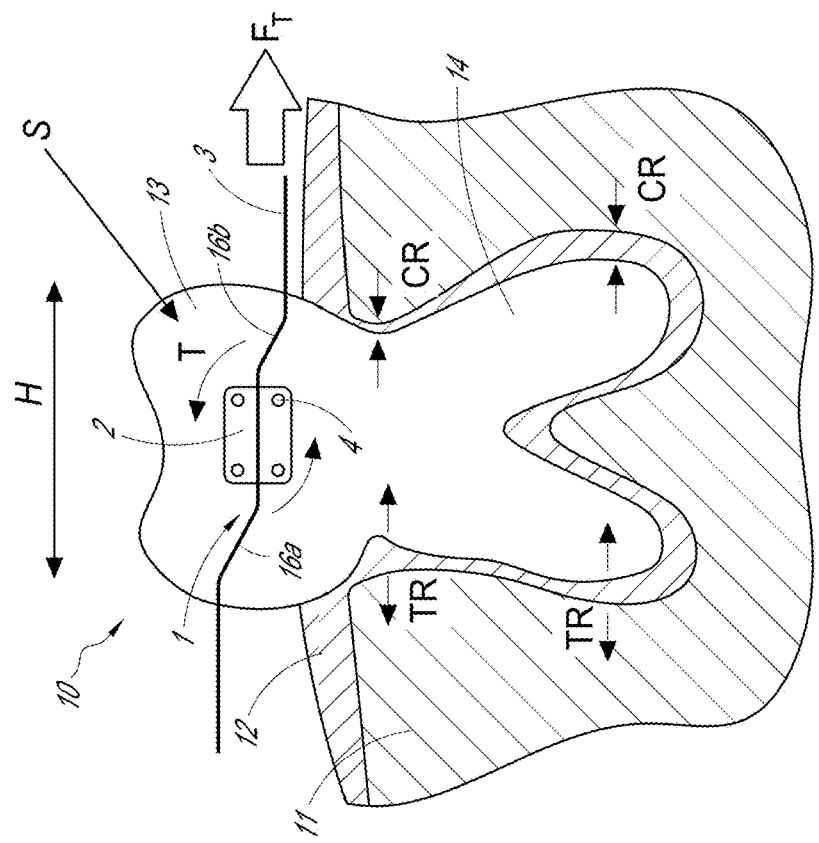
FIG. 1A is a schematic side view of a tooth to be treated using an orthodontic treatment device, in which an orthodontic tension force is applied to move the tooth laterally in a horizontal direction.

Throughout the drawings, unless otherwise noted, reference numbers may be re-used to indicate a general correspondence between referenced elements. The drawings are provided to illustrate example embodiments described herein and are not intended to limit the scope of the disclosure.

DETAILED DESCRIPTION

Conventional orthodontic devices are designed to straighten teeth using only one particular mode of operation. For example, some conventional devices utilize a sliding mode of operation, in which the orthodontic wire can slide laterally relative to the bracket. In traditional sliding-mode orthodontic devices, a ligature (e.g., elastic band or steel ligature) can be connected to hooks of the bracket over the wire to secure the wire to the bracket. In self-ligating sliding-mode devices, the wire can be inserted into the bracket and secured mechanically without using ligatures. In passive self-ligating devices, for example, the wire may be unconstrained in the bracket so as to slide laterally relatively freely. By contrast, in active self-ligating devices, a clip can express a force against the wire to contain the wire within a retention cavity of the bracket. In both active and passive self-ligating devices, the wire can slide laterally relative to the bracket, but active devices may induce larger frictional forces as compared with passive devices. Examples of such active and passive sliding mode devices may be found, for example, in U.S. Pat. Nos. 6,071,119 and 9,615,899.

Thus, traditional and self-ligating sliding devices like those mentioned above operate in only a single mode that enables a substantial amount of sliding between the wire and the bracket. However, conventional sliding devices may impart an unpredictable force on all of the teeth connected by the archwire, which can make tooth adjustments inefficient and/or unpredictable, and which may negatively affect patient outcomes. Frictional forces may induce binding of the wires, further reducing treatment predictability and treatment time. Wires may also slide excessively so as to contact buccal tissue and cause discomfort to the patient.

Other types of conventional orthodontic devices utilize a frictionless mode of operation. For example, clear alignment trays can be worn over the teeth and can be shaped to straighten a patient's teeth. These alignment trays tend to only be effective in correcting mild malocclusion and the outcomes are seldom persistent, even if a retainer is worn daily post-treatment. Over time, maintaining well aligned teeth can be costly and inconvenient for the patient. In other frictionless devices, wires can be applied to the tooth and bent in desired configurations to align a patient's teeth. These frictionless devices also have a single mode of operation in which a wire or tray is fixed relative to the teeth that are to be treated. Some frictionless devices are applied by bending wires into loops and bends during an appointment, which is inefficient for the clinician. Moreover, the use of wire loops can be uncomfortable and difficult to clean for the patient. Many of the bends in the wire are often replicated through the end of the treatment, which can be difficult and time-consuming.

Accordingly, there remains a continuing need for improved orthodontic devices. Various embodiments disclosed herein relate to orthodontic devices that have a plurality of operating or wire support modes, as opposed to only a single support or operating mode. The devices can include a bracket configured to support an orthodontic wire and a locking assembly that includes one or a plurality of locking component(s) connected to the bracket. The locking assembly can be switchable between a plurality of support modes. For example, the locking assembly can include a first sliding mode in which the orthodontic wire is laterally slidable relative to the bracket, and a second locked mode in which the orthodontic wire is slidably locked relative to the bracket.

Beneficially, and as explained herein, the disclosed orthodontic devices can provide increased treatment controllability, reduced treatment times, and improved patient health outcomes. Moreover, the use of orthodontic devices with multiple operational modes can enable patient-specific design of an orthodontic system to concurrently and efficiently treat multiple misaligned teeth.

I. Overview of Device Components

FIG. 1A is a schematic side view of a tooth 10 to be treated using an orthodontic treatment device 1, in which an orthodontic tension force $F_T$ is applied to move the tooth 10 laterally in a horizontal direction H, e.g., distally or mesially. The tooth 10 can comprise a crown 13 and one or a plurality of roots 14 extending apically from the crown 13. The tooth 10 can be embedded in gum tissue 12. The gum tissue 12 can be disposed over bone structure 11 and between the bone structure 11 and the tooth 10. The tooth 10 shown in FIG. 1A is a molar tooth, but it should be appreciated that the tooth 10 can comprise any suitable type of tooth, such as a molar, a pre-molar, an anterior, an incisor, a bicuspid, a canine, etc. Moreover, the tooth 10 shown in FIG. 1A can be a mandibular tooth or a maxillary tooth. One tooth 10 is shown in FIG. 1A for illustrative purposes, but the devices described herein can be used on multiple teeth, including all the teeth of a patient, or a subset of all the teeth of a patient.

If the clinician determines that the tooth 10 is misaligned, the clinician can provide an orthodontic treatment device 1 to the tooth 10 to align or straighten the tooth 10 relative to adjacent teeth and/or the mandibular or maxillary bone structures. The orthodontic device 1 can comprise a bracket 2 affixed to an attachment surface S of the tooth 10. For example, the clinician can use an adhesive or cement to affix the bracket 2 to the attachment surface S of the tooth 10. The attachment surface S can comprise a labial or buccal surface of the tooth 10 in some embodiments. In other embodiments, the attachment surface S can comprise a lingual surface of the tooth 10. An orthodontic wire 3 (e.g., archwire) can be mechanically coupled to the bracket 2. For example, in some embodiments, the wire 3 can be inserted into a retention cavity of the bracket 2. The wire 3 can comprise any suitable type of orthodontic wire, such as a metallic wire. For example, the wire 3 can comprise stainless steel, a nickel titanium alloy, a copper titanium alloy, or any other suitable material. In some embodiments, the wire 3 can comprise a pre-programmed wire that is shaped to have a desired curvature or shape based on the patient's malocclusion characteristics. In some embodiments, the wire 3 can comprise a straight wire. The wire 3 can comprise a shape memory alloy in various embodiments.

In some arrangements, the device 1 can include one or a plurality of hooks 4 onto which an elastic ligature or band (not shown) is looped. In such devices, the ligature can prevent the wire 3 from separating or coming out of the bracket 2. Additionally or alternatively, a clip or other structure can prevent the wire 3 from coming out of the bracket 2. In conventional orthodontic devices, stress and strain can be generated with the bracket and wire to impart movement of the tooth 10. In orthodontic devices, frictional resistance can be determined based on the design of the bracket 2, such as the space for receiving the archwire 3, the angle of the archwire 3 relative to the bracket 2, the torque at the bracket-archwire interface, and the type of ligation. Frictional resistance may additionally or alternatively be determined based on the design of the archwire 3, including the wire's size and stiffness, the shape (round or polygonal), and the surface friction which may depend on the materials, surface treatments like ionization, and coatings of the archwire 3.

A clinician can apply a combination of force(s) and/or torque(s) (e.g., moments) to a set of teeth to adjust for misalignments and spaces between teeth. As explained herein in connection with various clinical scenarios shown in FIGS. 16A-31, different types of tooth misalignment can be addressed by applying suitable combination(s) of linear forces and torques to one or more sets of teeth. For example, in some clinical scenarios, a combination of linear forces and torques can be applied to one or more misaligned teeth in order to correct the misalignment. In other clinical scenarios, the application of only a linear force or a torque may be sufficient to treat the tooth. Ribeiro et al. describe conventional friction and frictionless mechanics for space closure in orthodontics, which is incorporated by reference herein in its entirety and for all purposes. See Ribeiro and Jacob, "Understanding the basis of space closure in orthodontics for a more efficient orthodontic treatment," *Dental Press J Orthod.*, 2016 March-April; 21(2):115-25. As explained herein, it can be challenging to independently treat one or more misaligned teeth without affecting or moving other teeth. Various embodiments disclosed herein beneficially enable the clinician to independently treat the malocclusion of one or more teeth without affecting other teeth.

As an example, FIG. 1A illustrates the application of only a tension force $F_T$ to a tooth to be treated. The tension force $F_T$ can be applied to the tooth 10 by way of the device 1 in a variety of ways. In various disclosed embodiments, the bracket 2 can have a locking mode in which the wire 3 is locked relative to the bracket 2 so as to prevent sliding between the wire 3 and the bracket 2 when subjected to typical orthodontic forces. In such an embodiment, the wire 3 can be pre-programmed or otherwise configured to induce a horizontal tension force $F_T$ disposed along a horizontal direction Hon the wire 3 and bracket 2. As shown, the horizontal direction H can correspond to a mesial or distal direction relative to the tooth 10. In other embodiments, for example, in which the bracket 2 is in a sliding mode, the tension force $F_T$ can be applied to the bracket 2 by suitably selecting or altering the wire 3 and/or connecting the wire 3 to other teeth in the mouth.

The tension force $F_T$ can be selected so as to induce the desired movement of the tooth 10 relative to the bone structure 11. In the illustrated embodiment, the applied tension force $F_T$ can impart respective tensile regions TR and compressive regions CR between the tooth 10 and the neighboring gum tissue 12 and bone structure 11. Over time, the tooth 10 can move such that bone resorption occurs at compressive regions CR and bone formation occurs at tensile regions TR.

Figure 1B:
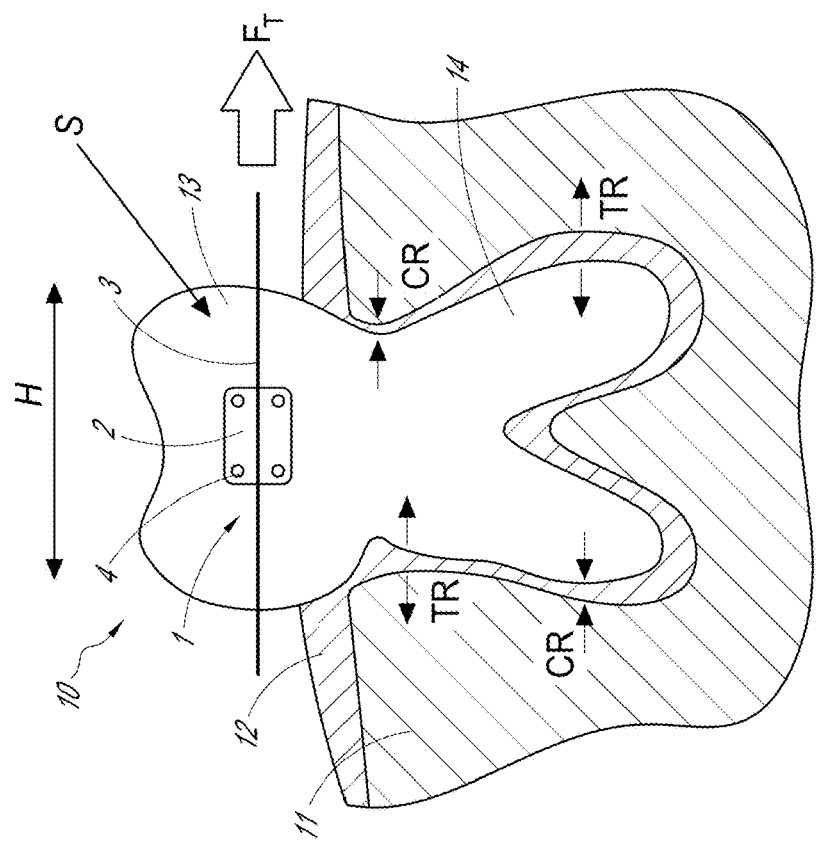
FIG. 1B is a schematic side view of a tooth to be treated using an orthodontic treatment device, in which a tension force is applied to impart a torque load to rotate the tooth.

FIG. 1B is a schematic side view of a tooth 10 to be treated using an orthodontic treatment device 1, in which a tension force $F_T$ is applied to impart a torque load T to rotate the tooth 10. Unless otherwise noted, the components of FIG. 1B may be the same as or generally similar to like-numbered components of FIG. 1A. As with FIG. 1A, a tension force $F_T$ is applied to the tooth 10 by way of the bracket 2. However, in FIG. 1B, a plurality of bends 16a, 16b are formed in the wire 3 so that the applied tension force $F_T$ imparts a counterclockwise torque T to the bracket 2 and tooth 10. The induced torque T can be adjusted by bending the wires 3 at a desired angle such that the tension force $F_T$ imparts a desired moment or torque. As explained below in Section III, many combinations of applied forces can be used for a patient's treatment plan based on the characteristics of the patient's malocclusion. Converting the tensile force $F_T$ to a torque T or moment can create different force profiles in the gum and bond structure. As shown in FIG. 1B, for example, the induced tensile and compressive regions TR, CR, may differ relative to those of FIG. 1A, which accordingly can create different movement of the tooth 10 as compared to FIG. 1A.

Figure 1C:
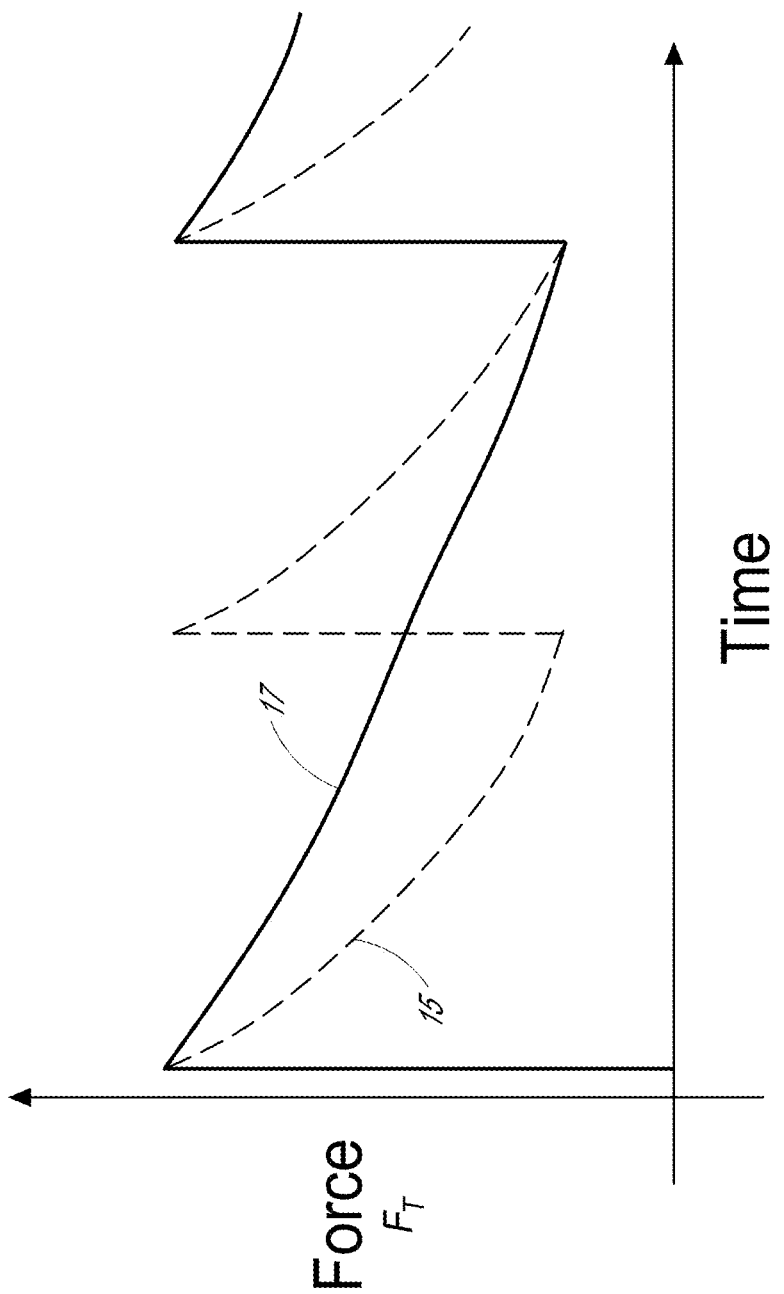
FIG. 1C is a graph that schematically illustrates the applied force over time for a conventional orthodontic treatment as compared with a desired orthodontic treatment.

FIG. 1C is a graph that schematically illustrates the applied force $F_T$ over time for a conventional orthodontic treatment 15 as compared with a desired orthodontic treatment 17 that can be accomplished with embodiments disclosed herein. In conventional treatments 15, numerous adjustments of the braces are performed at multiple treatment appointments over the course of months and years. The repetitive adjustments for conventional treatments 15 create force spikes at a relatively high frequency, which increases the pain and discomfort for the patient. By contrast, improved orthodontic treatment 17 includes force spikes at a lower frequency and amplitude as compared with conventional treatments 15, which reduces patient pain and discomfort. Advantageously, as explained herein, the orthodontic devices disclosed herein can reduce the frequency of adjustments to the patient's braces so as to achieve force profiles similar to the desired treatment profile 17 shown in FIG. 1C and to thereby reduce patient pain and discomfort. In various clinical scenarios, the treated teeth can undergo multiple different treatment modes, such that the treated teeth can experience increasing and/or decreasing applied forces (whether linear forces or torques). For example, in some scenarios, the embodiments described herein can modify the expressed frictional forces so as to reduce the sliding forces. The treatment modalities can accordingly change over time based on the applied moments and biologic response of the teeth.

II. Examples of Orthodontic Devices

FIGS. 2A-12C illustrate examples of orthodontic devices 1, in accordance with various embodiments disclosed herein. The orthodontic devices 1 of FIGS. 2A-12C can include a bracket 2 configured to support an orthodontic wire 3 and a locking assembly 5 connected to the bracket 2. In each of the embodiments disclosed herein, the locking assembly 5 can be pre-assembled or connected to the bracket 2 by the manufacturer before being used by the clinician, in some embodiments. In other embodiments, the locking assembly 5 and bracket 2 can be provided separately in a kit to the clinician, and the clinician or staff can assembly or connect (e.g., couple) the locking assembly 5 to the bracket 2. The locking assembly 5 can be switchable between a plurality of operational modes. For example, the locking assembly 5 can include a first sliding mode in which the orthodontic wire 3 is laterally slidable relative to the bracket 2, and a second locked mode in which the orthodontic wire 3 is slidably locked relative to the bracket 2. The device 1 can also include a third open mode in which the wire 3 can be inserted into the bracket 2. In the first sliding mode, the locking assembly 5 can serve in passive or active ligation modes. In a passive ligation sliding mode, the locking assembly 5 may not contact (or may only minimally or incidentally contact) the wire 3, such that the wire 3 can laterally slide relative to the bracket 2 when the bracket 2 or the wire 3 are subjected to typical orthodontic forces. In an active ligation sliding mode, the locking assembly 5 may contact the wire 3 but may impart a frictional force to the wire 3 by way of an applied normal force. In the active sliding mode, the frictional force may be less than typical orthodontic forces imparted to the bracket 2 or the wire 3.

By contrast, in the second locked mode, the locking assembly 5 can be configured to apply locking forces (e.g., a normal force) against the wire 3 to prevent the wire 3 from laterally sliding relative to the bracket 2 when typical orthodontic forces are imparted to the bracket 2 or the wire 3. The use of multiple support modes can advantageously provide the clinician with more flexibility during treatment, which can improve patient outcomes and reduce treatment times. It should be appreciated herein that the locking and sliding modes can be selected independently by the clinician for a set of teeth. For example, the clinician can place one or more teeth in the first sliding mode, and one or more other teeth in the second locked mode. Over the course of treatment, the clinician can switch one or more teeth from the locked mode to the sliding mode, or from the sliding mode to the locked mode. In some procedures, one or more teeth may remain in the locked mode throughout the course of treatment. One or more teeth may remain in the sliding mode throughout the course of treatment. Beneficially, the clinician can independently select whether a tooth to be treated is to be placed in the locked mode or the sliding mode, and/or whether to switch modes during the course of treatment.

Thus, in various embodiments, the locking assembly 5 can serve as a fixation mechanism or braking assembly to apply a frictional force against a wire 3 during use in a patient. The frictional forces can comprise clamping or braking forces applied to the wire 3 to resist sliding movement of the wire 3 as explained herein. The locking assembly 5 can serve as a friction adjustment mechanism to adjust a frictional force against the orthodontic wire. The frictional adjustment mechanism can be adjustable to exert a range of sliding and non-sliding frictional forces against the orthodontic wire 3 in use. The locking assembly 5 can adjust the frictional force in a continuous manner or in a step-wise manner. In various embodiments, the applied frictional forces can permit sliding, or prevent sliding when the wire is subject to typical orthodontic forces.

A. Orthodontic Devices Having Locking Assemblies with Wedge Members

In various embodiments, the locking assembly 5 can include a wedge member 7 that engages with the bracket 2 to secure the wire 3 to the bracket 2 in a plurality of operational or support modes. FIGS. 2A-2O illustrate one embodiment of an orthodontic device 2 that includes a bracket 2 and a locking assembly 5 mechanically connected to the bracket 2. The locking assembly 5 can include a clip 6 and wedge member 7 that cooperate with one another and with the bracket 2 to provide an open mode, a sliding support mode, and a locked support mode. Although the locking assembly 5 includes the clip 5 in the illustrated embodiments, in some embodiments, there may be no clip. In such embodiments, ligaments or elastic bands can be used to retain the wire 3 in the bracket 2.

Figure 2C:
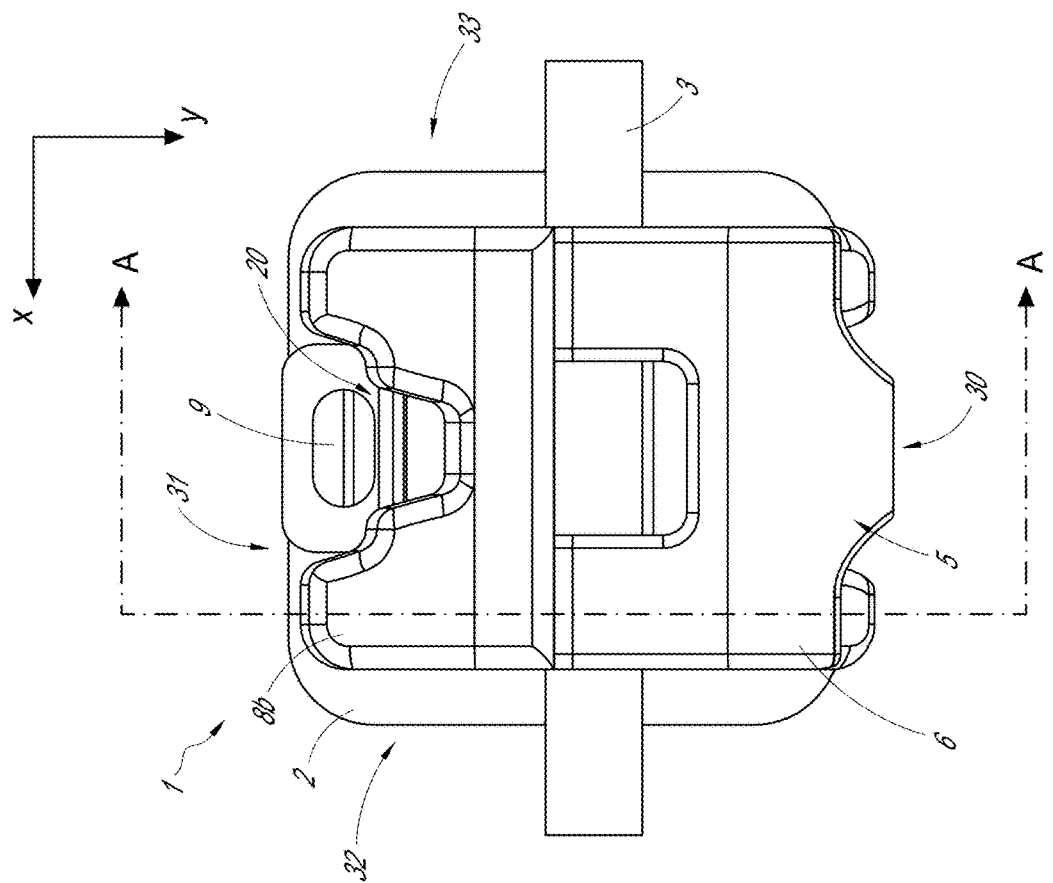
FIG. 2C is a schematic top plan view of the device of FIGS. 2A-2B in a sliding support mode.
Figure 2D:
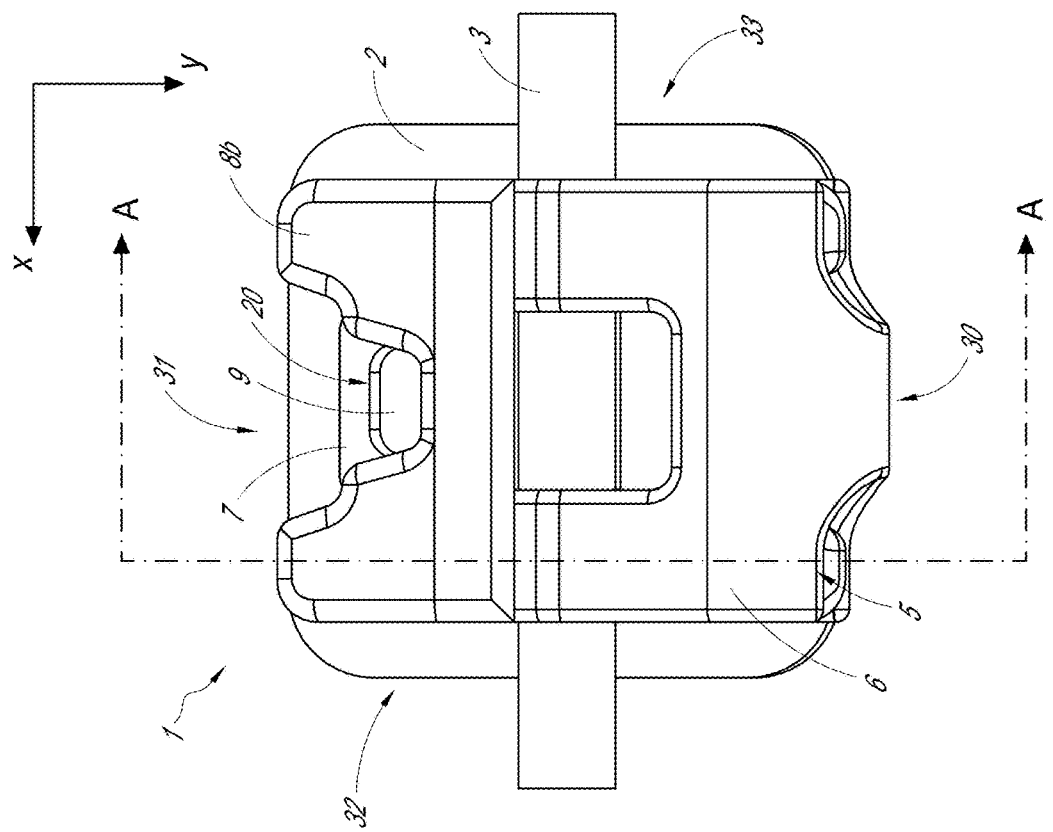
FIG. 2D is a schematic top plan view of the device of FIGS. 2A-2B in a locked support mode.
Figure 2J:
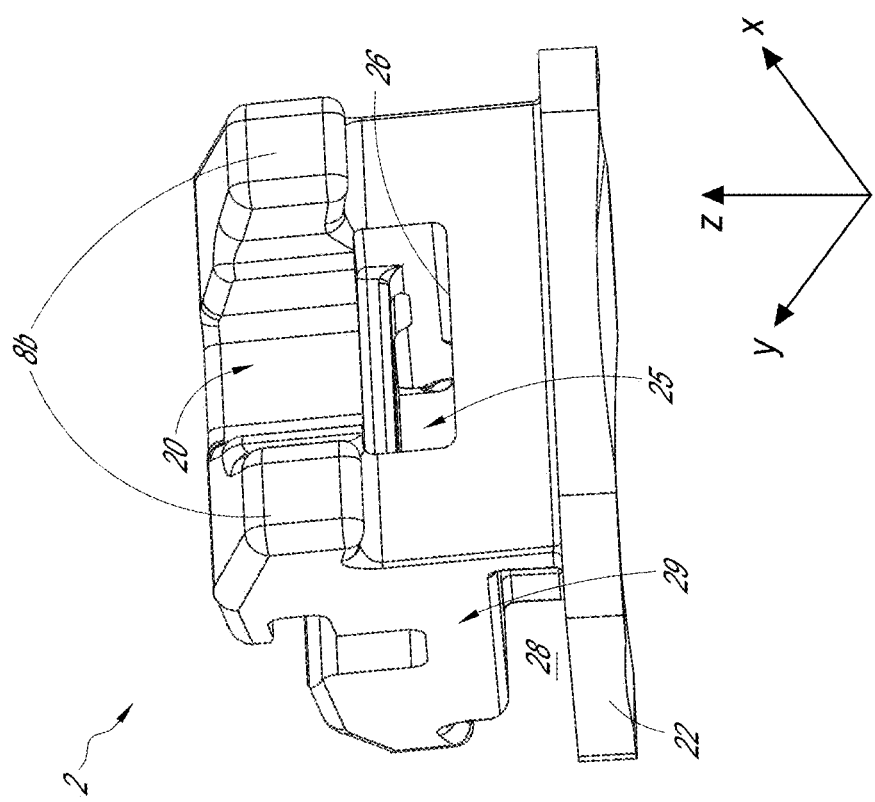
FIG. 2J is a schematic rear, right side perspective view of the bracket of FIG. 2I.
Figure 2I:
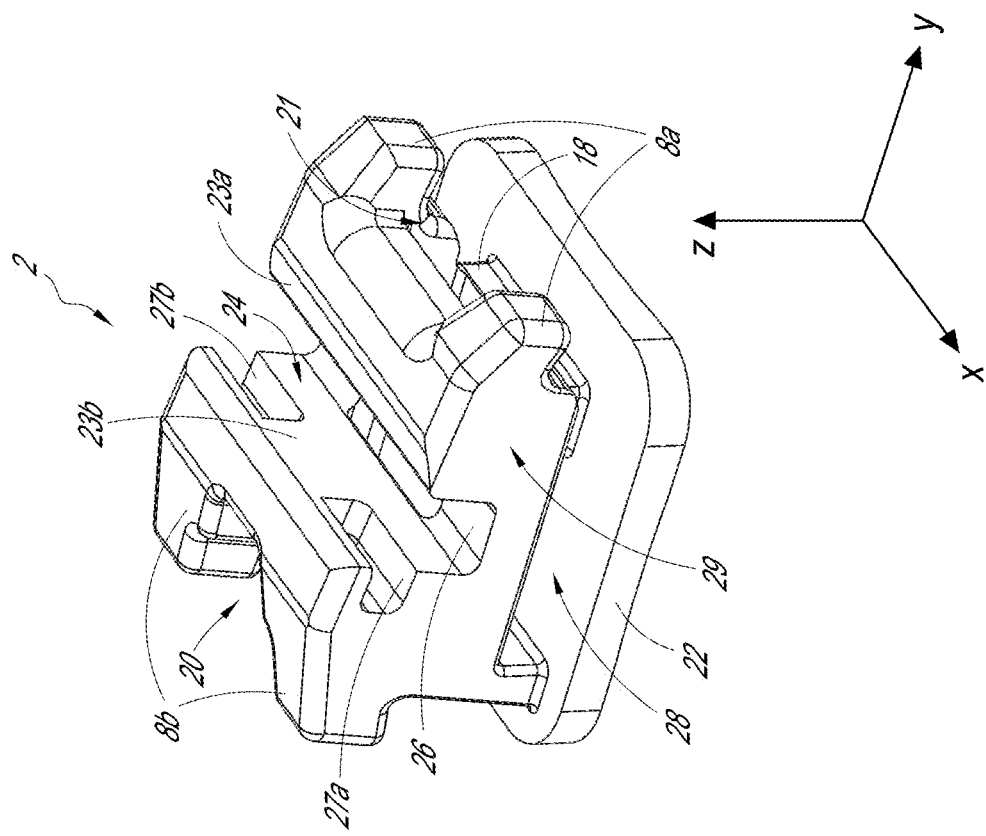
FIG. 2I is a schematic front, top, left side perspective view of a bracket used in the device of FIGS. 2A-2D.
Figure 2K:
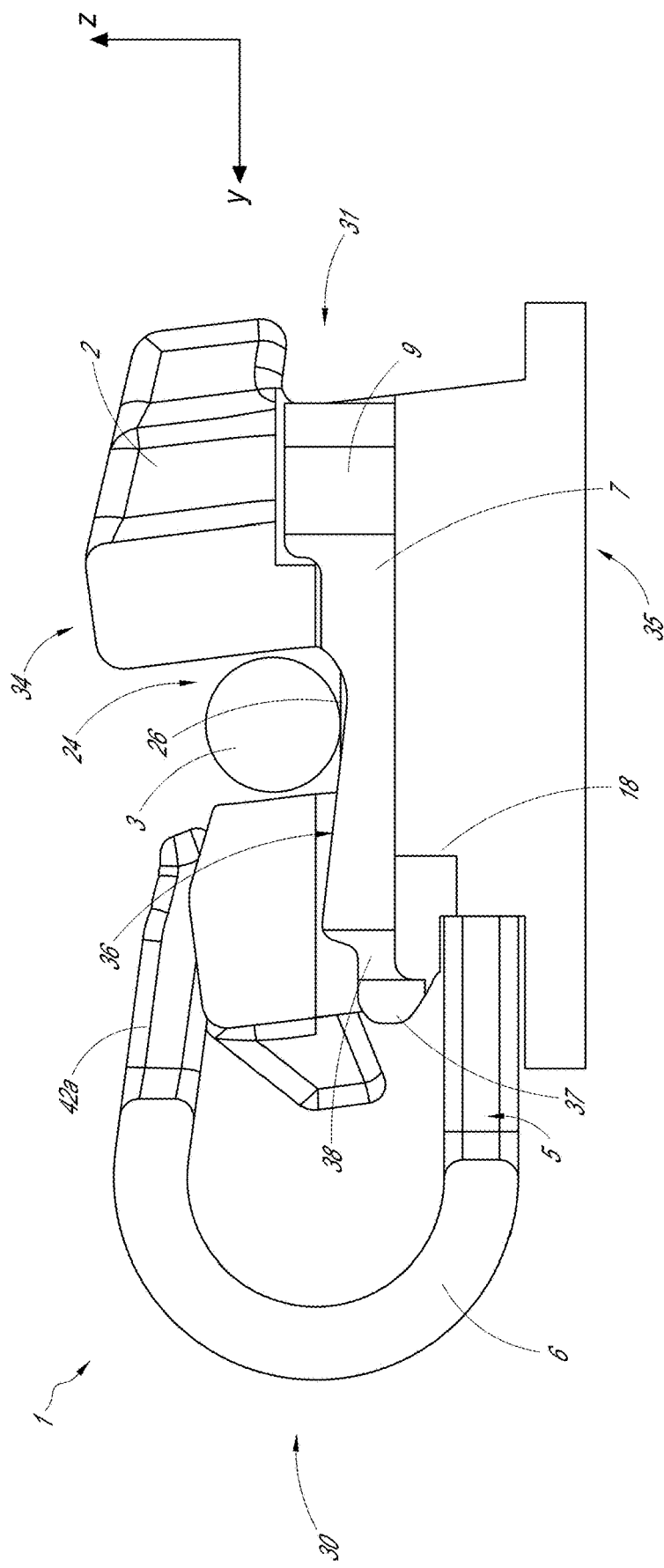
FIG. 2K is a schematic side sectional view of the orthodontic device of FIGS. 2A-2D in an open support mode, taken along section A-A of FIGS. 2C-2D.

FIG. 2A is a schematic front, top, right side perspective view of the orthodontic device 1. FIG. 2B is a schematic rear, top, left perspective view of the device 1 of FIG. 2A. FIG. 2C is a schematic top plan view of the device 1 of FIGS. 2A-2B in a sliding support mode. FIG. 2D is a schematic top plan view of the device 1 of FIGS. 2A-2B in a locked support mode. FIG. 2E is a schematic front, top, right side perspective view of the wedge member 7 of FIGS. 2A-2D. FIG. 2F is a schematic rear, bottom, left side perspective view of the wedge member 7 of FIG. 2E. FIG. 2G is a schematic front, top, right side perspective view of the clip 6 of FIGS. 2A-2D. FIG. 2H is a schematic rear, bottom, left side perspective view of the clip 6 of FIG. 2G. FIG. 2I is a schematic front, top, left side perspective view of the bracket 2 of FIGS. 2A-2D. FIG. 2J is a schematic rear, right side perspective view of the bracket 2 of FIG. 2I. FIG. 2K is a schematic side sectional view of the orthodontic device 1 of FIGS. 2A-2D in the open support mode, taken along section A-A of FIGS. 2C-2D. FIG. 2L is a schematic side sectional view of the orthodontic device 1 of FIGS. 2A-2D in the sliding support mode, taken along section A-A of FIG. 2C. FIG. 2M is a magnified view of the device 1 shown in FIG. 2L. FIG. 2N is a schematic side sectional view of the orthodontic device 1 of FIGS. 2A-2D in the locked support mode, taken along section A-A of FIG. 2D. FIG. 2O is a magnified view of the device 1 shown in FIG. 2N.

As shown in FIGS. 2A-2D and 2K-2O, an orthodontic wire 3 can be inserted into a retention cavity 24 of the bracket 2. As explained above, the orthodontic wire 3 can comprise an archwire that provides a desired profile for the patient's maxillary or mandibular teeth to improve alignment of the patient's teeth. In various embodiments, the wire 3 can comprise a metal, such as stainless steel, a nickel titanium alloy, a copper titanium alloy, or any other suitable material. For example, in some embodiments, the wire 3 can comprise a shape memory alloy. In some embodiments, the wire 3 can comprise a pre-programmed wire that is shaped to have a desired curvature or shape based on the patient's malocclusion characteristics. In some embodiments, the wire 3 can comprise a straight wire. As explained below in Section III, the wire 3 can be shaped to include loops, kinks, bends, twists, inflections, or other shapes to apply suitable forces and/or torques to one or more teeth under treatment. Additionally or alternatively, the wire 3 can be pre-tensioned, pre-compressed, pre-bent, or otherwise biased in a desired mechanical configuration so as to provide adequate treatment for a patient's malocclusion. Any suitable elastic bands, springs, spacers, or other supplemental treatment devices can be used in conjunction with the devices 1 shown herein. Further, although one wire 3 is shown in the retention cavity 24 of the bracket 2 in FIGS. 2A-2O (and in other embodiments), it should be appreciated that more than one (e.g., two, three, etc.) may be provided in the retention cavity 24 in various arrangements (see, e.g., FIGS. 30-31). The wire 3 shown in FIGS. 2A-2O (and in other embodiments) is a rounded (e.g., elliptical or circular cross-section) wire, but in various arrangements, the wire 3 can comprise a polygonal (e.g., rectangular or square) wire.

The wire 3 can extend along a local lateral axis x of the device 1 as shown in FIGS. 2A-2D. The device 1 can have a left side 32 and a right side 33 opposite the left side 32 along the lateral axis x. In the sliding mode of the device 1, the wire 3 can slide laterally relative to the bracket 2 along the lateral axis x. In the locked or non-sliding mode of the device 1, the wire 3 is locked such that the wire 3 is prevented from sliding laterally relative to the bracket along the lateral axis x. In some embodiments, the locked mode of the device 1 locks six degrees-of-freedom (6-DOF) of the wire 3 relative to the bracket 2. In other embodiments, the locked mode locks less than 6-DOF. For example, as explained herein, the locked mode can lock the wire 3 in at least 1-DOF, such as a laterally sliding mode to prevent the wire 3 from sliding along the x axis. Additionally or alternatively, the locked mode can lock the wire 3 rotationally to prevent the wire 3 from rotating about its own axis (e.g., the lateral x-axis). In other embodiments, the locked mode can permit the wire 3 to rotate about the x-axis. Additionally or alternatively, the locked mode can also lock the wire 3 to prevent the wire 3 from translating vertically along the z-axis. Additionally or alternatively, the locked mode can also lock the wire 3 to prevent the wire 3 from translating transversely along the y-axis. Additionally or alternatively, the locked mode can lock the wire 3 to permit the wire 3 from locally rotating about the y- or z-axes at or near locations at which the locking assembly 5 contacts the wire 3.

As illustrated in FIGS. 2A-2D and 2K-2O, the clip 6 and wedge member 7 can be mechanically engaged with the bracket 2 crosswise or transverse (e.g., non-parallel to) the wire 3 and the lateral axis x along a local transverse axis y of the device 1. The device 1 can have a front side 30 and a rear side 31 opposite the front side 30 along the transverse axis y. The clip 6 and the wedge member 7 can be moved (e.g., translated) along the transverse axis y to switch between the open mode, the sliding mode, and the fixed mode. In the illustrated embodiment, the clip 6 and wedge member 7 can be moved transversely in a generally perpendicular direction relative to the lateral axis x such that the transverse axis y is generally perpendicular to the lateral axis x. In other embodiments, the transverse movement of the clip 6 and/or wedge member 7 may not be perpendicular relative to the lateral axis x, but may still be non-parallel or transverse relative to the wire 3 and lateral axis x. When the bracket 2 is attached to the tooth 10, the clip 6 and/or wedge member 7 can translate in the gingival-occlusal plane of the tooth 10.

The device 1 and its respective components can also include a top side 34 and a bottom side 35 opposite the top side 34 along a local vertical axis z of the device 1. During an orthodontic treatment procedure, a base 22 of the bracket 2 at the bottom side 35 of the device 1 can be affixed to the tooth 10 using, e.g., a cement or other adhesive. As explained above, the bracket 2 can be positioned on a buccal or labial surface, or on a lingual surface in various embodiments. In some embodiments, the device 1 can be affixed to the tooth 10 such that the front side 30 faces in a gingival direction (e.g., generally toward the gum tissue 12), and such that the rear side 31 faces in an occlusal or incisal direction (e.g., generally towards occlusal or incisal surfaces of the tooth 10). In other embodiments, the device 1 can be affixed to the tooth 10 such that the front side 30 faces in an occlusal or incisal direction, and such that the rear side 31 faces in a gingival direction.

Turning to FIGS. 2E-2F, the wedge member 7 can include a tapered wedge surface 36 angled vertically relative to the vertical axis z. As explained above, the wedge member 7 can serve as a locking member to lock the wire 3 relative to the bracket 2. In FIGS. 2E-2F, the wedge member 7 can be thicker at its front and rear ends than at a depressed surface 19 between the front and rear ends. The tapered wedge surface 36 can extend rearwardly from a second tooling aperture. In the illustrated embodiment, the wedge surface 36 is tapered downwardly and rearwardly, but in other embodiments, the wedge surface can be tapered downwardly and forwardly. The depressed surface 19 may be disposed rearward of the wedge surface 36. The portion of the wedge member 7 at the depressed surface 19 can be thinner than the portion of the wedge member 7 at the wedge surface 36. The wedge member 7 can include a raised rear portion 39 having a first tooling aperture 9 extending vertically therethrough along the vertical axis z. The clinician can use a suitable tool to engage with the first tooling aperture 9 (for example by inserting the tool into the aperture 9) to switch the device 1 from one support mode to another. The wedge member 7 can include a front stop portion 37 and the second tooling aperture 38 near the front stop portion 37. As explained herein, the front stop portion 37 can engage with a corresponding shoulder 18 of the bracket 2 (see FIG. 2I). The clinician can use a suitable tool to engage with the second tooling aperture 38 (for example by inserting the tool into the aperture 38) to switch the device 1 from one support mode to another. The wedge member 7 can comprise any suitable type of material, such as a metal, a plastic, etc. The wedge member 7 can be sufficiently stiff so as to impart significant forces against the wire 3 when the device 1 is in the locked mode.

As shown in FIGS. 2F and 2G, the clip 6 can include an upper portion 40 and a lower portion 41 spaced apart from the upper portion 40 along the vertical axis z. A vertically extending connection portion 43 can connect the upper and lower portions 41, 42. The upper portion 40 can include a pair of upper arms 42a laterally spaced apart along the lateral axis x by an upper gap 44. The lower portion 41 can include a pair of lower arms 42b laterally spaced apart along the lateral axis x by a lower gap 45. The clip 6 can include a clip cavity 46 disposed between the upper and lower portions 40, 41. The clip 6 can comprise any suitable type of material, such as a metal. The clip 6 can be sufficiently stiff so as to impart significant forces against the wire 3 when the device 1 is in the locked mode.

As shown in FIGS. 2I-2J, the bracket 2 can include a support portion 29 extending from the base 22. The support portion 29 can be sized and shaped to receive and support the wire 3, the wedge member 7, and the clip 6. As shown in FIGS. 2I-2J, a lower recess 28 can be formed in the bracket 22 to vertically separate portions of the support portion 29 from the base 22. The lower recess 28 can be angled or curved so as to be partially revolved around the vertical axis z to form a gap between the support portion 29 and the base 22. The shoulder 18 can define an inner surface of the lower recess 28. The retention cavity 24 can be defined in the support portion 29 at least in part by a front wall 23a, a rear wall 23b spaced apart from the front wall 23a along the transverse axis y, and a retention surface 26 disposed transversely relative to the front and rear walls 23a, 23b. The retention cavity 24 can extend completely through the support portion 29 along the lateral axis x in the illustrated embodiment.

The support portion 29 can include one or more front hooks 8a and one or more rear hooks 8b. The front hooks 8a can be disposed at the front side 30 of the device 1. The rear hooks 8b can be disposed at the rear side 31 of the device 1. In FIGS. 2A-2D and 2I-2J, a pair of front hooks 8a can be spaced apart by a front spacing 21, and a pair of rear hooks 8b can be spaced apart by a rear spacing 20. In some embodiments, ligatures (e.g., elastic bands or steel ligatures) can be stretched around the hooks 8a-8b to retain the wire 3 in the retention cavity 24. In other embodiments, no ligatures may be used, and the clip 6 may serve to retain the wire 3 in the retention cavity 24.

The support portion 29 can also include upper recesses 27a, 27b. The upper recesses 27a, 27b can be laterally spaced apart from one another by the rear wall 23b along the lateral direction x. The upper recesses 27a, 27b can extend rearward into the support portion 29 relative to the rear wall 23b along the transverse axis y. A transverse cavity 25 can extend transversely through the support portion 29 along the transverse axis y. The transverse cavity 25 can extend transversely (e.g., non-parallel) relative to the retention cavity 24. In the illustrated embodiment, the retention surface 26 may also serve as a floor or bottom surface of the transverse cavity 25. As shown in FIGS. 2I-2J, the transverse cavity 25 can be positioned vertically along the z-axis between the lower recess 28 and the upper recesses 27a, 27b. In the illustrated embodiment, the transverse cavity 25 extends completely through the support portion 29 along the transverse axis y. In other embodiments, the transverse cavity 25 may extend only partially through the support portion 29 along the transverse axis y.

When assembled, as shown in FIGS. 2A-2D, the wedge member 7 can extend transversely through the transverse recess 25 of the bracket 2, with the rear raised portion 39 disposed at the rear side 31 of the device 1. The upper arms 42a of the clip 6 can be inserted into the upper recesses 27a, 27b of the bracket 2. The lower arms 42b of the clip 6 can be inserted into the lower recess 28 of the bracket 2. The vertically extending connection portion 43 of the clip 6 can be positioned in or near the front spacing 21 of the bracket 2. Thus, in FIGS. 2A-2D, the wire 3, the wedge member 7, the front wall 23a, and the retention surface 26 of the bracket 2 can be disposed in the clip cavity 46 vertically between the upper and lower portions 40, 41 of the clip 6. In the illustrated embodiment, moreover, the wedge member 7 can be positioned vertically between the wire 3 and the retention surface 26 of the bracket 2. In other embodiments, however, the wire 3 can be positioned vertically between the wedge member 7 and the retention surface 26.

Turning to the operation of the device 1, the clinician can load or insert the wire 3 by placing the device 1 in the open mode, as shown in FIG. 2K. The wire 3 can be placed in the retention cavity 24 and onto the retention surface 26 of the bracket 2. In the open mode of FIG. 2K, the clip 6 is translated to a forward or front position along the transverse axis y such that the upper arms 42a expose the retention cavity 24. The wedge member 7 is also translated to, or kept in, a forward or front position along the transverse axis y such that the clinician can access the second tooling aperture 38 and such that the front stop portion 37 is positioned forward of the shoulder 18. In the open mode, the wire 3 may be supported only by the retention cavity 24, e.g., by the retention surface 26 and the front and rear walls 23a, 23b of the bracket 2. In some embodiments, ligaments can be stretched over the hooks 8a, 8b to retain the wire 3 in the cavity 24, and the clip may be omitted.

Turning to FIGS. 2L and 2M, the device 1 is illustrated in a sliding mode. The clinician can move the device 1 from the open mode to the sliding mode by translating the clip 6 rearwardly along the transverse axis y into a rear position such that the upper arms 42a are disposed over the wire 3 in the retention cavity 24 and into the upper recesses 27a, 27b, and such that the lower arms 42b are disposed in the lower recess 28. In the sliding mode, the upper arms 42a of the clip can retain the wire 3 in the retention cavity 24, e.g., to prevent the wire 3 from moving vertically along the z-axis out of the cavity 24. The wedge member 7 may be kept in, or switched to, the forward position such that the wedge surface 36 does not impart forces on the wire 3. For example, as shown in FIG. 2M, a space 47 may be provided between the wire 3 and the depressed surface 19 of the wedge member 7 such that the wedge surface 36 does not impart forces on the wire 3. In the sliding mode, the upper arms 42a may or may not contact the wire 3, such that the upper arms 42a provide active or passive ligation support. In the sliding mode of FIGS. 2L and 2M, the wire 3 can laterally slide along the lateral axis x. In an active sliding mode, frictional forces may be applied to the wire 3 at magnitudes less than typical orthodontic forces to provide sliding resistance but not at magnitudes sufficient to prevent or lock sliding. In a passive sliding mode, the wire can slide relatively freely relative to the bracket 2.

If the clinician wishes to place the device 1 in the locked or non-sliding mode, a tool can be used to engage the second tooling aperture 38 to translate the wedge member 7 rearwardly along the transverse axis y to a rear position, as shown in FIGS. 2N and 2O. The clip 6 can be kept in, or translated to, the rear position shown in FIG. 2L. If the clinician wishes to switch the device 1 to the sliding mode from the locked mode, the clinician can engage the first tooling aperture 9 to translate the wedge member 7 to the forward position. The clinician can further switch the device 1 to the open mode by keeping the wedge member 7 in the forward position and translating the clip 6 to the forward position.

In the locked or non-sliding mode of FIGS. 2N and 2O, the wedge member 7 can accordingly be moved sufficiently rearwardly such that the tapered wedge surface 36 contacts and expresses a locking force against the wire 3. In some embodiments, the tapered wedge surface 36 may have a curvature complementary to the curvature of the wire 3. The front stop portion 37 can engage the shoulder 18 to prevent the wedge member 7 from being removed entirely from the transverse recess 25. As shown in FIGS. 2N and 2O, the tapered wedge surface 36 of the wedge member 7 and the upper arms 42a of the clip 6 can mechanically cooperate to clamp the wire 3 therebetween. The wedge surface 36 can be shaped such that when the wedge member 7 is in the rear position, the wedge surface 36 and clip 6 exert a sufficiently strong force against the wire such that typical orthodontic forces do not impart sliding translation to the wire 3 relative to the bracket 2.

In various embodiments, for example, the locking assembly 5 (e.g., the wedge member 7 and the clip 6) in the locking or non-sliding mode can exert a frictional force against the wire 3 that is at least 50 cN, at least 75 cN, at least 100 cN, at least 150 cN, at least 200 cN, at least 250 cN, at least 300 cN, at least 350 cN, at least 500 cN, or at least 1000 cN. The locking assembly 5 can exert a frictional force against the wire that is in a range of 50 cN to 800 cN, in a range of 50 cN to 200 cN, in a range of 50 cN to 100 cN, in a range of 50 cN to 2000 cN, in a range of 50 cN to 1000 cN, in a range of 75 cN to 2000 cN, in a range of 75 cN to 1000 cN, in a range of 100 cN to 750 cN, in a range of 100 cN to 700 cN, in a range of 100 cN to 600 cN, in a range of 300 cN to 2000 cN, in a range of 350 cN to 2000 cN, or in a range of 500 cN to 2000 cN. In various embodiments, in the locking mode, the locking or frictional forces may be sufficiently high so as to indent or otherwise locally deform the wire.

In the sliding mode, the locking assembly 5 can exert a frictional force against the wire 3 that is less than the frictional force exerted in the locked mode. For example, in various embodiments, in the sliding mode, the locking assembly 5 can exert a frictional force of less than 50 cN, or less than 100 cN against the wire. In various embodiments, in the sliding mode, the locking assembly 5 can exert a frictional force against the wire in a range of 0 cN to 100 cN, in a range of 0 cN to 75 cN, or in a range of 0 cN to 50 cN. In various embodiments, the locking assembly 5 in the sliding mode can impart a frictional force against the wire 3 that is less than 90% of the frictional force imparted against the wire 3 in the locked mode, less than 80% of the frictional force imparted against the wire 3 in the locked mode, less than 70% of the frictional force imparted against the wire 3 in the locked mode, less than 60% of the frictional force imparted against the wire 3 in the locked mode, or less than 50% of the frictional force imparted against the wire 3 in the locked mode. In some embodiments, the frictional force imparted against the wire 3 in the sliding mode is in a range of 0% to 80% of the frictional force imparted against the wire in the locked mode, in a range of 0% to 50% of the frictional force imparted against the wire in the locked mode, or in a range of 25% to 80% of the frictional force imparted against the wire in the locked mode.

Accordingly, in various embodiments, the locking assembly 5 can be movable from a first configuration that allows sliding of the orthodontic wire 3 relative to the bracket 2 (e.g., a first sliding mode) to a second configuration that prevents sliding of the orthodontic wire 3 relative to the bracket 2 when the orthodontic wire 3 is subject to typical orthodontic forces during use of the orthodontic device (e.g., a second locked mode). In the second configuration (or the second locked mode), the wire 3 can be locked or non-sliding so as to substantially prevent sliding of the wire 3 relative to the bracket 2. For example, the second configuration or locked (e.g., non-sliding) mode can permit less sliding of the wire 3 than the amount of sliding permitted by typical active self-ligating orthodontic devices. Thus, the locked mode or configuration may permit a very small amount of sliding (e.g., less than 1 mm, less than 0.5 mm, or less than 0.1 mm) that is less than the amount of sliding permitted by conventional active orthodontic devices. Further, it should be appreciated that the sliding and locked modes described herein may be operated along a continuum such that the locking assembly 5 can be placed in multiple positions to enable sliding and/or locking. In some embodiments, therefore, the clinician can adjust the locking assembly 5 along a continuum of positions to express a range of frictional forces against the wire 3 in the sliding mode. Similarly, in some embodiments, multiple positions of the locking assembly 5 can serve to lock the wire 3 in the locked mode. Accordingly, the locking assembly 5 can be configured to apply a continuously variable frictional force to the wire 3. The continuously variable frictional force can be applied to move the wire 3 between the sliding and locked (e.g., non-sliding) configurations. The locking assembly 5 can apply continuously variable frictional forces within the sliding and/or locked modes. In other embodiments, however, the sliding and locked modes can comprise a discrete number of modes, as opposed to a continuum of modes. For example, the locking assembly 5 can be configured to adjust a frictional force to the wire 3 in a step-wise manner. The locking assembly 5 can be configured to move between the sliding and locked configurations in a step-wise manner.

It should be appreciated that, although the transverse recess 25 extends from the rear side 31 of the device 1 through the bracket 2 with the wedge member 7 disposed in the transverse recess 25 in the illustrated embodiment, in other embodiments, the wedge member can extend through an aperture at the front side 30 of the device 1, e.g., through an aperture in the clip 6. Further, although the wedge member 7 is shown as being disposed between the wire 3 and the retention surface 26, in other embodiments, the wedge member 7 can be disposed between the wire 3 and the clip 6 so as to press the wire 3 against the retention surface 26.

Figure 3B:
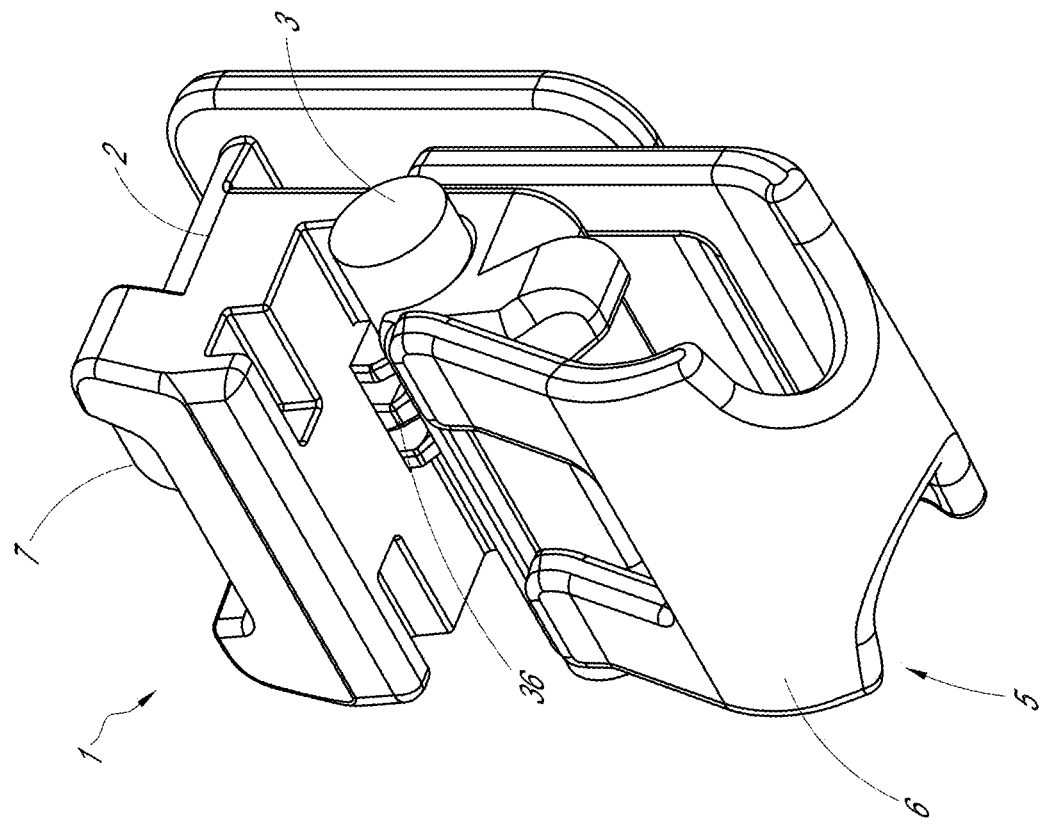
FIG. 3B is a front, top, right side perspective view of the orthodontic device of FIG. 3A in an open mode.
Figure 3A:
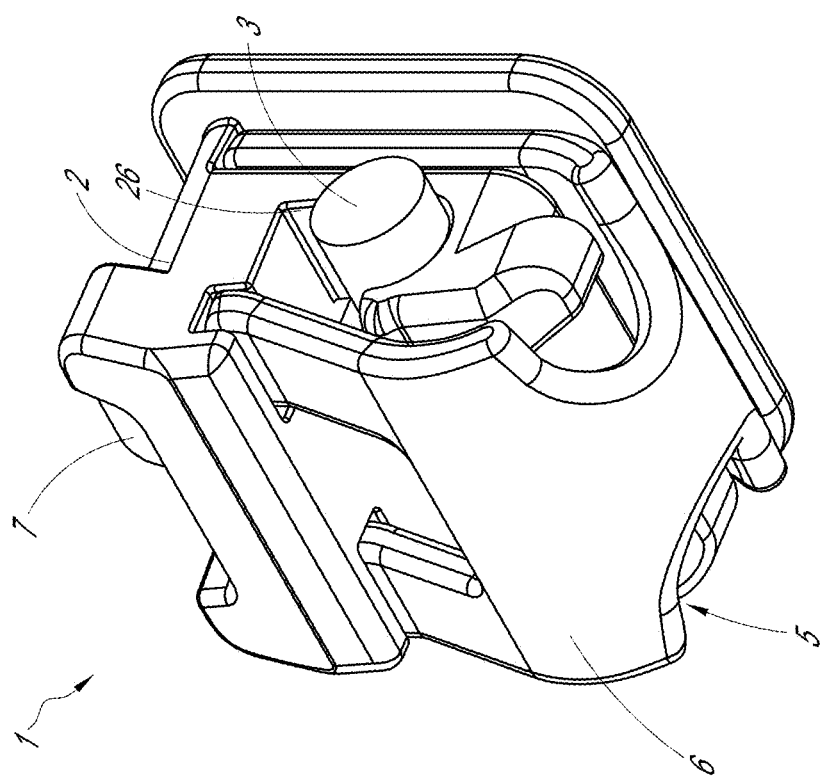
FIG. 3A is a front, top, right side perspective view of an orthodontic device, according to another embodiment.
Figure 3C:
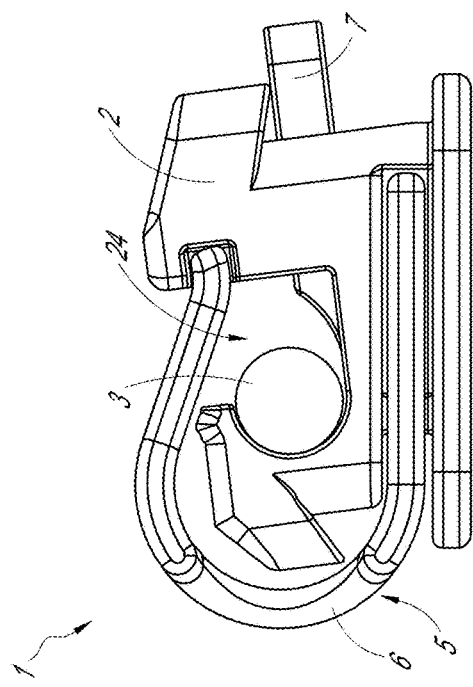
FIG. 3C is a schematic side sectional view of the orthodontic device of FIG. 3B in the open mode.
Figure 3D:
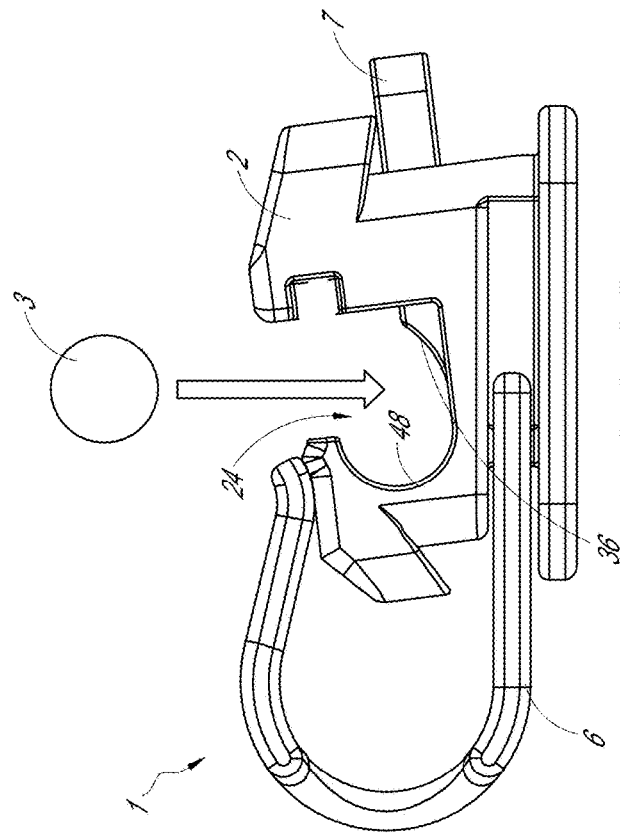
FIG. 3D is a schematic side sectional view of the orthodontic device of FIG. 3A in a sliding mode.
Figure 3E:
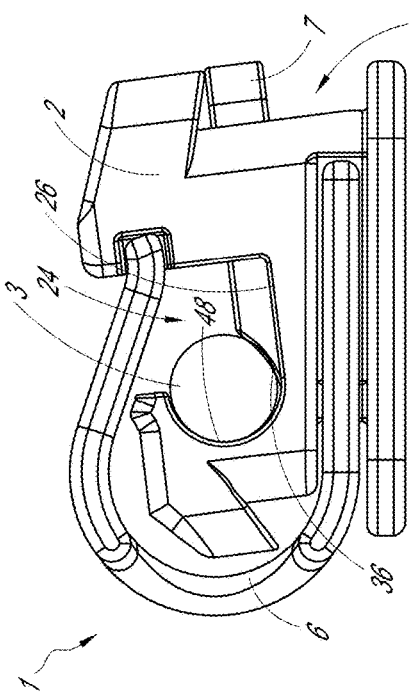
FIG. 3E is a schematic side sectional view of the orthodontic device of FIGS. 3A-3B in a locked mode.

FIGS. 3A-3E illustrate an orthodontic device 1 that includes a bracket 2 and a locking assembly 5 mechanically connected to the bracket 2, according to another embodiment. Unless otherwise noted, the components of FIGS. 3A-3E may be the same as or generally similar to like-numbered components of FIGS. 1A-2O, and may function or operate in a generally similar manner. For example, as with FIGS. 2A-2O, the locking assembly 5 can include a clip 6 and wedge member 7 that cooperate with one another and with the bracket 2 to provide an open mode, a sliding support mode, and a locked support mode. In particular, FIG. 3A is a front, top, right side perspective view of the orthodontic device 1 in a sliding mode. FIG. 3B is a front, top, right side perspective view of the orthodontic device 1 of FIG. 3A in an open mode. FIG. 3C is a schematic side sectional view of the orthodontic device 1 of FIG. 3B in the open mode. FIG. 3D is a schematic side sectional view of the orthodontic device 1 of FIG. 3A in the sliding mode. FIG. 3E is a schematic side sectional view of the orthodontic device 1 of FIGS. 3A-3B in a locked mode.

The device 1 and its components can be combined with any suitable features of the embodiment of FIGS. 2A-2O, and may be positioned on any suitable surface of the tooth 10 to be treated (for example, a lingual surface, or a buccal or labial surface). The device 1 may also be oriented relative to the tooth 10 in any suitable manner (for example, with the front side facing gingivally or occlusally). Unlike the embodiment of FIGS. 2A-2O, however, the wedge member 7 can cooperate with a clamping surface 48 exposed to the retention cavity 24 of the bracket 2 to lock the wire 3 in the locked mode. Further, unlike the embodiment of FIGS. 2A-2O, the tapered wedge surface 36 can be disposed at a front end of the wedge member 7. As shown, for example, the wedge surface 36 can be angled downwardly and forwardly, rather than downwardly and rearwardly. The wedge surface 36 can accordingly comprise a ramped or tapered surface that can press against the wire 3 when in the locked mode.

As shown in FIG. 3C, in the open mode, the clip 6 can be moved or kept in a forward or front position to expose the retention cavity 24. The wedge member 7 can be moved or kept in a rear position. The wire 3 can be inserted into the retention cavity 24. In FIG. 3D, the clip 6 can be moved to a rear position to place the device 1 in a sliding mode. As shown, the wedge member 7 may remain in the rear position. Turning to FIG. 3E, the device 1 can be moved to the locked mode by translating the wedge member 7 forward to a front position such that the tapered wedge surface 36 can press the wire 3 against the clamping surface 48 of the bracket 2. In some embodiments, the clamping surface 48 can have a curvature complementary to that of the wire 3. In some embodiments, the tapered wedge surface 36 may also have a curvature complementary to the curvature of the wire 3. In the locked mode, the wedge surface 36 may be disposed vertically between the wire and the retention surface of the bracket 2.

As with the embodiment of FIGS. 2A-2O, the locking assembly 5 of FIGS. 3A-3E in the locked mode can apply a sufficiently large force against the wire 3 to prevent sliding of the wire 3 relative to the bracket 2 when subject to typical orthodontic forces. In various embodiments, for example, the locking assembly 5 can exert frictional forces in the locked and sliding modes in a manner and with relative magnitudes as described above in connection with FIGS. 2A-2O.

Figure 4C:
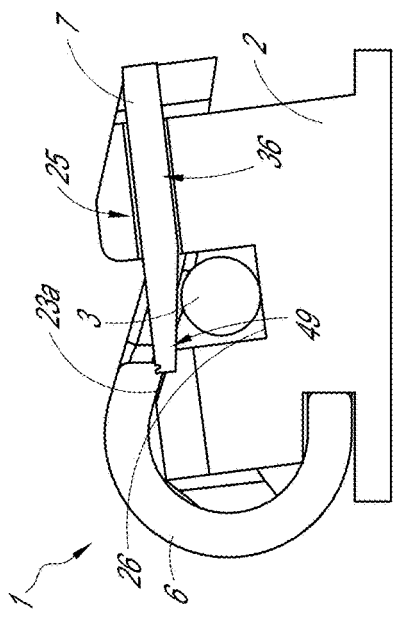
FIG. 4C is a schematic side sectional view of the orthodontic device of FIG. 4A in a sliding mode.
Figure 4D:
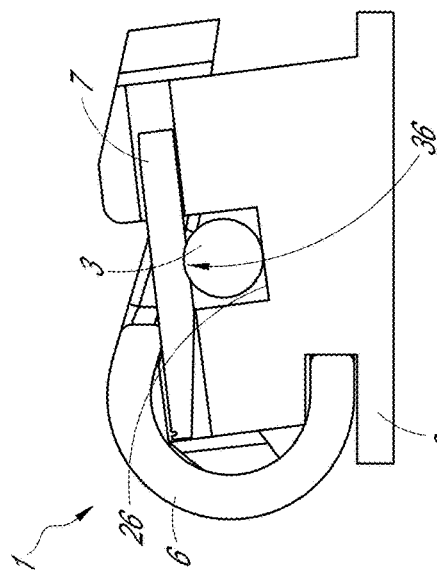
FIG. 4D is a schematic side sectional view of the orthodontic device of FIG. 4A in a locked mode.
Figure 4A:
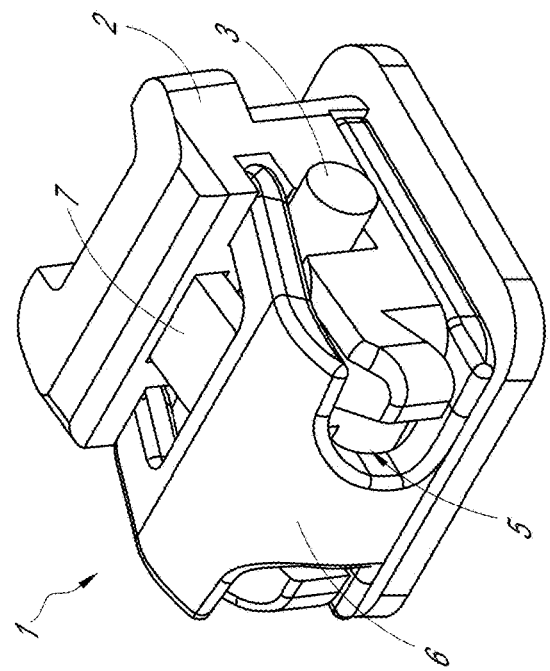
FIG. 4A is a front, top, right side perspective view of an orthodontic device, according to another embodiment.
Figure 4B:
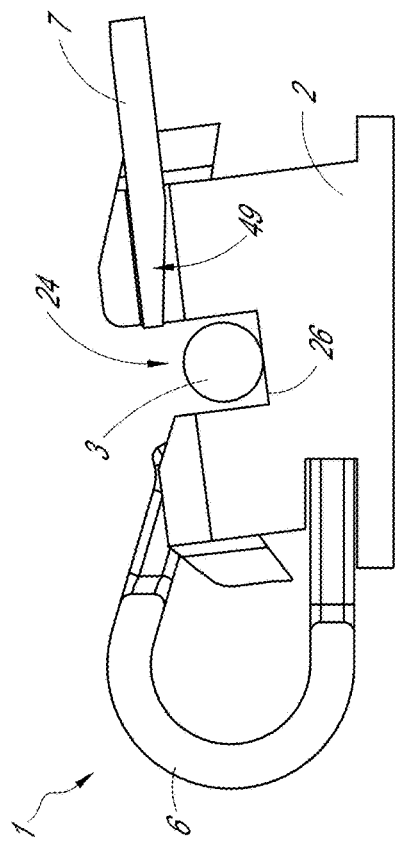
FIG. 4B is a schematic side sectional view of the orthodontic device of FIG. 4A in an open mode.

FIGS. 4A-4D illustrate an orthodontic device 1 that includes a bracket 2 and a locking assembly 5 mechanically connected to the bracket 2, according to another embodiment. Unless otherwise noted, the components of FIGS. 4A-4D may be the same as or generally similar to like-numbered components of FIGS. 1A-3E, and may function or operate in a generally similar manner. For example, as with FIGS. 2A-3E, the locking assembly 5 can include a clip 6 and wedge member 7 that cooperate with one another and with the bracket 2 to provide an open mode, a sliding support mode, and a locked support mode. In particular, FIG. 4A is a front, top, right side perspective view of the orthodontic device 1. FIG. 4B is a schematic side sectional view of the orthodontic device 1 of FIG. 4A in an open mode. FIG. 4C is a schematic side sectional view of the orthodontic device 1 of FIG. 4A in a sliding mode. FIG. 4D is a schematic side sectional view of the orthodontic device 1 of FIG. 4A in a locked mode.

The device 1 of FIGS. 4A-4D and its components can be combined with any suitable features of the embodiments of FIGS. 2A-3E, and may be positioned on any suitable surface of the tooth 10 to be treated (for example, a lingual surface, or a buccal or labial surface). The device 1 may also be oriented relative to the tooth 10 in any suitable manner (for example, with the front side facing gingivally or occlusally). Unlike the embodiments of FIGS. 2A-3E, however, the wedge member 7 can cooperate with a clamping surface that comprises the retention surface 26 at the floor of the retention cavity 24 of the bracket 2 to lock the wire 3 in the locked mode. The wedge member 7 can be positioned vertically above the wire 3 such that, in a locked mode, the wire 3 can be disposed between the wedge member 7 and the retention surface 26 of the bracket 2. In the locked mode, the wedge member 7 can be positioned vertically between the clip 6 and the wire 3. Further, unlike the embodiment of FIGS. 3A-3D, the wedge surface 36 can be disposed at a middle portion of the wedge member 7, rather than at a front end. Moreover, the wedge surface 36 that contacts the wire 3 in the locked mode may or may not be tapered or angled. In some embodiments, the wedge surface 36 can be generally planar along the transverse axis y. In addition, the wedge member 7 can include a tapered front surface 49 at a front end of the wedge member 7. The tapered front surface 49 can be generally angled or tapered downwardly and rearwardly from the front end of the wedge member 7 along a lower surface of the wedge member 7.

As shown in FIG. 4B, in the open mode, the clip 6 can be moved or kept in a forward or front position to expose the retention cavity 24. The wedge member 7 can be moved or kept in a rear position. The wire 3 can be inserted into the retention cavity 24 and onto the retention surface 26. In FIG. 4C, the clip 6 can be moved to a rear position, and the wedge member 7 can be moved to a first forward or front position to place the device 1 in a sliding mode. As shown, in the first forward position, the tapered front surface 49 of the wedge member 7 can mate or engage with the front wall 23a of the bracket 2 in the sliding mode. In the sliding mode, the tapered front surface 49 may provide a clearance or gap between the wedge member 7 and the wire 3 to permit passive or active ligation in the sliding mode. In the sliding mode, the clamping surface 36 may not be exposed to the retention cavity 24 but may instead remain in the transverse cavity 25. Turning to FIG. 4D, the device 1 can be moved to the locked mode by translating the wedge member 7 forward to a second forward or front position that is forward of the first front position. In the second forward position of the locked mode, the wedge surface 36, which can project or extend downwardly relative to the tapered front surface 49, can press the wire 3 against the retention surface 26 of the bracket 2.

As with the embodiment of FIGS. 2A-3E, the locking assembly 5 of FIGS. 4A-4D in the locked mode can apply a sufficiently large force against the wire 3 to prevent sliding of the wire 3 relative to the bracket 2 when subject to typical orthodontic forces. In various embodiments, for example, the locking assembly 5 of FIGS. 4A-4D can exert frictional forces in the locked and sliding modes in a manner and with relative magnitudes as described above in connection with FIGS. 2A-2O.

FIGS. 5A-5D illustrate an orthodontic device 1 that includes a bracket 2 and a locking assembly 5 mechanically connected to the bracket 2, according to another embodiment. Unless otherwise noted, the components of FIGS. 5A-5D may be the same as or generally similar to like-numbered components of FIGS. 1A-4D, and may function or operate in a generally similar manner. For example, as with FIGS. 2A-4D, the locking assembly 5 can include a clip 6 and wedge member 7 that cooperate with one another and with the bracket 2 to provide an open mode, a sliding support mode, and a locked support mode. In particular, FIG. 5A is a front, top, right side perspective view of the orthodontic device 1. FIG. 5B is a schematic side sectional view of the orthodontic device 1 of FIG. 5A in an open mode. FIG. 5C is a schematic side sectional view of the orthodontic device 1 of FIG. 5A in a sliding mode. FIG. 5D is a schematic side sectional view of the orthodontic device 1 of FIG. 5A in a locked mode.

The device 1 of FIGS. 5A-5D and its components can be combined with any suitable features of the embodiments of FIGS. 2A-4D, and may be positioned on any suitable surface of the tooth 10 to be treated (for example, a lingual surface, or a buccal or labial surface). The device 1 may also be oriented relative to the tooth 10 in any suitable manner (for example, with the front side facing gingivally or occlusally). As with the embodiment of FIGS. 4A-4D, the wedge member 7 can cooperate with a clamping surface that comprises the retention surface 26 at the floor of the retention cavity 24 of the bracket 2 to lock the wire 3 in the locked mode. The wedge member 7 can be positioned vertically above the wire 3 such that, in a locked mode, the wire 3 can be disposed between the wedge member 7 and the retention surface 26 of the bracket 2. Further, as with the embodiment of FIGS. 4A-4D, the wedge surface 36 can be disposed at a middle portion of the wedge member 7, rather than at a front end. Moreover, the wedge surface 36 that contacts the wire 3 in the locked mode may or may not be tapered or angled. In some embodiments, the wedge surface 36 can be generally planar along the transverse axis y. Unlike the embodiment of FIGS. 4A-4D, however, the wedge member 7 be inserted through a transverse cavity 25 that extends rearwardly at least partially through the clip 6 and at least partially through a portion of the bracket 2. In some embodiments, the transverse cavity 25 extends entirely through both the bracket 2 and the clip 6. In other embodiments, the transverse cavity 25 extends only partially through one or both the bracket 2 and the clip 6. In addition, the wedge member 7 can include a tapered rear surface 49' at a rear end of the wedge member 7. The tapered rear surface 49' can be generally angled or tapered upwardly and rearwardly from the front end of the wedge member 7 along a lower surface of the wedge member 7.

As shown in FIG. 5B, in the open mode, the clip 6 and the wedge member 7 can be moved or kept in a forward or front position to expose the retention cavity 24. The wire 3 can be inserted into the retention cavity 24 and onto the retention surface 26. In FIG. 5C, the clip 6 can be moved to a rear position, and the wedge member 7 can be moved to a first rear position to place the device 1 in a sliding mode. As shown, in the first rear position, the tapered rear surface 49' of the wedge member 7 can mate or engage with the rear wall 23b of the bracket 2 in the sliding mode, and can partially extend into a portion of the transverse cavity 25 formed through the rear wall 23b. In the sliding mode, the tapered rear surface 49' may provide a clearance or gap between the wedge member 7 and the wire 3 to permit passive or active ligation in the sliding mode. In the sliding mode, the clamping surface 36 may not be exposed to the retention cavity 24 but may instead remain in the transverse cavity 25. Turning to FIG. 5D, the device 1 can be moved to the locked mode by translating the wedge member 7 rearward to a second rear position that is rearward of the first rear position. In the second rear position of the locked mode, the wedge surface 36, which can project or extend downwardly relative to the tapered rear surface 49', can press the wire 3 against the retention surface 26 of the bracket 2.

As with the embodiment of FIGS. 2A-4D, the locking assembly 5 of FIGS. 5A-5D in the locked mode can apply a sufficiently large force against the wire 3 to prevent sliding of the wire 3 relative to the bracket 2 when subject to typical orthodontic forces. In various embodiments, for example, the locking assembly 5 of FIGS. 5A-5D can exert frictional forces in the locked and sliding modes in a manner and with relative magnitudes as described above in connection with FIGS. 2A-2O.

B. Orthodontic Devices Having Locking Assemblies with Rotary Members

FIGS. 6A-6E illustrate one embodiment of an orthodontic device 2 that includes a bracket 2 and a locking assembly 5 mechanically connected to the bracket 2. In some embodiments, the locking assembly 5 can include a rotary member 50 instead of a wedge member that engages with the bracket 2 to secure the wire 3 to the bracket 2 in a plurality of operational or support modes. The rotary member 50 can cooperate with the bracket 2 to provide an open operational mode, a sliding operational mode, and a locked operational mode. In the illustrated embodiment, the clip 6 of FIGS. 2A-5D may be omitted, which can simplify manufacturing and installation of the device 1.

FIG. 6A is a schematic front, top, right side perspective view of the orthodontic device 1 with rotary member 50 in an open mode, according to one embodiment. FIG. 6B is a top plan view of the orthodontic device 1 of FIG. 6B. FIG. 6C is a schematic side sectional view of the orthodontic device 1 of FIG. 6A, shown in the open mode. FIG. 6D is a schematic side sectional view of the orthodontic device 1 of FIG. 6A, shown in a sliding mode. FIG. 6E is a schematic side sectional view of the orthodontic device 1 of FIG. 6A, shown in a locked mode. Unless otherwise noted, components of FIGS. 6A-6E may be the same as or generally similar to like-numbered components of FIGS. 1A-5D, and may function or operate in a generally similar manner.

As shown in FIG. 6A-6E, the rotary member 50 can be disposed in an interior cavity 56 of the bracket 2. The bracket 2 can comprise a base 2 and a support portion 29 extending from the base 22. The interior cavity 56 can be disposed in the support portion 29. In other embodiments, the rotary member 50 can be disposed over an outside surface of the bracket 2. The rotary member 50 can include a wire receiving aperture 51 sized and shaped to receive the wire 3. The rotary member 50 can comprise a generally C-shaped structure having opposing truncated end surfaces 57a, 57b. The wire receiving aperture 51 can be disposed circumferentially between the truncated end surfaces 57a, 57b. In the illustrated embodiment, the wire 3 is a polygonal (e.g., rectangular) wire, but in other embodiments, the wire 3 can comprise a rounded (e.g., circular or elliptical) wire. The rotary member 50 can comprise an outer curved bearing surface 53 (which can delimit the C-shaped structure of the rotary member 50) and an inner curved cam surface 54. The outer curved bearing surface 56 can be nested within and/or face an opposing follower surface 52 of the bracket 2. The curved follower surface 52 can be exposed to the interior cavity 56 of the bracket 2. As shown, the curvature of the outer bearing surface 53 may be complementary to the curvature of the follower surface 52 to provide smooth rotational engagement between the bearing surface 53 and the follower surface 52.

The rotary member 50 can mechanically and rotationally couple to the bracket 2 in any suitable manner. For example, in some embodiments, a pin can be provided to rotationally connect the bracket 2 with the rotary member 50. In other embodiments, the bracket 2 can comprise a track circumferentially along the follower surface 52, and a corresponding ridge circumferentially along the bearing surface 53 that fits within the track (or vice versa). In still other embodiments, a projection on one of the bracket 2 and the rotary member 50 can extend laterally along the x-axis into a circumferential groove in the other of the bracket 2 and the rotary member 50 to rotatably connect the rotary member 50 with the bracket 2.

As shown in FIGS. 6A-6C, in the open mode, the rotary member 50 can be oriented such that the wire receiving aperture 51 is aligned with the retention cavity 24 of the bracket 2. The truncated end surfaces 57a, 57b can be aligned with neighboring upper walls 58a, 58b of the bracket 2 that are spaced apart along the transverse axis y to provide access to the retention cavity 24 of the bracket 2. The wire 3 can be inserted into the wire receiving aperture 51 of the rotary member 50 and the retention cavity 24 of the bracket 2. As shown in FIG. 6C, the wire 3 can be supported by the retention surface 26 in the open mode of the device 1. In some embodiments, the interior cam surface 54 may be spaced from the wire 3 in the open mode.

As shown in FIGS. 6C-6E, the interior cam surface 54 can include a plurality of connected component surfaces 54a-54d that are angled relative to one another. The component surfaces 54a-54d may be shaped to have similar or different surface profiles. The surface profiles of the component surfaces 54a-54d and relative angles between the component surfaces 54a-54d can be selected to provide sliding and locked modes in cooperation with the bracket 2. In the embodiment shown in FIGS. 6C-6E, the first, second, and third component surfaces 54a-54c can have generally planar surface profiles. The fourth component surface 54d can have a rounded or curved profile. In other embodiments, the component surfaces 54a-54d can have profiles different from those shown in FIGS. 6C-6E. Moreover, although four component surfaces 54a-54d are shown in FIGS. 6C-6E, in other embodiments, the interior cam surface 54 can include fewer than four or more than four component surfaces.

The clinician can switch the device 1 to the sliding mode by using a tool to engage the outer bearing surface 53 of the rotary member 50 through a transverse cavity 25 that is disposed transverse to the retention cavity 24 and that extends to the interior cavity 56. As shown in FIG. 6D, the rotary member 50 can be rotated about the lateral axis x in a rotational direction R (clockwise about the −x axis) relative to the bracket 2 to a first rotational position that corresponds to the sliding mode. In the sliding mode, the wire 3 can contact a portion of the third component surface 54c in some embodiments. In other embodiments, a gap or space can be provided between the cam surface 54 and the wire 3 in the sliding mode. If the cam surface 54 contacts the wire 3 in the sliding mode for providing active ligation, the contacted portion of the third component surface 54c may exert a force against the wire 3 that is sufficiently small so as to enable the wire 3 to slide along the lateral axis x relative to the bracket 2. For example, in the arrangement of FIG. 6D, a corner portion of the wire 3 can contact the third component surface 54. The relatively small contact area between the corner portion and the third component surface 54 may provide some frictional resistance but at forces sufficiently small so as to enable the wire 3 to slide relative to the bracket 3 when subjected to typical orthodontic forces.

In various embodiments, the clinician can determine that the rotary member 50 is in the sliding mode based on tactile feedback when the corner portion of the wire 3 contacts the interior cam surface 54. In other embodiments, such as the embodiments of FIGS. 6I-N, the rotary member 50 or the bracket 2 can include mechanical detents or other mechanisms by which the device 1 can be placed in the sliding mode.

Turning to FIG. 6E, the clinician can switch the device 1 into the locked or non-sliding mode by further rotating the rotary member 50 relative to the bracket 2 in the rotational direction R about the lateral axis x to a second rotational position that corresponds to the locked mode. In the locked mode, a larger surface area of the wire 3 contacts the third component surface 54c so as to provide significantly increased locking forces as compared with the sliding mode. For example, as shown in FIG. 6D, most or all of a side of the wire 3 can contact the third component surface 54c with a force sufficient to prevent the wire 3 from sliding laterally along the x-axis relative to the bracket 2. Thus, the interior cam surface 54 (and its respective component surfaces 54a-54d) can be selectively formed so as to clamp the wire 3 against the retention surface 26 with sufficient force so as to prevent sliding in the locked mode.

In various embodiments, the clinician can determine that the rotary member 50 is in the locked or non-sliding mode based on tactile feedback when the increased surface area of wire 3 contacts the interior cam surface 54. In other embodiments, the rotary member 50 or the bracket 2 can include mechanical detents or other mechanisms by which the device 1 can be placed in the locked mode. In the illustrated embodiment, the rotary member 50 is rotated about the lateral x-axis in the same direction R in two stages. In other embodiments, the rotary member 50 can be bi-directional such that the rotary member 50 can be rotated in opposite directions about the x-axis to move from the open mode to the sliding mode, and from the open mode to the locked mode. For example, in some embodiments, the rotary member 50 can be rotated about a first rotational direction to switch from the open mode to the sliding mode. The rotary member 50 can be rotated about a second rotational direction opposite the first direction to switch from open mode to the locked mode (or from the sliding mode to the locked mode). Still other arrangements may be suitable.

As with the embodiment of FIGS. 2A-5D, the locking assembly 5 with rotary member 50 of FIGS. 6A-6E in the locked or non-sliding mode can apply a sufficiently large force against the wire 3 to prevent sliding of the wire 3 relative to the bracket 2 when subject to typical orthodontic forces. For example, in the locked or non-sliding mode, the locking assembly 5 can apply forces that are sufficiently large so as to deform the wire 3. Deformation of the wire 3 by the locking assembly 5 can improve the locking of the wire 3 in the locked mode. Furthermore, the locking forces can move or rotate the wire 3 to assist in locking the wire 3 in the locking mode. In various embodiments, for example, the locking assembly 5 in the locking or non-sliding mode can exert a frictional force against the wire 3 that is at least 50 cN, at least 75 cN, at least 100 cN, at least 150 cN, at least 200 cN, at least 250 cN, at least 300 cN, at least 350 cN, at least 500 cN, or at least 1000 cN. The locking assembly 5 can exert a frictional force against the wire that is in a range of 50 cN to 800 cN, in a range of 50 cN to 200 cN, in a range of 50 cN to 100 cN, in a range of 50 cN to 2000 cN, in a range of 50 cN to 1000 cN, in a range of 75 cN to 2000 cN, in a range of 75 cN to 1000 cN, in a range of 100 cN to 750 cN, in a range of 100 cN to 700 cN, in a range of 100 cN to 600 cN, in a range of 300 cN to 2000 cN, in a range of 350 cN to 2000 cN, or in a range of 500 cN to 2000 cN. In various embodiments, in the locking or non-sliding mode, the locking or frictional forces may be sufficiently high so as to indent or otherwise locally deform the wire.

In the sliding mode, the locking assembly 5 can exert a frictional force against the wire 3 that is less than the frictional force exerted in the locked mode. For example, in various embodiments, in the sliding mode, the locking assembly 5 can exert a frictional force of less than 50 cN, or less than 100 cN against the wire. In various embodiments, in the sliding mode, the locking assembly 5 can exert a frictional force against the wire in a range of 0 cN to 100 cN, in a range of 0 cN to 75 cN, or in a range of 0 cN to 50 cN. In various embodiments, the locking assembly 5 in the sliding mode can impart a frictional force against the wire 3 that is less than 90% of the frictional force imparted against the wire 3 in the locked mode, less than 80% of the frictional force imparted against the wire 3 in the locked mode, less than 70% of the frictional force imparted against the wire 3 in the locked mode, less than 60% of the frictional force imparted against the wire 3 in the locked mode, or less than 50% of the frictional force imparted against the wire 3 in the locked mode, In some embodiments, the frictional force imparted against the wire 3 in the sliding mode is in a range of 0% to 80% of the frictional force imparted against the wire in the locked mode, in a range of 0% to 50% of the frictional force imparted against the wire in the locked mode, or in a range of 25% to 80% of the frictional force imparted against the wire in the locked mode.

Accordingly, in various embodiments, the locking assembly 5 can be movable from a first configuration that allows sliding of the orthodontic wire 3 relative to the bracket 2 (e.g., a first sliding mode) to a second configuration that prevents sliding of the orthodontic wire 3 relative to the bracket 2 when the orthodontic wire 3 is subject to typical orthodontic forces during use of the orthodontic device (e.g., a second locked mode). In the second configuration (or the second locked or non-sliding mode), the wire 3 can be locked so as to substantially prevent sliding of the wire 3 relative to the bracket 2. For example, the second configuration or locked mode can permit less sliding of the wire 3 than the amount of sliding permitted by typical active self-ligating orthodontic devices. Thus, the locked or non-sliding mode or configuration may permit a very small amount of sliding (e.g., less than 1 mm, less than 0.5 mm, or less than 0.1 mm) that is less than the amount of sliding permitted by conventional active orthodontic devices. Further, it should be appreciated that the sliding and locked (e.g., non-sliding) modes described herein may be operated along a continuum such that the locking assembly 5 can be placed in multiple positions to enable sliding and/or locking. In some embodiments, therefore, the clinician can adjust the locking assembly 5 along a continuum of positions to express a range of frictional forces against the wire 3 in the sliding mode. Similarly, in some embodiments, multiple positions of the locking assembly 5 can serve to lock the wire 3 in the locked or non-sliding mode. Accordingly, the locking assembly 5 can be configured to apply a continuously variable frictional force to the wire 3. The continuously variable frictional force can be applied to move the wire 3 between the sliding and locked configurations. The locking assembly 5 can apply continuously variable frictional forces within the sliding and/or locked modes. In other embodiments, however, the sliding and locked modes can comprise a discrete number of modes, as opposed to a continuum of modes. For example, the locking assembly 5 can be configured to adjust a frictional force to the wire 3 in a step-wise manner. The locking assembly 5 can be configured to move between the sliding and locked configurations in a step-wise manner.

FIG. 6F is a first schematic perspective view of a rotary member 50' according to another embodiment. FIG. 6G is a second schematic perspective view of the rotary member 50' of FIG. 6F. FIG. 6H is a schematic perspective view of a bracket 2' that can be used in cooperation with the rotary member 50' of FIGS. 6F-6G. The rotary member 50' and the bracket 2' of FIGS. 6F-6H can be used instead of the rotary member 50 and bracket 2 shown in FIGS. 6A-6E. Unless otherwise noted, the components of FIGS. 6F-6H can be the same as or generally similar to like-numbered components of FIGS. 6A-6E, and can function or operate in a generally similar manner. In FIGS. 6F-6G, first and second tool access apertures 55a, 55b can be provided through the rotary body 50'. The clinician can engage the rotary member 50' with a tool by way of the access apertures 55a, 55b. For example, the clinician can insert a tool into the apertures 55a, 55b by way of opposing transverse cavities 25a, 25b of the bracket 2', as shown in FIG. 6H. Thus, the rotary member 50' and bracket 2' shown in FIGS. 6F-6H can provided improved access to the clinician for switching between the open, sliding, and locked modes of the device 1.

FIGS. 6I-6K illustrate an orthodontic device 1 having a detent mechanism 105 to provide tactile feedback to the clinician indicative of the mode in which the device 1 is placed (e.g., a sliding mode, a locking mode, etc.), according to various embodiments. Unless otherwise noted, components of FIGS. 6I-6K may be the same as or generally similar to like-numbered components of FIGS. 6A-6H, and can be combined with the components of FIGS. 6A-6H. In FIGS. 6I-6K, the detent mechanism 105 can include a first slot 105a and a second slot 105b circumferentially spaced from the first slot 105a. A tab 107 can extend through a circumferential track 106. The tab 107 and track 106 can maintain the rotary member 50 within the bracket 2. The clinician can engage the tab 107 manually or with a tool to rotate the rotary member 50 from the open mode to the sliding mode and/or to the locking mode. In the sliding mode, the tab 107 can include a projecting portion 107a projecting radially outwardly slightly, which can engage with the first slot 105a to indicate to the clinician that the device 1 is in the sliding mode. The clinician can rotate the tab 107 and rotary member 50 to place the device 1 in the locked mode. The projecting portion 107a of the tab 107 can engage with the second slot 105a to indicate to the clinician that the device 1 is in the locked mode.

Figure 6M:
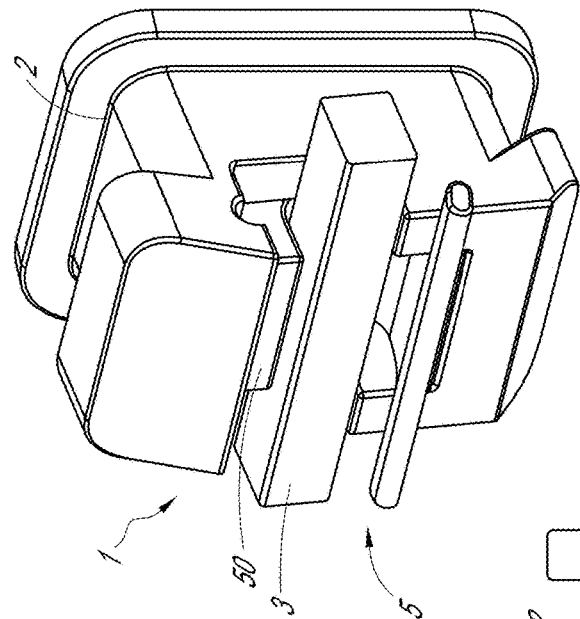
FIGS. 6L-6N illustrate an orthodontic device having a detent mechanism, according to another embodiment.
Figure 6N:
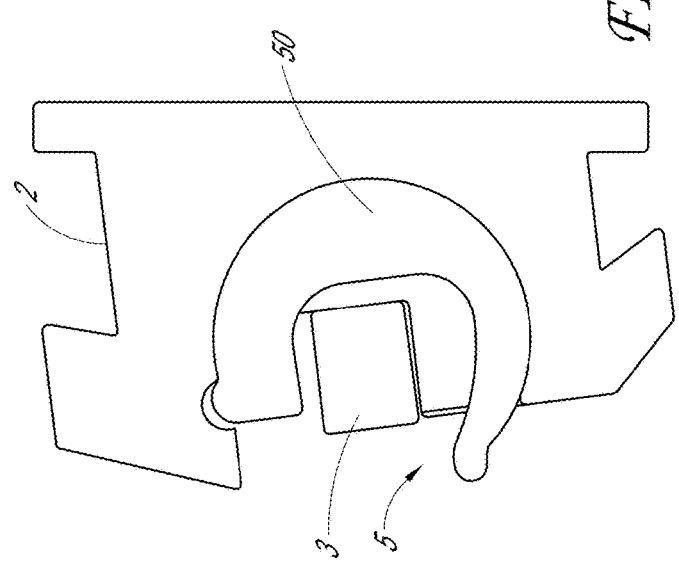
Figure 6L:
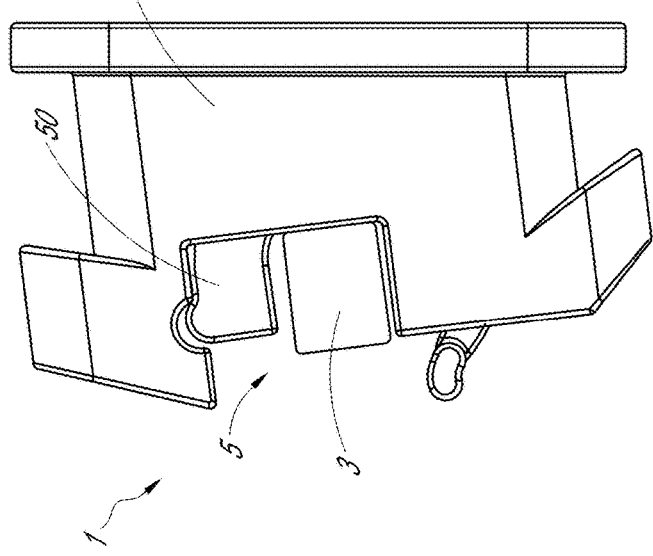

FIGS. 6L-6N illustrate an orthodontic device 1 having a detent mechanism 105, according to another embodiment. Unless otherwise noted, components of FIGS. 6L-6N may be the same as or generally similar to like-numbered components of FIGS. 6A-6K. For example, the device 1 includes the detent mechanism 105 which is generally similar to the detent mechanism 1 of FIGS. 6I-6K, except the tab 107 in FIGS. 6L-6N is on an opposing side of the rotary member 50 as compared to the tab 107 in FIGS. 6I-6K.

C. Orthodontic Devices with Other Types of Locking Assemblies

Additional types of locking assemblies 5 may be used to provide an open operating mode, a sliding mode, and a locked mode. FIGS. 7A-12C illustrate additional examples of orthodontic devices 1 with other types of locking assemblies 5.

Figure 7A:
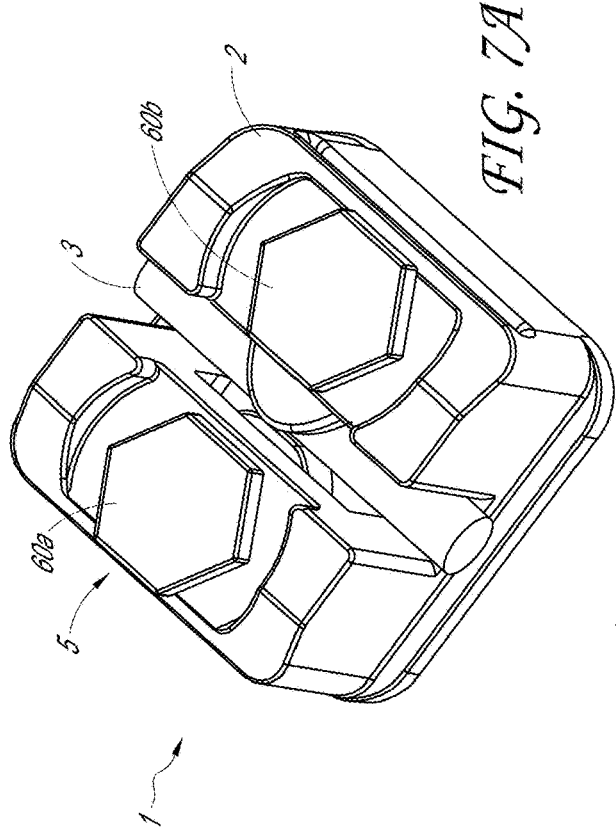
FIG. 7A is a schematic perspective view of an orthodontic device that includes a dual cam locking assembly shown in a locked mode, according to another embodiment.
Figure 7D:
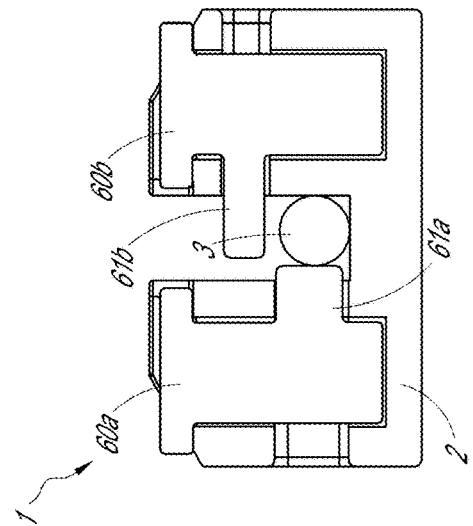
FIG. 7D is a schematic side sectional view of the orthodontic device of FIG. 7A in a locked mode.
Figure 7C:
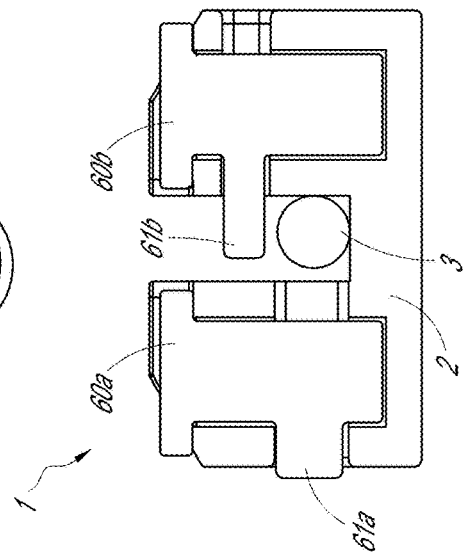
FIG. 7C is a schematic side sectional view of the orthodontic device of FIG. 7A in a sliding mode.
Figure 7B:
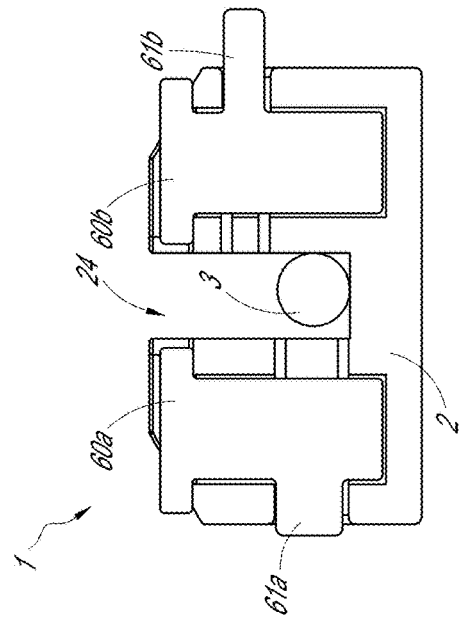
FIG. 7B is a schematic side sectional view of the orthodontic device of FIG. 7A in an open mode.

FIG. 7A is a schematic perspective view of an orthodontic device 1 that includes a dual cam locking assembly 5 shown in a locked mode, according to another embodiment. FIG. 7B is a schematic side sectional view of the orthodontic device 1 of FIG. 7A in an open mode. FIG. 7C is a schematic side sectional view of the orthodontic device 1 of FIG. 7A in a sliding mode. FIG. 7D is a schematic side sectional view of the orthodontic device 1 of FIG. 7A in a locked mode. Unless otherwise noted, components in FIGS. 7A-7D may be the same as or generally similar to like-numbered components of FIGS. 1A-6H, and may function or operate in a generally-similar manner.

The device 1 of FIGS. 7A-7D can include a locking assembly 5 with a pair of rotary members comprising cams 60a, 60b disposed on opposite sides of the retention cavity 24 and coupled to the bracket 2. The cams 60a, 60b can each include corresponding outwardly extending projections 61a, 61b. The projections 61a, 61b can be disposed at different vertical heights. For example, the first projection 61a can be disposed at a lower vertical position relative to the z-axis than the second projection 61b. Further, the length of the first projection 61a can be shorter than the length of the second projection 61b. In the open mode shown in FIG. 7B, the cams 60a, 60b can be rotated (for example, with a tool) such that the projections 61a, 61b face away or otherwise do not project into the retention cavity 24.

Turning to FIG. 7C, the clinician can use a tool or hand to rotate the second cam 60b about the vertical axis z to position the second projection 61b in the retention cavity 24. As shown, the second projection 61b can extend over the wire 3 to retain the wire 3 within the retention cavity 24. The second projection 61b can contact the wire 3 for active ligation, or can be spaced away from the wire 3 for passive ligation. In the sliding mode, the wire 3 can laterally slide along the lateral axis x under expression of typical orthodontic forces.

Turning to FIG. 7D, the clinician can use a tool or hand to rotate the first cam 60a about the vertical axis z to position the first projection 61a in the retention cavity 24. The length of the first projection 61a can be selected such that when the first cam 60a is rotate about the vertical axis z the first projection 61a can contact and impart a force against the wire 3. The locking assembly 5 with cams 60a, 60b shown in FIGS. 7A-7D in the locked mode can apply a sufficiently large force against the wire 3 to prevent sliding of the wire 3 relative to the bracket 2 when subject to typical orthodontic forces, as explained above in connection with FIGS. 2A-2O and 6A-6N.

Figure 8A:
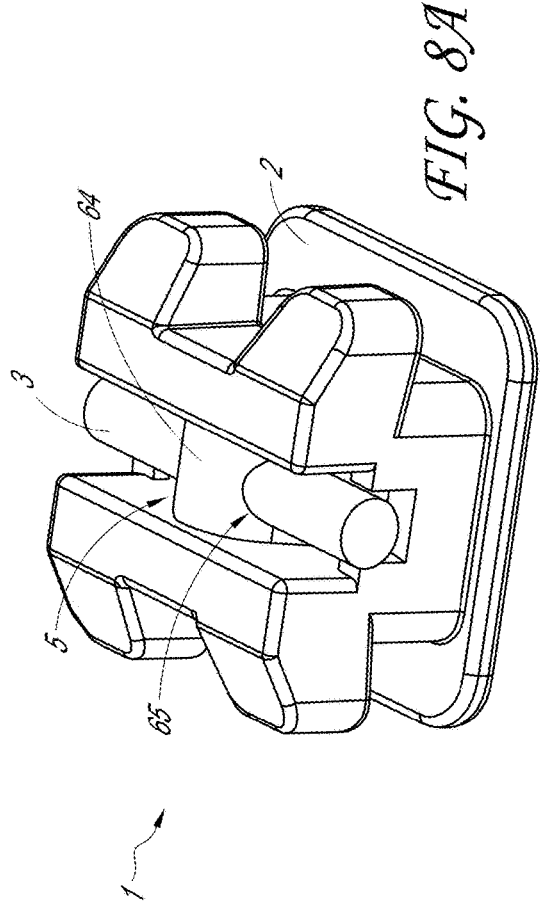
FIG. 8A is a schematic perspective view of an orthodontic device that includes a locking assembly comprising a crab washer, according to another embodiment.
Figure 8C:
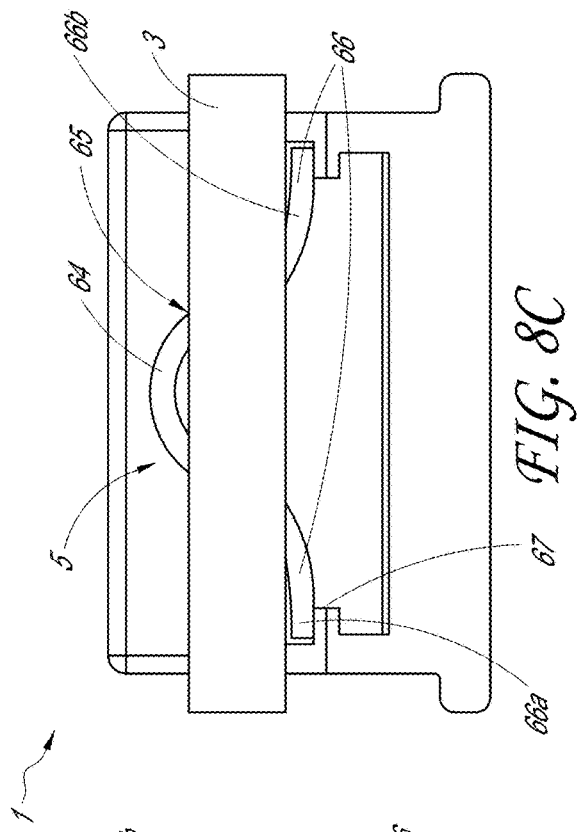
FIG. 8C is a schematic side sectional view of the orthodontic device of FIG. 8A in a locked mode.
Figure 8B:
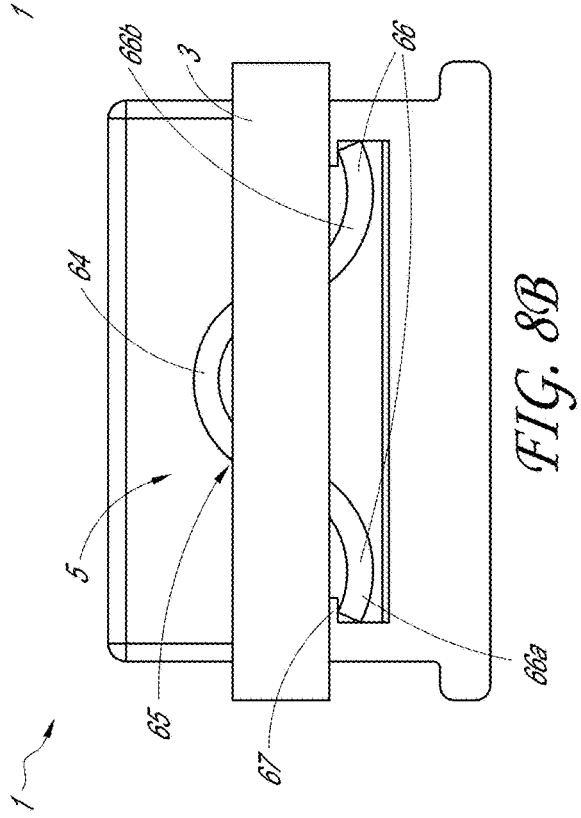
FIG. 8B is a schematic side sectional view of the orthodontic device of FIG. 8A in a sliding mode.

FIG. 8A is a schematic perspective view of an orthodontic device 1 that includes a locking assembly 5 comprising a crab washer 64, according to another embodiment. FIG. 8B is a schematic side sectional view of the orthodontic device 1 of FIG. 8A in a sliding mode. FIG. 8C is a schematic side sectional view of the orthodontic device 1 of FIG. 8A in a locked mode. Unless otherwise noted, components in FIGS. 8A-8C may be the same as or generally similar to like-numbered components of FIGS. 1A-7D, and may function or operate in a generally-similar manner.

The device 1 of FIGS. 8A-8C can include a locking assembly 5 having a crab washer 64 mechanically coupled with the bracket 2. The wire 3 can be inserted into holes 65 formed in the crab washer 64. The bracket 2 can include a pair of laterally-extending ledges 67 that engage with wing portions 66a, 66b of the crab washer 64. The wing portions 66a, 66b can be upwardly-biased. In the sliding mode of FIG. 8B, the ledges 67 can deflect the wing portions 66a, 66b downwardly such that the wire 3 can slide through the holes 65 relative to the bracket 2. In the locked mode of FIG. 8C, the clinician can release the wing portions 66a, 66b from the ledges 67 so that the crab washer 64 closes on the wire 3 to lock it into place and prevent lateral sliding. The locking assembly 5 with crab washer 64 shown in FIGS. 8A-8C in the locked mode can be shaped to apply a sufficiently large force against the wire 3 to prevent sliding of the wire 3 relative to the bracket 2 when subject to typical orthodontic forces, as explained above in connection with FIGS. 2A-2O and 6A-6N.

FIG. 9A is a schematic perspective view of an orthodontic device 1 that includes a locking assembly 5 comprising a crimp device 70, according to another embodiment. FIG. 9B is a schematic side sectional view of the orthodontic device 1 of FIG. 9A in a sliding mode. FIG. 9C is a schematic side sectional view of the orthodontic device 1 of FIG. 9A in a locked mode. Unless otherwise noted, components in FIGS. 9A-9C may be the same as or generally similar to like-numbered components of FIGS. 1A-8C, and may function or operate in a generally-similar manner.

The device 1 of FIGS. 9A-9C can include a locking assembly 5 having a crimp device 70 mechanically coupled with the bracket 2. The wire 3 can be inserted into a loop 71 defined by the crimp device 70. The bracket 2 can include a pair of lower locking holes 72 that engage with corresponding elastic feet 73 of the crimp device 70. In the sliding mode of FIG. 9B, the crimp device 70 can remain uncrimped to provide a relatively large loop 71 to enable lateral sliding of the wire 3 relative to the bracket 2. In the locked mode of FIG. 9C, the crimp device 70 can be collapsed to provide a smaller loop 71 to prevent lateral sliding of the wire 3 relative to the bracket 2. The feet 73 can engage with the locking holes 72 maintain the collapsed crimp. The locking assembly 5 with crimp device 70 shown in FIGS. 9A-9C in the locked mode can be shaped to apply a sufficiently large force against the wire 3 to prevent sliding of the wire 3 relative to the bracket 2 when subject to typical orthodontic forces, as explained above in connection with FIGS. 2A-2O and 6A-6N.

Figure 10D:
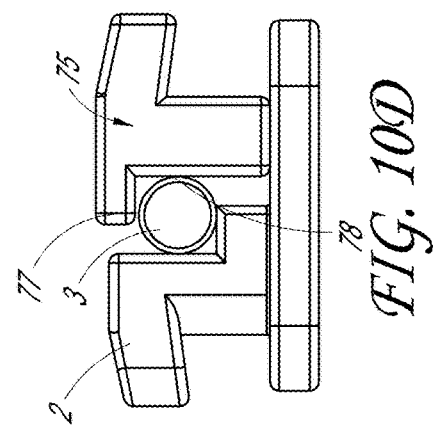
FIG. 10D is a schematic side sectional view of the orthodontic device of FIG. 10A in a locked mode.
Figure 10A:
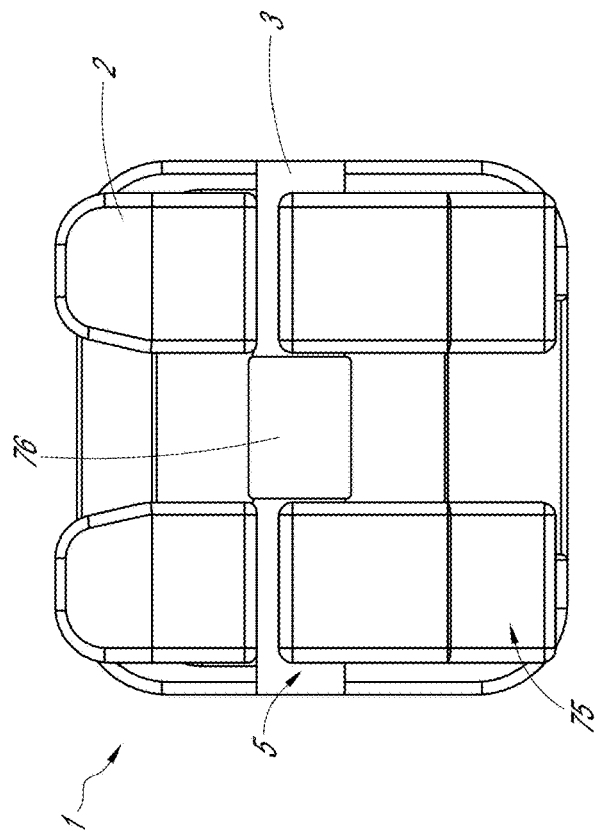
FIG. 10A is a schematic perspective view of an orthodontic device that includes a locking assembly comprising a slide lock, according to another embodiment.
Figure 10C:
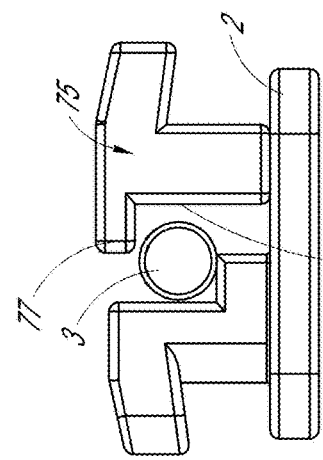
FIG. 10C is a schematic side sectional view of the orthodontic device of FIG. 10A in a sliding mode.
Figure 10B:
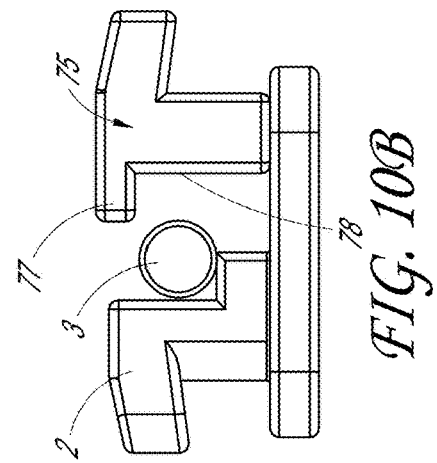
FIG. 10B is a schematic side sectional view of the orthodontic device of FIG. 10A in an open mode.

FIG. 10A is a schematic perspective view of an orthodontic device 1 that includes a locking assembly 5 comprising a slide lock 75, according to another embodiment. FIG. 10B is a schematic side sectional view of the orthodontic device 1 of FIG. 10A in an open mode. FIG. 10C is a schematic side sectional view of the orthodontic device 1 of FIG. 10A in a sliding mode. FIG. 10D is a schematic side sectional view of the orthodontic device 1 of FIG. 10A in a locked mode. Unless otherwise noted, components in FIGS. 10A-10D may be the same as or generally similar to like-numbered components of FIGS. 1A-9C, and may function or operate in a generally-similar manner.

The device 1 of FIGS. 10A-10D can include a locking assembly 5 having a slide lock 75 mechanically coupled with the bracket 2. In some embodiments, a crimp 76 can be applied about the wire 3. The slide lock 75 can be configured to slide along the transverse axis y to switch between the open, sliding, and locked modes. As shown, the slide lock 75 can include a vertical surface 78 and an upper transverse projection 77 extending transversely relative to the vertical surface 78. In the open mode shown in FIG. 10B, the vertical surface and the upper transverse projection can be spaced away from the wire. In the sliding mode of FIG. 10C, the slide lock 75 can be translated along the transverse axis y to position the transverse projection 77 over the wire 3. The transverse projection 77 can serve to retain the wire 3 in the bracket 2 while permitting the wire 3 to slide laterally relative to the bracket 2. In the locked mode of FIG. 10D, the slide lock 75 can be further translated along the transverse axis y to maintain the transverse projection 77 over the wire 3 and to urge the vertical surface 78 against the wire 3. The vertical surface 78 can contact the wire 3 and provide a sufficiently large force so as to prevent sliding of the wire 3 relative to the bracket 2 when subject to typical orthodontic forces, as explained above in connection with FIGS. 2A-2O and 6A-6N.

Figure 11B:
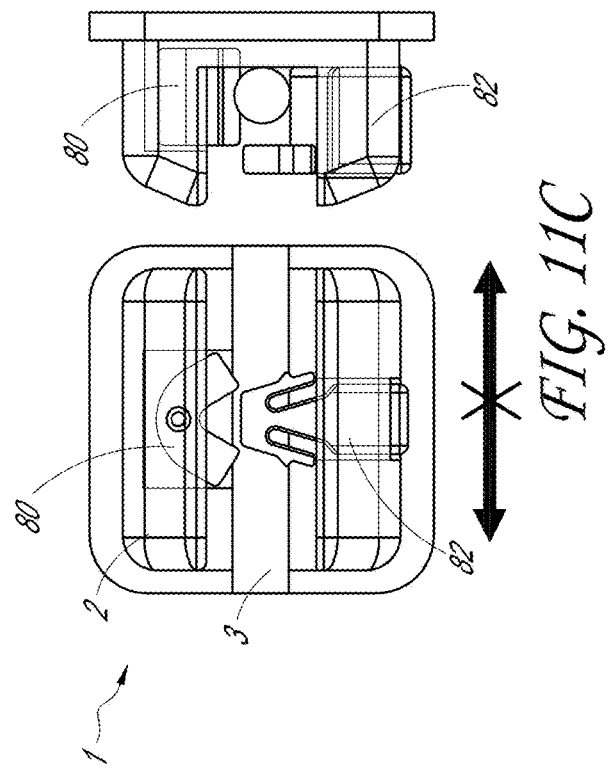
FIG. 11B illustrates schematic top and side views of the orthodontic device of FIG. 11A in a sliding mode.
Figure 11C:
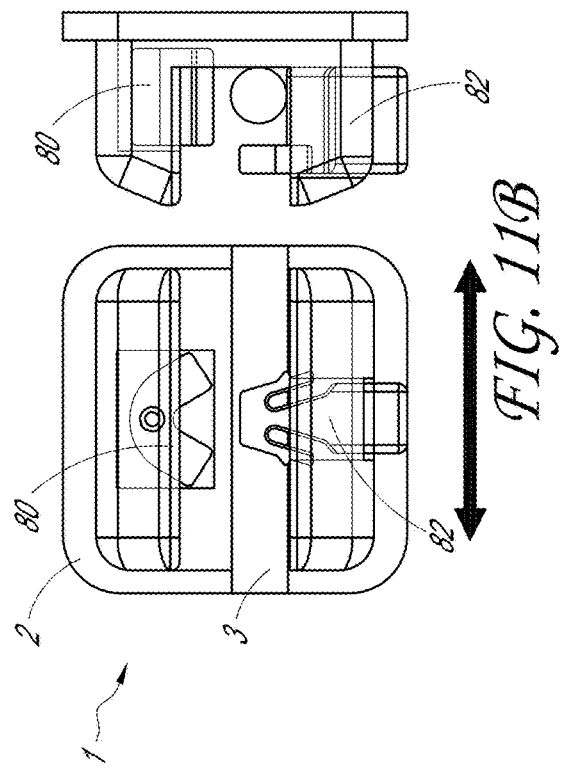
FIG. 11C illustrates schematic top and side views of the orthodontic device of FIG. 11A in a locked mode.
Figure 11A:
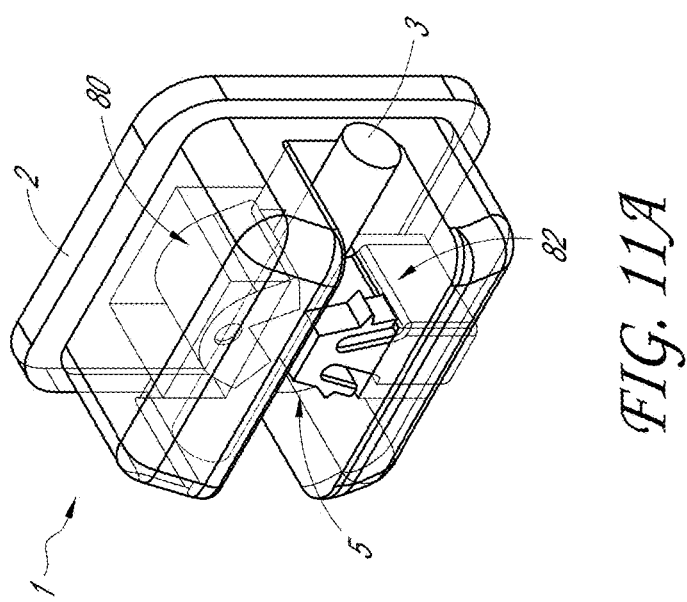
FIG. 11A is a schematic perspective view of an orthodontic device that includes a locking assembly comprising a rotating locking element and a slidable lock, according to another embodiment.

FIG. 11A is a schematic perspective view of an orthodontic device 1 that includes a locking assembly 5 comprising a rotating locking element 80 and a slidable lock 82 spaced across from the retention cavity 24 from the locking element 80, according to another embodiment. FIG. 11B illustrates schematic top and side views of the orthodontic device 1 of FIG. 11A in a sliding mode. FIG. 11C illustrates schematic top and side views of the orthodontic device 1 of FIG. 11A in a locked mode. Unless otherwise noted, components in FIGS. 11A-11C may be the same as or generally similar to like-numbered components of FIGS. 1A-10D, and may function or operate in a generally-similar manner.

The device 1 of FIGS. 11A-11C can include a locking assembly 5 having a rotating locking element 80 and a slidable lock 82 coupled with the bracket 2. In the illustrated embodiment, the rotating locking element 80 can be rotatable or rockable about the vertical axis z. The slidable lock 82 can be translated along the transverse axis y. In the sliding mode of FIG. 11B, the slidable lock 82 can be moved over the wire 3 to retain the wire 3 in the bracket 2 and permit the wire 3 to slide relative to the bracket 2. In the locked mode of FIG. 11C, the slidable lock 82 can be translated upwardly until the rotating locking element 80 contacts the wire 3. In the locked mode, the slidable lock 82 and rotatable element 80 can cooperate to apply a force against the wire 3 sufficiently high so as to prevent the wire 3 from translating laterally when subject to typical orthodontic forces, as explained above in connection with FIGS. 2A-2O and 6A-6N.

Figure 12C:
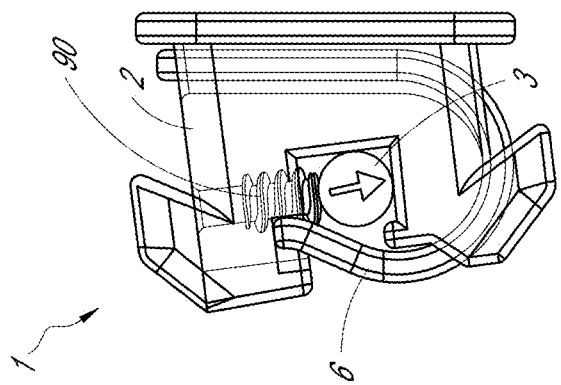
FIG. 12C is a schematic side view of the orthodontic device of FIG. 12B in the locked mode.
Figure 12B:
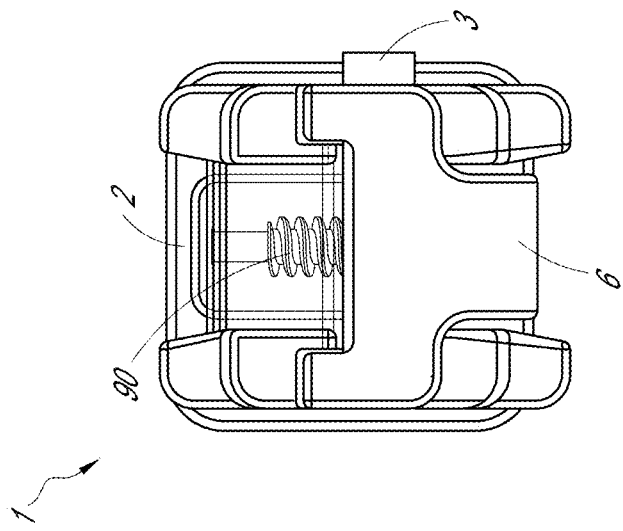
FIG. 12B is a schematic top view of the orthodontic device of FIG. 12A in a locked mode.
Figure 12A:
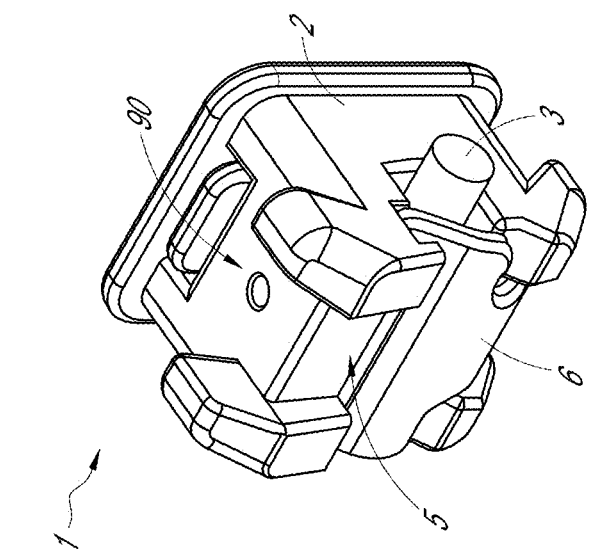
FIG. 12A is a schematic perspective view of an orthodontic device that includes a locking assembly comprising a clip and a set screw, according to another embodiment.

FIG. 12A is a schematic perspective view of an orthodontic device 1 that includes a locking assembly 5 comprising a clip 6 and a set screw 90, according to another embodiment. FIG. 12B is a schematic top view of the orthodontic device 1 of FIG. 12A in a locked mode. FIG. 12C is a schematic side view of the orthodontic device 1 of FIG. 12B in the locked mode. Unless otherwise noted, components in FIGS. 12A-12C may be the same as or generally similar to like-numbered components of FIGS. 1A-11C, and may function or operate in a generally-similar manner.

The device 1 of FIGS. 12A-12C can include a locking assembly 5 having a clip 6 and set screw 90 coupled with the bracket 2. As with the embodiments of FIGS. 2A-5D, in the sliding mode (not shown), the clip 6 can serve to retain the wire 3 in the bracket 2 while permitting the wire 3 to slide laterally relative to the bracket 2. In the sliding mode, the set screw 90 can remain recessed within the body of the bracket 2 and may not engage the wire 3. In the locked mode, the clinician can use a tool, such as a screwdriver, to thread the set screw 90 transversely towards the wire 3. In the locked mode, the set screw 90 can clamp the wire 2 against the bracket 2 by applying a force against the wire 3 that is sufficiently high so as to prevent the wire 3 from translating laterally when subject to typical orthodontic forces, as explained above in connection with FIGS. 2A-2O and 6A-6N.

III. Systems and Methods for Patient-Specific Orthodontic Treatments

Each orthodontic patient has his or her own unique set of teeth with their own malocclusion characteristics. It can be challenging to plan and implement patient-specific procedures to concurrently align all of the patient's teeth that are to be treated in an efficient manner. In conventional orthodontic treatments, the clinician typically adjusts the wires in a sequential fashion on a regular basis in response to the position of the patient's teeth at a particular treatment appointment with the clinician. For example, in conventional treatments, the clinician may make an adjustment to a first orthodontic device on a first tooth of a patient, which may undesirably and unintentionally induce misalignments to a second tooth of the patient. The clinician may continually make such sequential adjustments until the malocclusion is treated. As explained above in connection with FIG. 1C, such conventional treatments may induce frequent spikes in orthodontic forces, which can increase patient pain and discomfort, lengthen treatment time, and increase costs.

Beneficially, the orthodontic devices 1 disclosed herein can be used in the disclosed methods that can align the teeth to be treated with reduced treatment iteration. The disclosed methods can be used with any of the devices 1 shown and described in connection with FIGS. 2A-12C. Unlike conventional orthodontic devices, the orthodontic devices 1 disclosed herein can operate in a plurality of operating modes. As explained herein, the orthodontic devices 1 can operate in an open operating mode, a sliding operating mode, and a locked operating mode. The use of multiple operating modes provides the clinician with flexibility for treating each tooth. For example, the different operating modes can express different forces and moments on multiple teeth in different manners so as to concurrently accommodate the respective misalignments of the multiple teeth. Thus, in contrast with conventional treatments, the clinician may make an adjustment to a first orthodontic device on a first tooth of a patient, without inducing misalignments to a second tooth of the patient. The concurrent treatment of multiple teeth using different treatment modalities can beneficially reduce patient treatment times and alleviate pain and discomfort by reducing the frequency of applied orthodontic force spikes.

Moreover, the embodiments disclosed herein can enable the clinician to plan the course of treatment for the patient's teeth by concurrently treating malocclusion of multiple (or all) teeth. The concurrent treatment can reduce the number of treatment appointments and improve treatment efficacy. The adjustability of the locking members between sliding and non-sliding configurations can enable the clinician to place one or multiple teeth in a sliding configuration and one or more other teeth in a non-sliding configuration. Over the course of treatment, the clinician can adjust the locking assemblies of various teeth to move from sliding to non-sliding, or from non-sliding to sliding, based on the treatment plan and the state of malocclusion of the patient's teeth.

Figure 13:
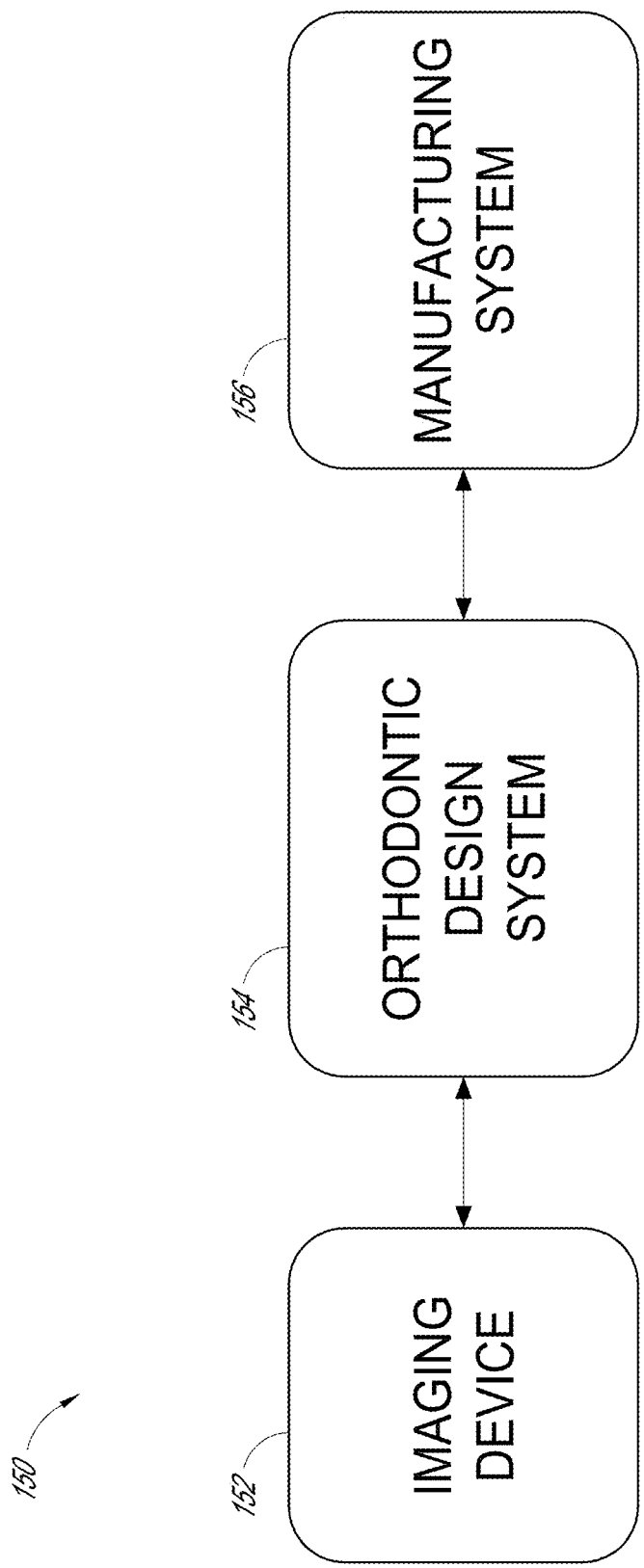
FIG. 13 is a schematic system diagram of a system for creating patient-specific orthodontic systems.

FIG. 13 is a schematic system diagram of a system 150 for creating patient-specific orthodontic systems. The system 150 can include an imaging device 152, an orthodontic design system 154, and a manufacturing system 156. The imaging device 152, design system 154, and manufacturing system 156 can be co-located at the same facility in some embodiments. In other embodiments, one or more of the imaging device 152, the design system 154, and the manufacturing system 156 can be located at different facilities. The imaging device 152 can comprise any suitable type of imaging device, such as an X-ray imaging device, a computed tomography (CT) device, etc. The imaging device 152 can capture image data of a patient's teeth and can save the image data to a computer-readable medium.

The orthodontic design system 154 can comprise processing electronics configured to store and process the image data of the patient's teeth. In some embodiments, the image data can be transferred to the design system 154 from the imaging device 152 over a wireless or wired communications network, by way of a removable storage medium, etc. The processing electronics of the design system 154 can analyze the captured and stored image data to determine characteristics of the patient's dental malocclusion. The malocclusion characteristics can be determined in any suitable manner known to the skilled artisan. Based on the malocclusion characteristics, the processing electronics of the design system 154 can also be configured to determine force profiles to be applied to the teeth in order to align the patient's teeth. As explained herein, the processing electronics of the design system 154 can also determine how the orthodontic devices 1 are to be structured and arranged to achieve the force profiles. For example, the design system 154 can determine the desired structure and material of the archwires, which devices 1 are to be in a locked mode, which devices 1 are to be in a sliding mode, etc.

The orthodontic design system 154 can comprise processing electronics that can include a processor governed by instructions stored in a memory. The memory may be random access memory (RAM), read-only memory (ROM), flash memory or any other memory, or combination thereof, suitable for storing control software or other instructions and data. Those skilled in the art should also readily appreciate that instructions or programs defining the functions of the disclosed embodiments may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the disclosed embodiments may be embodied in software, the functions used to implement the embodiments may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

The manufacturing system 156 can be configured to manufacture or procure an orthodontic system including the orthodontic devices 1 designed by the design system 154 based on the design data determined by the design system 154. For example, in some embodiments, the archwires, brackets, and/or locking assemblies can be manufactured or otherwise procured based on the design data provided by the design system 154. In some cases, the manufacturing system 156 can include machinery to automatically manufacture or procure the archwires, the brackets, and/or the locking assemblies, as determined by the design system 154.

Figure 14:
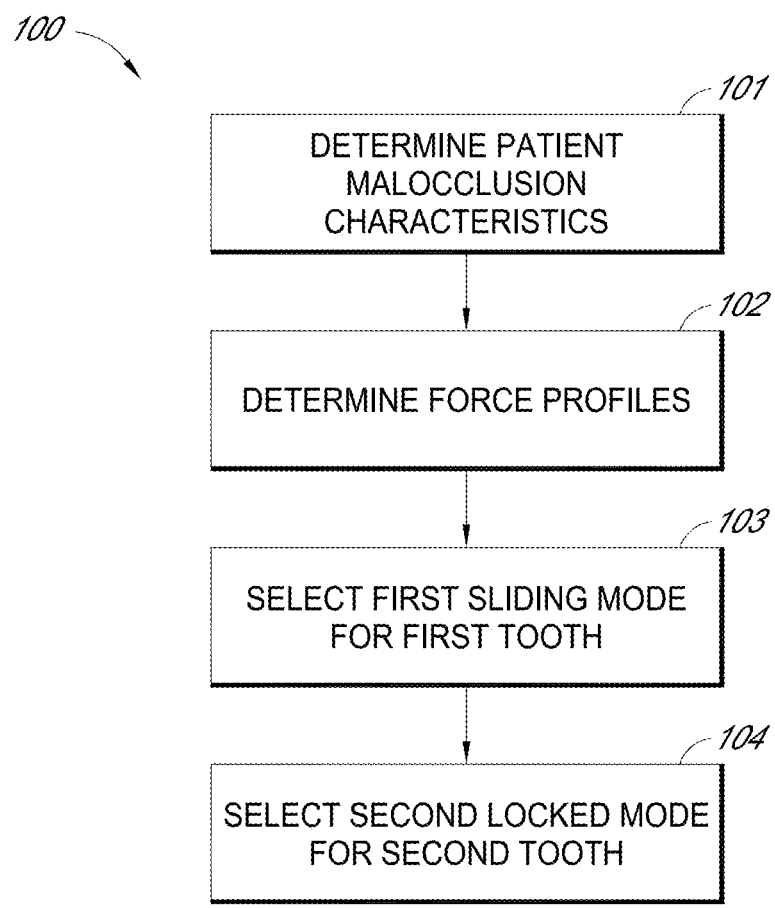
FIG. 14 is a flowchart illustrating a method for planning an orthodontic treatment procedure, according to various embodiments.

FIG. 14 is a flowchart illustrating a method 100 for designing an orthodontic treatment system for reducing malocclusion of multiple teeth in a patient, according to various embodiments. In a block 101, the method 100 can determine malocclusion characteristics of the patient's teeth. In various embodiments, for example, the patient's mouth can be imaged in any suitable manner by the imaging device 152 (e.g., by an X-ray device, a computed tomography or CT device, etc.). Based on the captured image data, the patient's malocclusion characteristics can be determined by optical analysis techniques known to those having skill in the art. The determined malocclusion characteristics can indicate how each tooth is misaligned relative to a desired orientation and position. As explained in connection with FIG. 13, processing electronics of the design system 154 can analyze and process the image data to make the determination. Additionally or alternatively, in some embodiments, the clinician can analyze the image data to determine the patient's malocclusion characteristics. In some cases, the clinician can manually shape the archwire to achieve the desired force profile.

Moving to a block 102, the method 100 can determine force profiles 102 that can be applied to the orthodontic devices in an orthodontic system to concurrently align multiple teeth to be treated. For example, based on the determined patient malocclusion characteristics, the method 100, which can be implemented by the design system 154, can determine how to apply forces and torques across the entire orthodontic system of multiple devices 1. In some embodiments, the malocclusion characteristics can be mapped to a look-up table (LUT) or database of force profiles (e.g., linear forces or torque forces) that can be applied to address the particular identified malocclusion characteristics. The LUT or database can map a plurality of clinical scenarios to operational modes of the orthodontic devices 1. Examples of force profiles used in example treatment procedures, and which may be provided in appropriate LUTs or databases, are shown in FIGS. 16A-31. Thus, for a particular malocclusion profile (such as a malocclusion profile shown in any of FIGS. 16A-31), the design system 154 can calculate a corresponding force profile.

Moving to a block 103, based on the corresponding determined force profiles, the design system 154 can select how each orthodontic device 1 of the system should be structured and arranged to provide the desired force profile for the overall system. For example, based on the determined force profile, the method 100 can select a first sliding mode for a first orthodontic device 1 to be secured to a first tooth. Moving to a block 104, based on the determined force profile, the method 100 can select a second locked mode for a second orthodontic device 1 to be secured to a second tooth. As explained below in connection with FIGS. 16A-31, any number of treatment combinations may be suitable depending on the patients' malocclusion characteristics and the determined force profiles.

Figure 15:
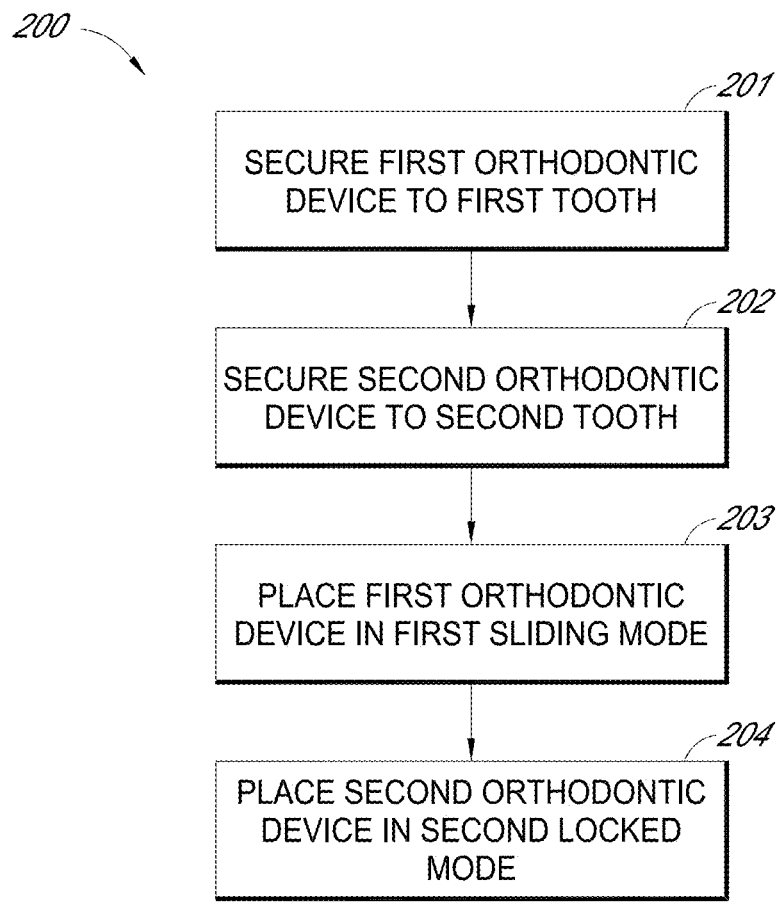
FIG. 15 is a flowchart illustrating a method for performing an orthodontic treatment, according to various embodiments.

FIG. 15 is a flowchart illustrating a method 200 for performing an orthodontic treatment, according to various embodiments. As explained above, the embodiments disclosed herein can be used to design a patient-specific orthodontic system that includes a plurality of orthodontic devices 1 selected to achieve a desired force profile. In some arrangements, the orthodontic system can be manufactured or procured as explained above in FIG. 13. The desired force profile can provide a map for how each device 1 of the system is to be structured and arranged. For example, in a block 201, a first orthodontic device 1 can be secured to a first tooth. Turning to a block 202, a second orthodontic device 1 can be secured to a second tooth. The first and second orthodontic devices can comprise any of the devices 1 shown and described in connection with FIGS. 2A-12C. The first and second orthodontic devices can each have at least a sliding operational mode and a locked operational mode. In a block 203, the first orthodontic device can be placed in the first sliding mode. In a block 204, the second orthodontic device can be placed in the second locked mode. As explained herein, the use of different operational modes on different teeth can facilitate efficient alignment of the patient's teeth. Moreover, as explained above, over the course of treatment, the clinician can switch between sliding and non-sliding configurations for one or more teeth based on the treatment plan, or on the state of malocclusion.

FIGS. 16A-31 illustrate examples of methods of orthodontic treatment, according to various embodiments disclosed herein. The methods shown in FIGS. 16A-31 can represent applied force profiles for corresponding patient malocclusion scenarios. As explained above, the malocclusion characteristics and force profiles shown in FIGS. 16A-31 can be used in a LUT or database to design an orthodontic system 300 to treat the malocclusion. The orthodontic system 300 can comprise a plurality of orthodontic devices 1 and the associated wires 3 sued therewith. Any of the orthodontic devices 1 described in FIGS. 2A-12C can be used in the systems 300 shown in FIGS. 16A-31. As shown throughout FIGS. 16A-31, teeth 10 with an "X" marked on them indicate that the orthodontic device 1 attached thereto is placed in a locked mode. Teeth 10 that have an "S" marked on them indicate that the orthodontic device 1 attached thereto is placed in a sliding mode. It should be appreciated that the treatment methods of FIGS. 16A-31 are examples only, and that additional or alternative arrangements and structures may be provided in the LUT or database. Moreover, FIGS. 16A-31 may illustrate only a subset of the teeth under orthodontic treatment. The overall orthodontic system 300 can include all the devices 1 used to treat the patient's teeth.

FIGS. 16A-16B illustrate an orthodontic system 300 configured to treat a clinical scenario in which a malocclusal condition comprises a gap between adjacent teeth 10a, 10b. One way to close the gap between the teeth 10a, 10b is to form a loop 302 in the wire 3 in the gap. As shown in FIGS. 16A-16B, the devices 1 attached to the teeth 10a, 10b are placed in the locked mode. The loop 302 can be biased radially outwardly such that the natural state of the loop 302 is to have a larger diameter than that shown in FIGS. 16A-16B. As the wire 302 relaxes into its natural state to form a larger loop the wire 3 pulls the teeth 10a, 10b together to close the gap. As shown in FIG. 16A, all fourth teeth can be placed in the locked mode as indicated by the "X" marks. Locking all four teeth 10 can increase the forces applied to the tooth 10a. In some cases, however, a reduced force may be desirable, for example, to accommodate other misalignments in other portions of the mouth. Thus, in FIG. 16A, only the teeth 10a, 10b can be locked as indicated by the "X" marks. The two leftmost teeth can be placed in the sliding mode "S". Thus, the combinations of operational modes for the devices 1 and the structure of the wire 3 shown in FIGS. 16A-16B can represent example templates in a LUT or database that can be used to address a gap closing clinical scenario, based on desired force profiles for the specific patient at issue.

Figure 17A:
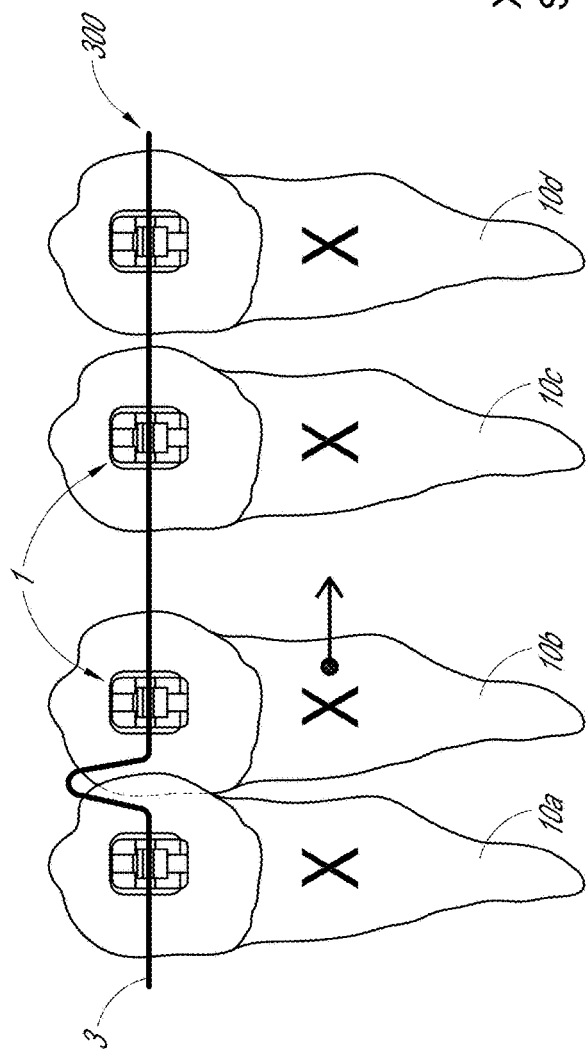
Figure 17B:
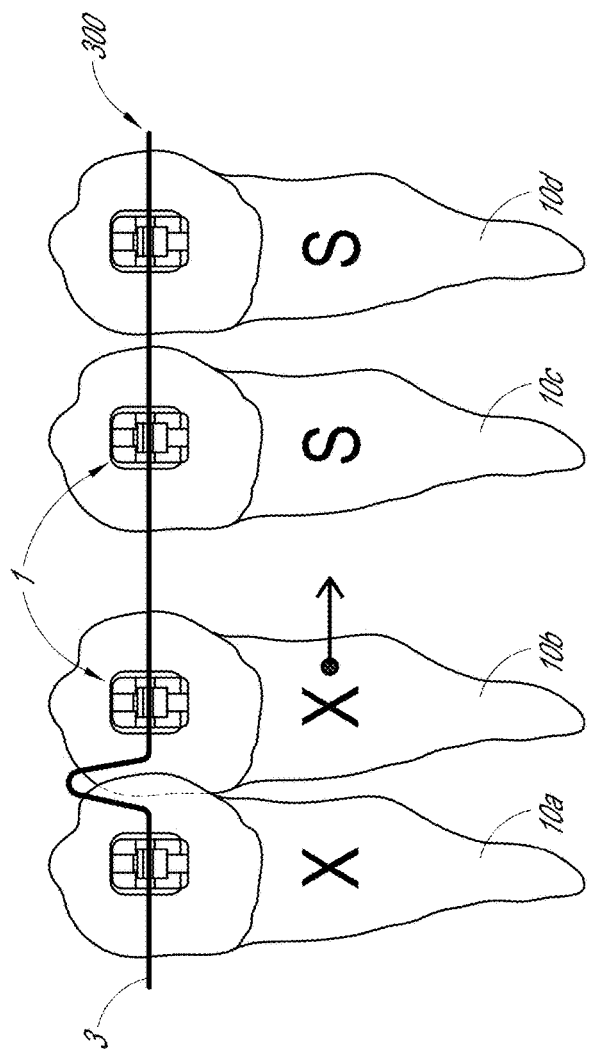

FIGS. 17A-17B illustrate an orthodontic system 300 configured to treat a clinical scenario in which a malocclusal condition comprises crowding between adjacent teeth 10a, 10b. To address the crowding, a kink 304 can be formed in the wire 3 between the teeth 10a, 10b. As shown in FIGS. 17A-17B, the devices 1 attached to the teeth 10a, 10b are placed in the locked mode. The kink 304 can be outwardly biased such that as the kink 304 relaxes, the wire 3 pushes the teeth 10a, 10b apart from one another. In FIG. 17A, all four teeth 10a-10d can have devices 1 in the locked mode to provide a first force profile. In FIG. 17B, the teeth 10c-10d are placed in the sliding mode to provide a second force profile with a reduced force, which may be desirable in some circumstances. Thus, the combinations of operational modes for the devices 1 and the structure of the wire 3 shown in FIGS. 17A-17B can represent example templates in a LUT or database that can be used to address a crowding clinical scenario, based on desired force profiles for the specific patient at issue.

Figure 18:
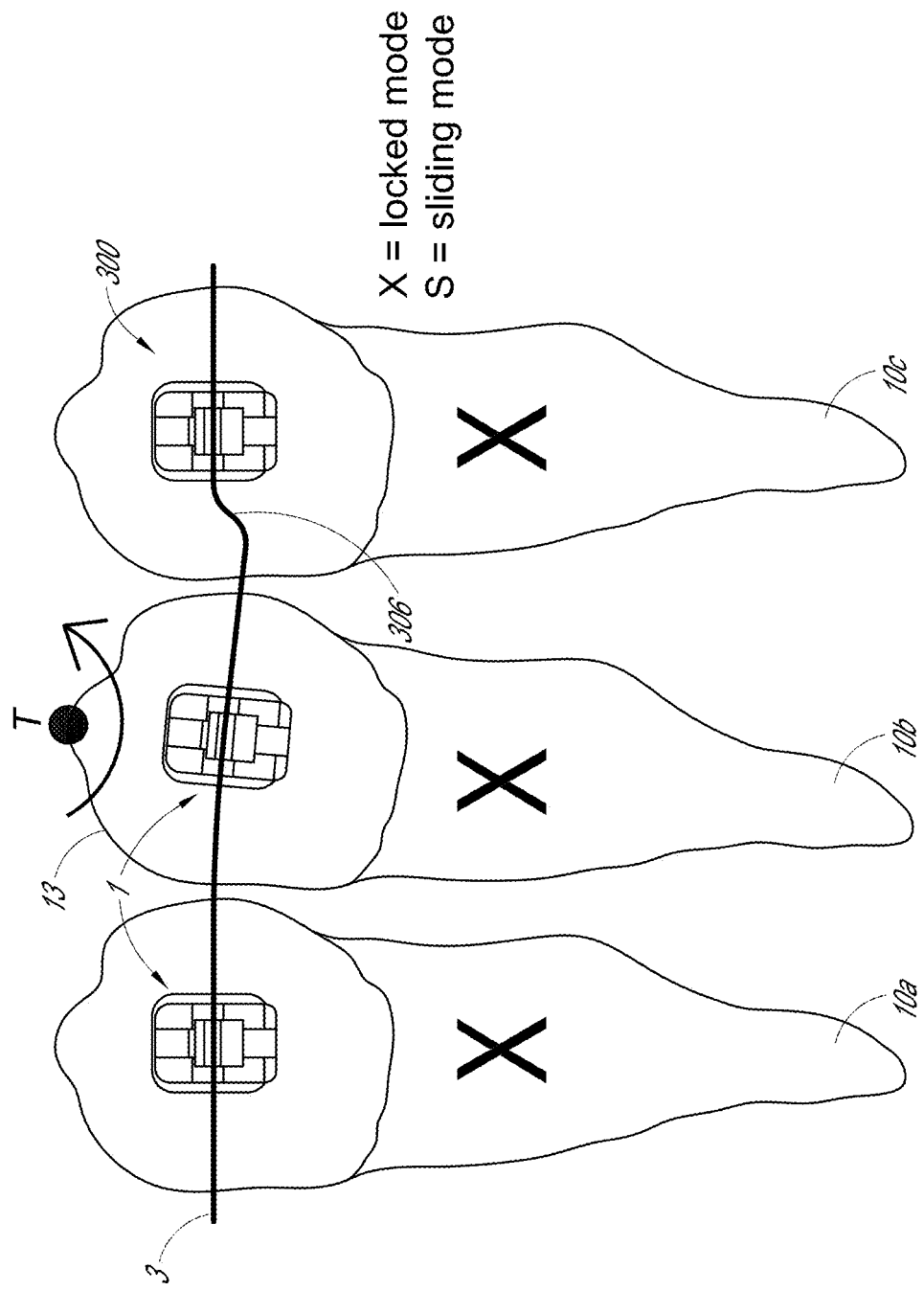

FIG. 18 illustrates an orthodontic system 300 configured to treat a clinical scenario in which the crown 13 of the tooth 10b is angularly misaligned. To address the crown tipping scenario of FIG. 18, the devices 1 attached to the teeth 10a-10c can be placed in the locked mode. A bend 306 can be formed in the wire 3 between the teeth 10b, 10c. The bend 306 can be shaped to impart a torque T at the crown 13 as shown to correctly orient the crown 13. Thus, the combinations of operational modes for the devices 1 and the structure of the wire 3 shown in FIG. 18 can represent example templates in a LUT or database that can be used to address a crown tipping scenario, based on desired force profiles for the specific patient at issue.

Figure 19:
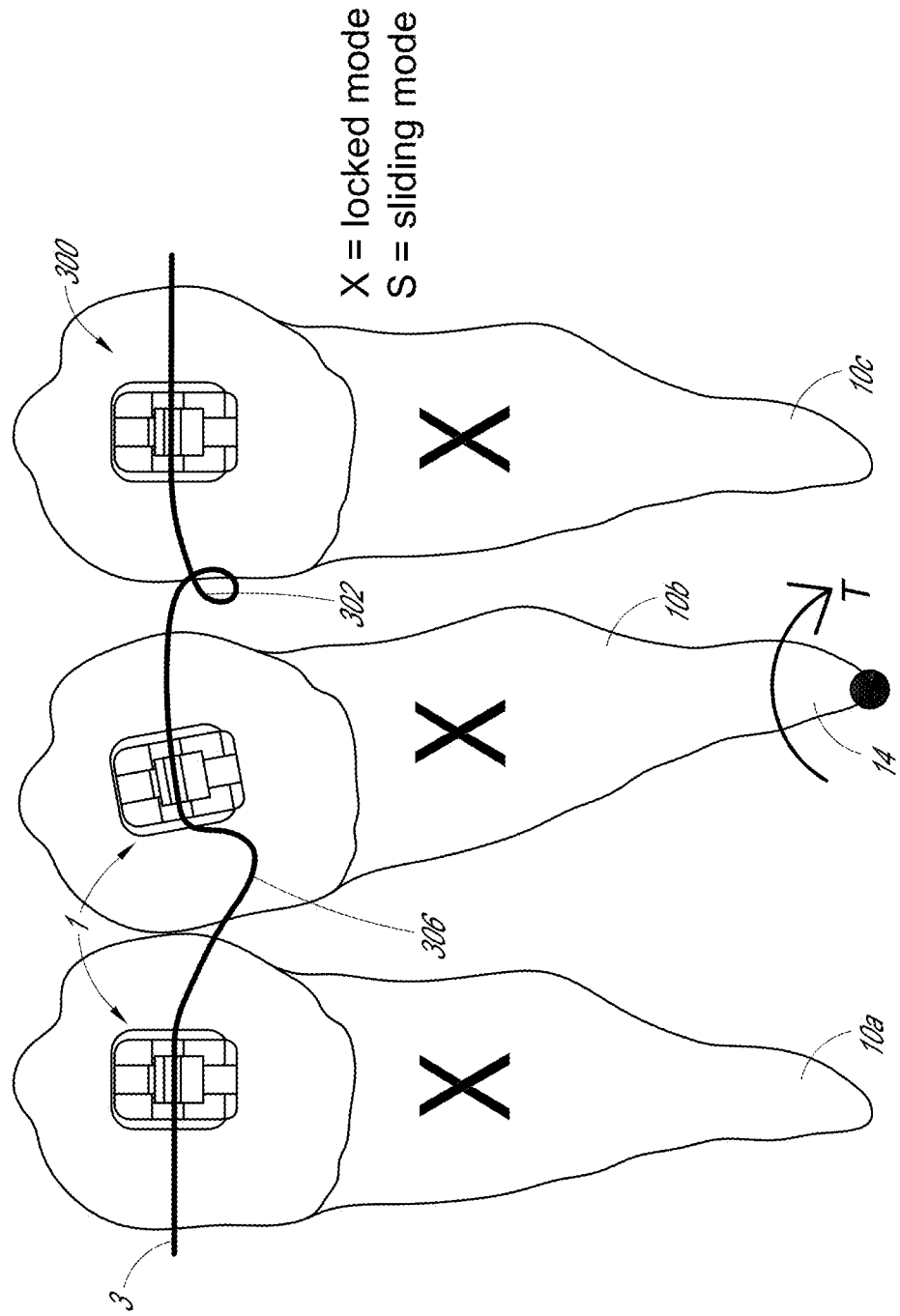

FIG. 19 illustrates an orthodontic system 300 configured to treat a clinical scenario in which the root 14 of the tooth 10*b* is angularly misaligned. To address the root tipping scenario of FIG. 19, the devices 1 attached to the teeth 10*a*-10*c* can be placed in the locked mode. A bend 306 can be formed in the wire 3 between the teeth 10*a*, 10*b*. A loop 302 can be formed in the wire 3 between the teeth 10*b*, 10*c*. The bend 306 and the loop 302 can be shaped to impart a torque T at the root 14 as shown to correctly orient the root 14. Thus, the combinations of operational modes for the devices 1 and the structure of the wire 3 shown in FIG. 19 can represent example templates in a LUT or database that can be used to address a root tipping scenario, based on desired force profiles for the specific patient at issue.

Figure 20:
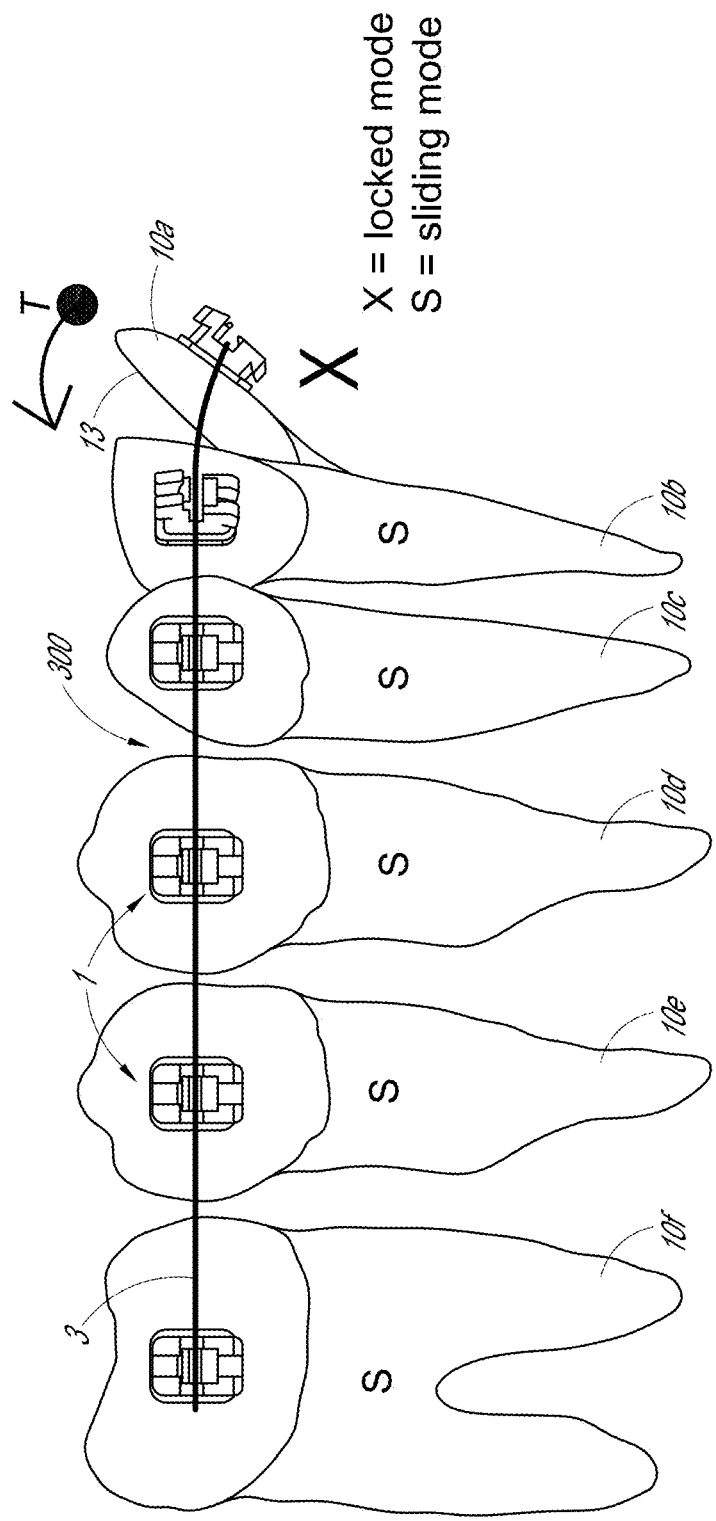

FIG. 20 illustrates an orthodontic system 300 configured to treat a clinical scenario in which an incisor 10*a* is angularly misaligned. As shown, the crown 13 of the incisor 10*a* is tilted labially. To address the misaligned incisor 10*a*, the device 1 attached to the incisor 10*a* can be placed in the locked mode. The devices 1 attached to the teeth 10*b*-10*f* can be placed in the sliding mode. The wire 3 can comprise a rectangular wire such that the tilting of the incisor 10*a* relative to the other teeth 10*b*-10*f* imparts a torque T to correctly align the crown 13 of the incisor 10*a*. Thus, the combinations of operational modes for the devices 1 and the structure of the wire 3 shown in FIG. 20 can represent example templates in a LUT or database that can be used to address the illustrated scenario, based on desired force profiles for the specific patient at issue.

Figure 21:
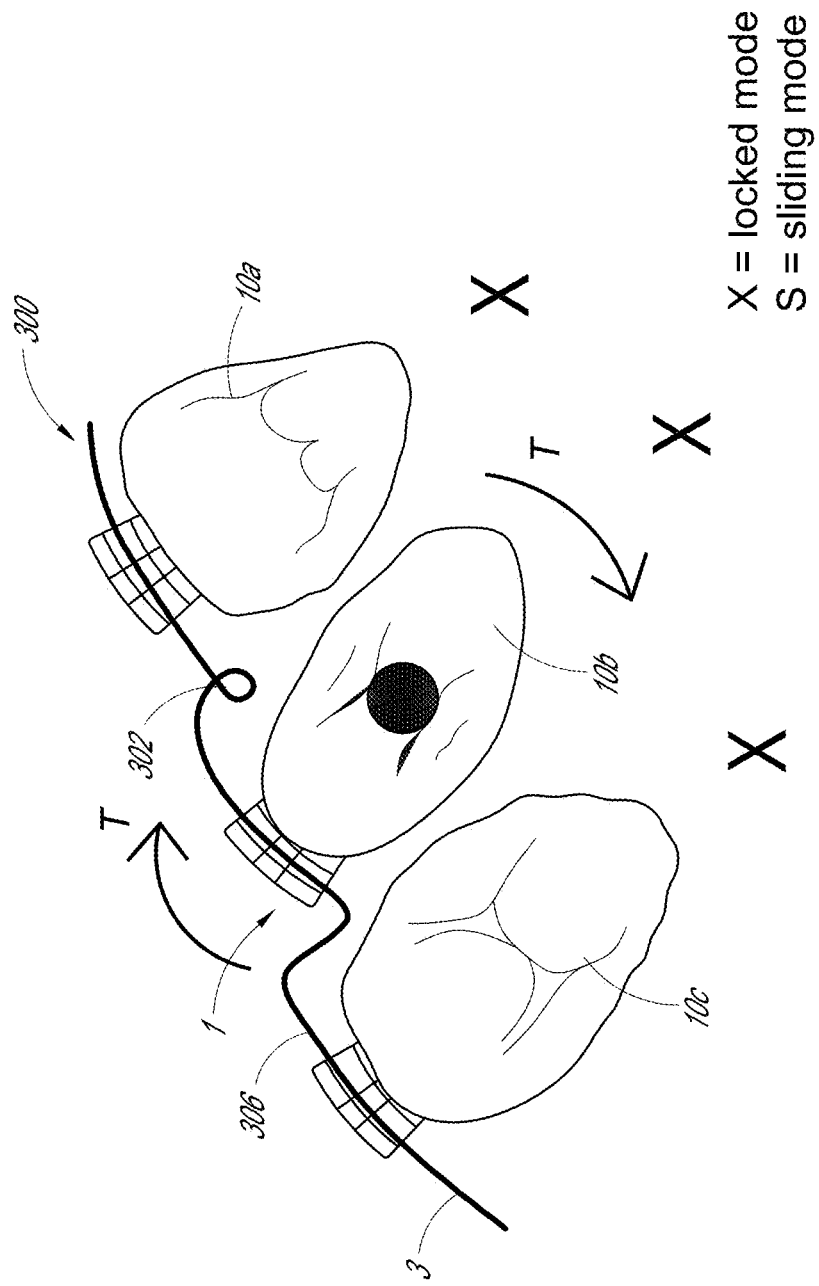

FIG. 21 illustrates an orthodontic system 300 configured to treat a clinical scenario in which a tooth 10*b* is rotationally misaligned as seen from a top view of the occlusal surfaces. In FIG. 21, each of the devices 1 attached to the teeth 10*a*-10*c* can be placed in the locked mode. The wire 3 can be shaped to have a bend 306 between the teeth 10*b*, 10*c*. The wire 3 can be shaped to have a loop 302 between the teeth 10*a*, 10*b*. The loop 302 and bend 306 can impart a torque T about the vertical coronal axis of the tooth to correctly orient the tooth 10*b*. Thus, the combinations of operational modes for the devices 1 and the structure of the wire 3 shown in FIG. 21 can represent example templates in a LUT or database that can be used to address the illustrated scenario, based on desired force profiles for the specific patient at issue.

Figure 22:
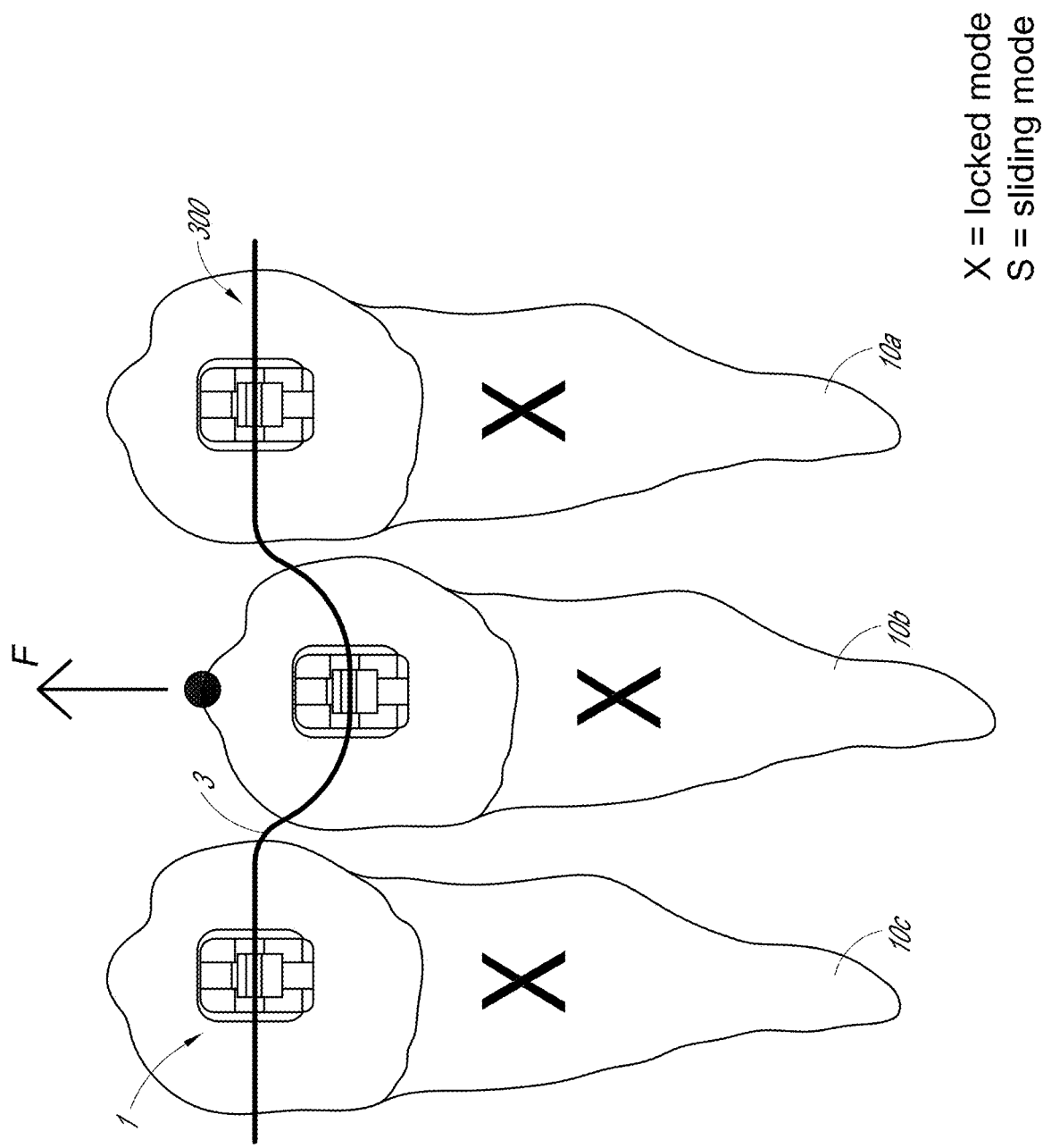

FIG. 22 illustrates an orthodontic system 300 configured to treat a clinical scenario in which a tooth 10*b* is misaligned gingivally relative to the teeth 10*a*, 10*c*. In FIG. 22, each of the devices 1 attached to the teeth 10*a*-10*c* can be placed in the locked mode. In FIG. 22, the wire 3 is naturally straight. The naturally straight bias of the wire 3 can impart an upward coronal force F to the tooth 10*b* to extrude the tooth 10*b* coronally to align the tooth 10*b* relative to the teeth 10*a*, 10*c*. Thus, the combinations of operational modes for the devices 1 and the structure of the wire 3 shown in FIG. 22 can represent example templates in a LUT or database that can be used to address the illustrated scenario, based on desired force profiles for the specific patient at issue.

Figure 23:
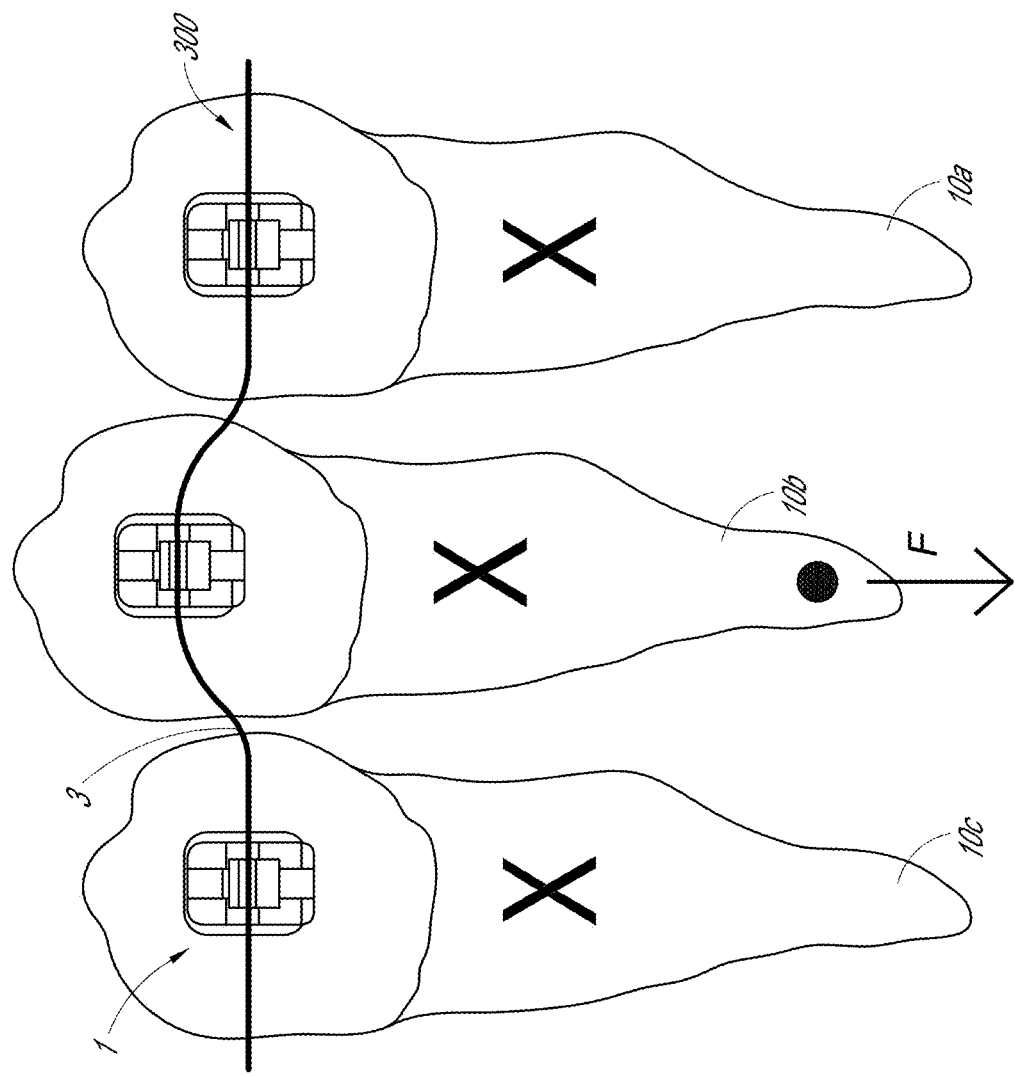

FIG. 23 illustrates an orthodontic system 300 configured to treat a clinical scenario in which a tooth 10*b* is misaligned coronally (upwardly) relative to the teeth 10*a*, 10*c*. In FIG. 23, each of the devices 1 attached to the teeth 10*a*-10*c* can be placed in the locked mode. In FIG. 23, the wire 3 is naturally straight. The naturally straight bias of the wire 3 can impart a downward gingival force F to the tooth 10*b* to intrude the tooth 10*b* gingivally downward to align the tooth 10*b* relative to the teeth 10*a*, 10*c*. Thus, the combinations of operational modes for the devices 1 and the structure of the wire 3 shown in FIG. 23 can represent example templates in a LUT or database that can be used to address the illustrated scenario, based on desired force profiles for the specific patient at issue.

Figure 24:
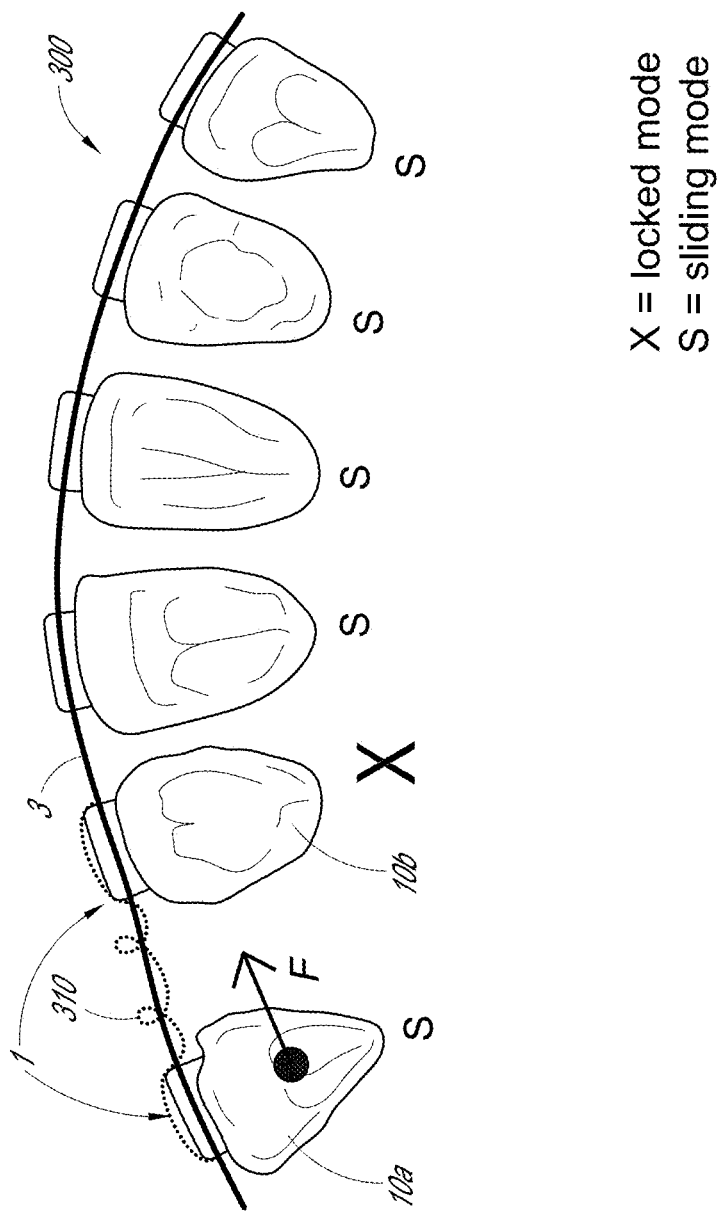

FIG. 24 illustrates an orthodontic system 300 configured to treat a clinical scenario in which a tooth 10*a* is misaligned distally relative to the tooth 10*b*, which is generally similar to the gap closing scenario of FIGS. 16A-16B. The illustrated template can include providing an elastic band or spring 310 over the wire 3 between the teeth 10*a*, 10*b*. The device 1 attached to the tooth 10*b* can be placed in the locked mode. The devices 1 attached to the other teeth can be placed in the sliding mode. The locked device 1 on the tooth 10*b* can hold the tooth 10*b* in place, and the band or spring 310 can apply a mesially-directed force F to the tooth 10*a* to move the tooth 10*a* along a mesial direction to close the gap. Thus, the combinations of operational modes for the devices 1 and the structure of the wire 3 shown in FIG. 24 can represent example templates in a LUT or database that can be used to address the illustrated scenario, based on desired force profiles for the specific patient at issue.

Figure 25A:
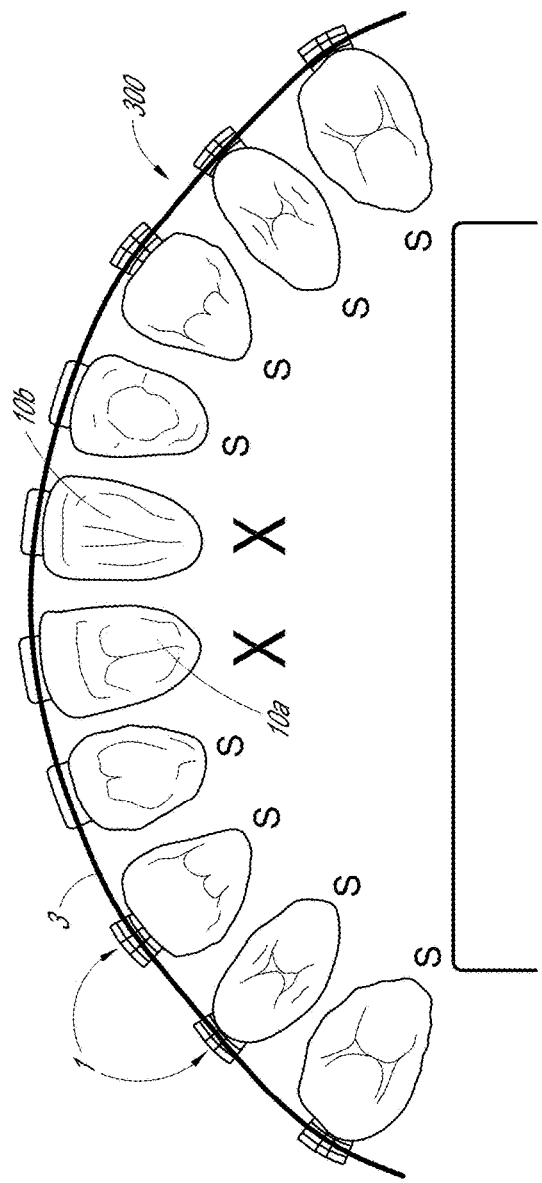
Figure 25B:
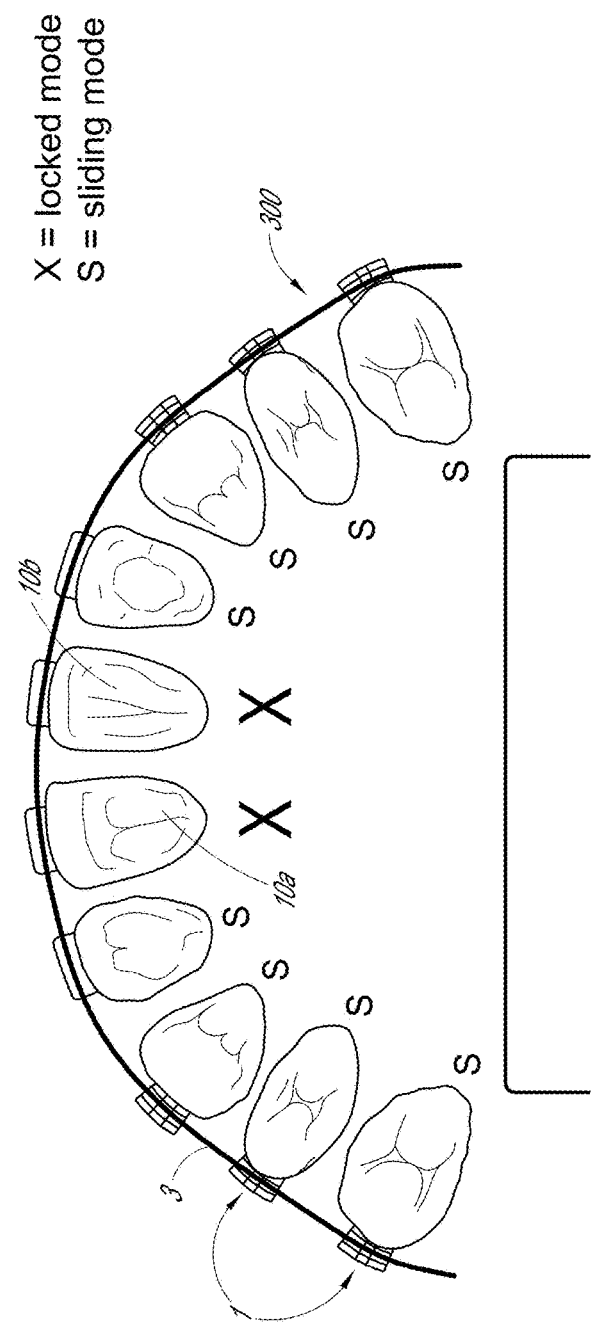

FIG. 25A illustrates an orthodontic system 300 configured to treat a clinical scenario in which the dental arch (mandibular or maxillary arch) is too wide. The devices 1 attached to the incisors 10*a*, 10*b* can be placed in a locked mode, while the other teeth can be placed in a sliding mode. The wire 3 can be biased so as to narrow the dental arch inwardly in a lingual direction. FIG. 25B shows the arch after the narrowing lingualization system was applied in FIG. 25A. Thus, the combinations of operational modes for the devices 1 and the structure of the wire 3 shown in FIGS. 25A-25B can represent example templates in a LUT or database that can be used to address the illustrated scenario, based on desired force profiles for the specific patient at issue.

Figure 26:
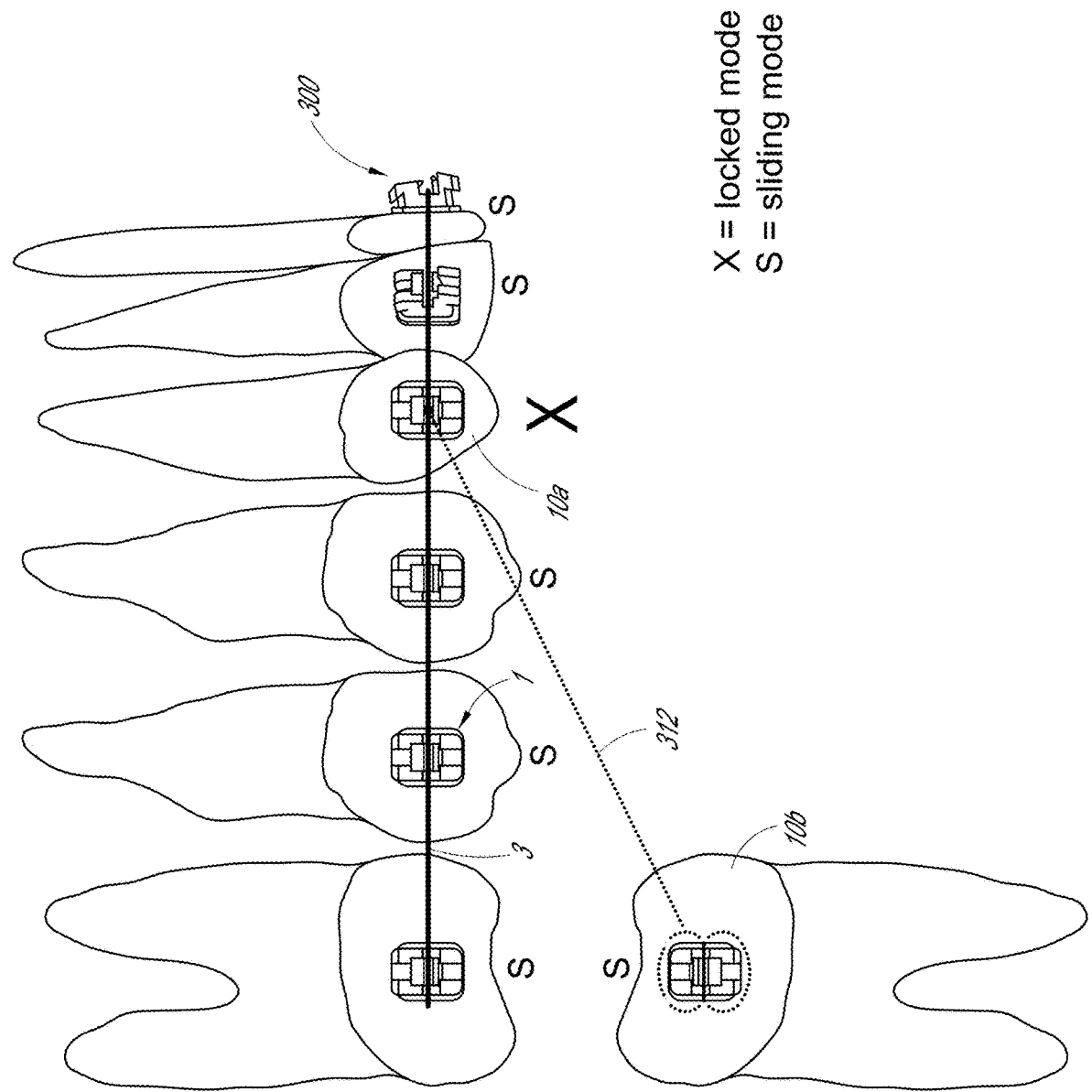

FIG. 26 illustrates an orthodontic system 300 configured to treat a clinical scenario in which an inter-arch correction is applied to a cuspid 10*a* on the maxillary arch. As shown, the device 1 affixed to the cuspid 10*a* can be placed in the locked mode, and the other teeth can be placed in the sliding mode. An elastic band 312 can extend between and connect the device 1 on the cuspid 10*a* to the orthodontic device 1 attached to a molar 10*b* on the mandibular arch. The band 312 can pull the cuspid 10 and the arch distally in some embodiments. Thus, the combinations of operational modes for the devices 1 and the structure of the wire 3 shown in FIG. 26 can represent example templates in a LUT or database that can be used to address the illustrated scenario, based on desired force profiles for the specific patient at issue.

Figure 27:
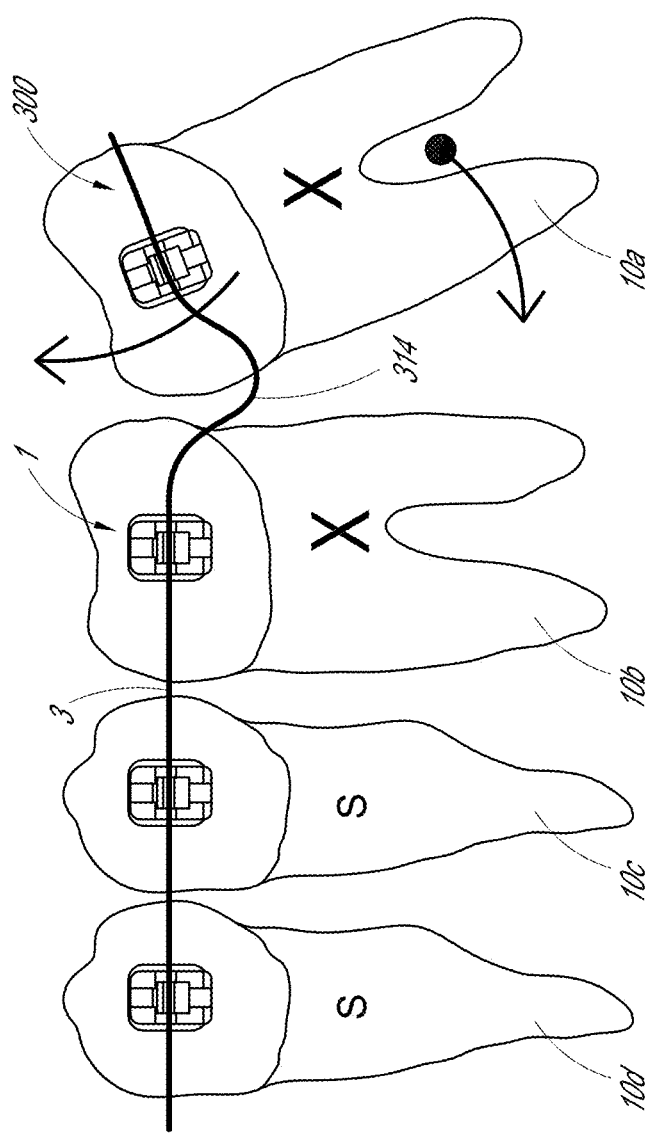

FIG. 27 illustrates an orthodontic system 300 configured to treat a clinical scenario comprising an impacted second molar 10*a*. The devices 1 attached to the first and second molars 10*b*, 10*a* can be placed in a locked mode. The other teeth can be placed in a sliding mode. The wire 3 can have a normally-straight configuration. A curve 314 in the wire 3 can be provided between the first and second molars 10*b*, 10*a*, which can push the second molar 10*a* into an upright position. Thus, the combinations of operational modes for the devices 1 and the structure of the wire 3 shown in FIG. 27 can represent example templates in a LUT or database that can be used to address the illustrated scenario, based on desired force profiles for the specific patient at issue.

Figure 28A:
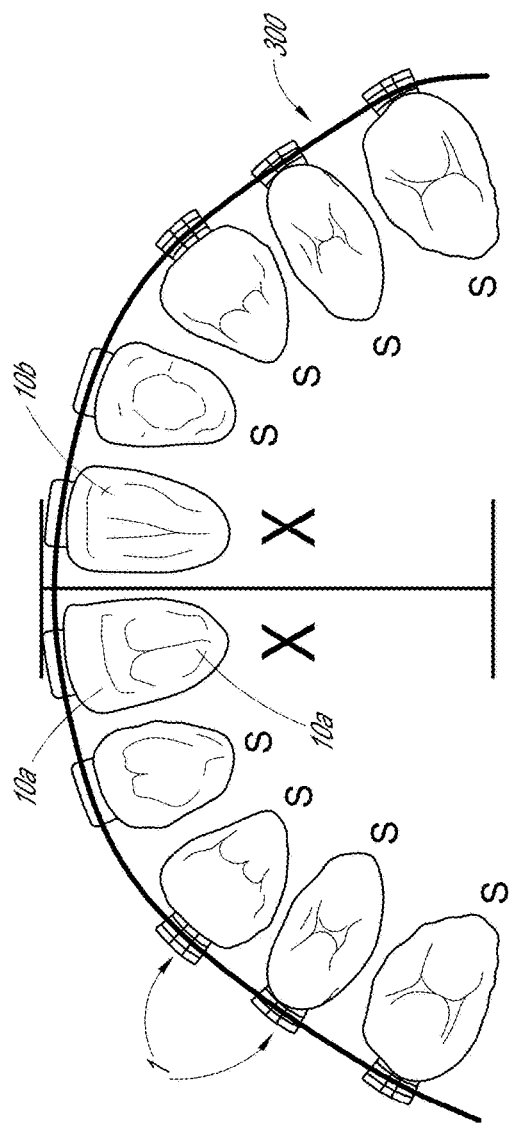
Figure 28B:
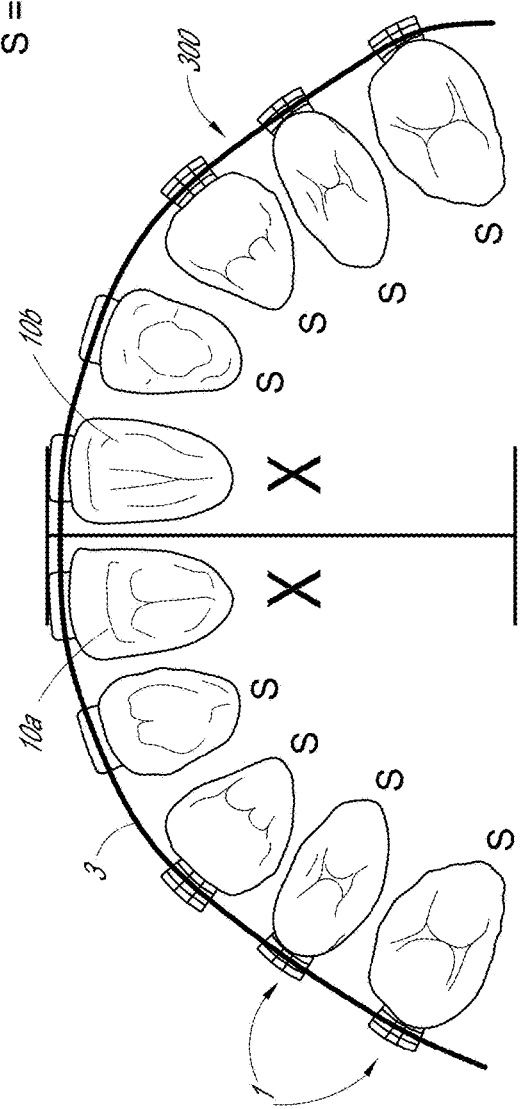

FIG. 28A illustrates an orthodontic system 300 configured to tip the anterior teeth outward to maintain appropriate incisor angles. FIG. 28B illustrates the system 300 after the treatment applied in FIG. 28A. In the illustrated embodiment, the devices 1 attached to the incisors 10*a*, 10*b* can be placed in a locked mode. The other devices 1 can be placed in a sliding mode. The wire 3 can be biased to orient the anterior teeth outwardly. Thus, the combinations of operational modes for the devices 1 and the structure of the wire 3 shown in FIGS. 28A-28B can represent example templates in a LUT or database that can be used to address the illustrated scenario, based on desired force profiles for the specific patient at issue.

FIG. 29A illustrates an orthodontic system 300 configured to provide multidimensional control of a tooth 10b that is misaligned in multiple dimensions. As shown, the tooth 10b is misaligned gingivally (downwardly), horizontally, and rotationally in three directions. To align the tooth 10b, the devices 1 attached to the teeth 10a-10c can be placed in a locked mode, while the device 1 attached to the tooth 10d can be placed in a sliding mode. The wire 3 can be formed in a loop 302 between teeth 10c and 10b. A bend 306 can be formed in the wire 3 between the teeth 10b and 10a. The wire 3 can engage with the devices 1 to correct the multidimensional misalignments, as shown in the aligned teeth of FIG. 29B. Thus, the combinations of operational modes for the devices 1 and the structure of the wire 3 shown in FIGS. 29A-29B can represent example templates in a LUT or database that can be used to address the illustrated scenario, based on desired force profiles for the specific patient at issue.

Figure 30:
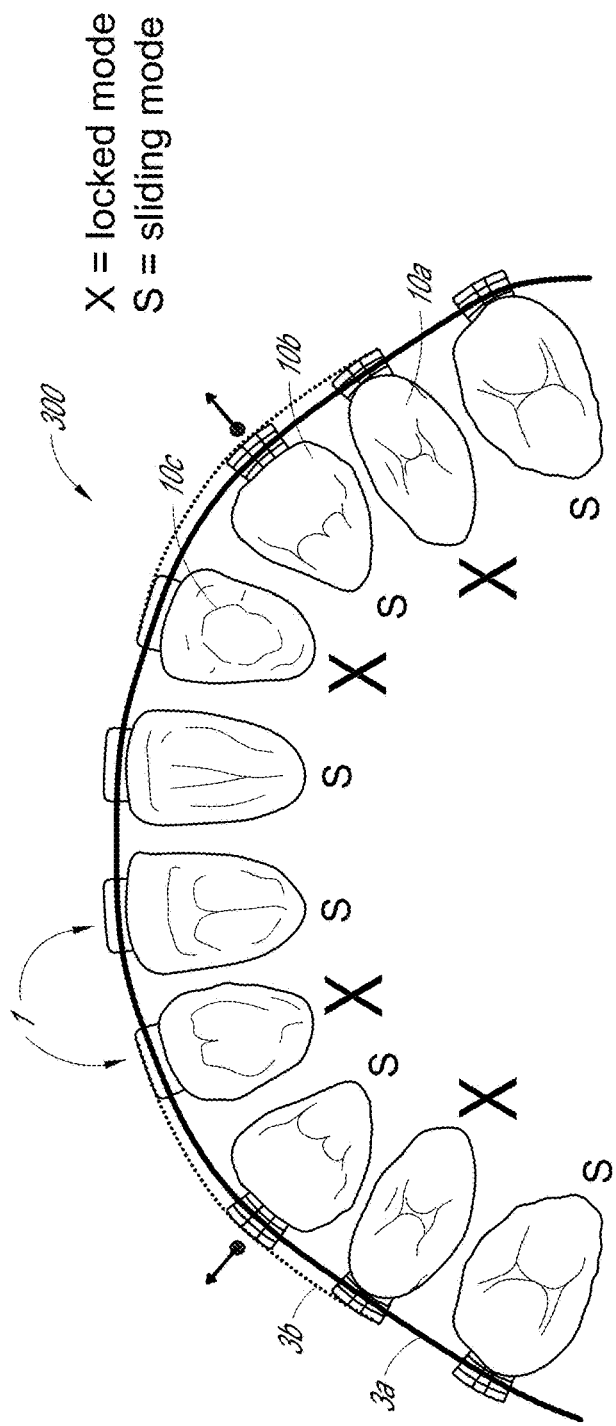

FIG. 30 illustrates a clinical scenario that utilizes multiple wires 3a, 3b along some portions of the system 300. A first wire 3a can span the entire dental arch and can be inserted into each of the orthodontic devices 1 of the system 300. As shown in FIG. 30, second wire segments 3b can be provided to span a plurality of adjacent teeth 10a-10c to apply a different force profile for moving the selected teeth 10a-10c. Thus, in FIG. 30, the second wire segment 3b can be inserted into the devices 1 that are affixed to those teeth 10a-10c. For those devices 1 affixed to the teeth 10a-10c, therefore, multiple (e.g., two) wires can be provided in the bracket. The use of multiple wires can accordingly provide different forces, which can represent another force template in accordance with various embodiments.

Figure 31:
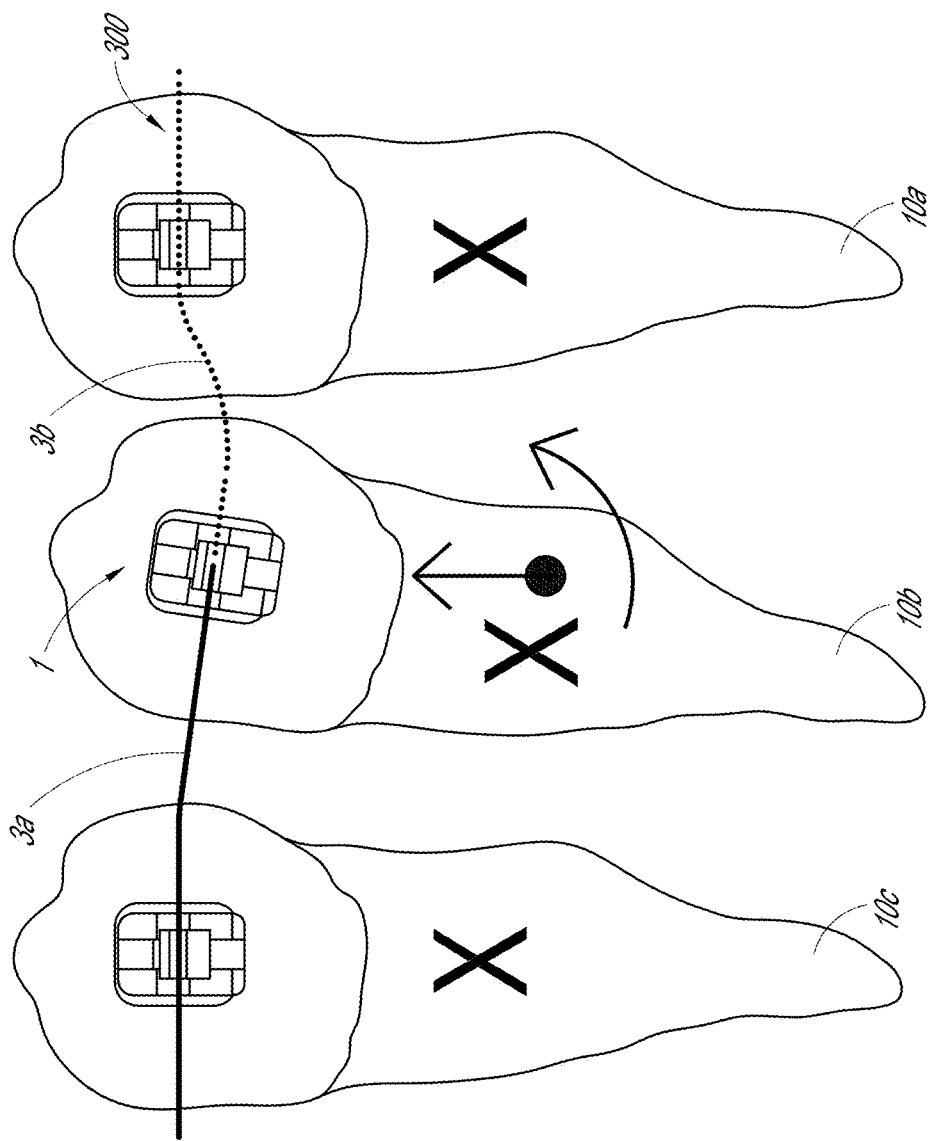

FIG. 31 illustrates a clinical scenario in which the system 300 includes two wires 3a, 3b that can meet end-to-end at the device 1 attached to the tooth 10b. In such an arrangement, the respective ends of both wires 3a, 3b can be placed in a locked mode by the device 1 such that different wires 3a, 3b cover different portions along the dental arch. In some embodiments, the wires 3a, 3b can have different profiles so as to create different forces along the different segments. In other embodiments, a single wire 3 can be provided but can have a varying geometry along the wire 3, which can be locked at various locations to control orthodontic forces.

IV. Conclusion

Although the tooth 10 schematically depicted in some of the figures is a molar, the procedures and devices disclosed herein may be performed on or applied to any type of tooth such as an incisor, a canine, a bicuspid, a pre-molar, or a molar. Further, although the tooth may be depicted as a lower (mandibular) tooth in the figures, this is for purposes of illustration, and is not limiting. The devices and methods may be applied to lower (mandibular) teeth or upper (maxillary) teeth. Also, the disclosed devices and methods can be applied to lingual and/or facial (e.g., labial or buccal) surfaces of the tooth 10. Moreover, the disclosed apparatus, methods, and compositions may be applied to human teeth (including juvenile teeth) and/or to animal teeth.

Reference throughout this specification to "some embodiments" or "an embodiment" means that a particular feature, structure, element, act, or characteristic described in connection with the embodiment is included in at least one embodiment. Thus, appearances of the phrases "in some embodiments" or "in an embodiment" in various places throughout this specification are not necessarily all referring to the same embodiment and may refer to one or more of the same or different embodiments. Furthermore, the particular features, structures, elements, acts, or characteristics may be combined in any suitable manner (including differently than shown or described) in other embodiments. Further, in various embodiments, features, structures, elements, acts, or characteristics can be combined, merged, rearranged, reordered, or left out altogether. Thus, no single feature, structure, element, act, or characteristic or group of features, structures, elements, acts, or characteristics is necessary or required for each embodiment. All possible combinations and subcombinations are intended to fall within the scope of this disclosure.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

The foregoing description sets forth various example embodiments and other illustrative, but non-limiting, embodiments of the inventions disclosed herein. The description provides details regarding combinations, modes, and uses of the disclosed inventions. Other variations, combinations, modifications, equivalents, modes, uses, implementations, and/or applications of the disclosed features and aspects of the embodiments are also within the scope of this disclosure, including those that become apparent to those of skill in the art upon reading this specification. Additionally, certain objects and advantages of the inventions are described herein. It is to be understood that not necessarily all such objects or advantages may be achieved in any particular embodiment. Thus, for example, those skilled in the art will recognize that the inventions may be embodied or carried out in a manner that achieves or optimizes one advantage or group of advantages as taught herein without necessarily achieving other objects or advantages as may be taught or suggested herein. Also, in any method or process disclosed herein, the acts or operations making up the method or process may be performed in any suitable sequence and are not necessarily limited to any particular disclosed sequence.

What is claimed is:

1. An orthodontic device comprising:
    a bracket having a retention cavity sized and shaped to receive and support an orthodontic wire, the retention cavity extending along a lateral axis of the orthodontic device;
    a clip to be coupled to the bracket and to be positioned over the orthodontic wire in use, the clip configured to move along a transverse axis of the orthodontic device to retain the orthodontic wire in the retention cavity, the transverse axis non-parallel relative to the lateral axis; and
    a wedge member to be coupled to the bracket, the wedge member configured to move along the transverse axis, the orthodontic wire to be disposed between the wedge member and the clip with the wedge member disposed between the orthodontic wire and the bracket, the wedge member including a tapered wedge surface that engages the orthodontic wire,
    wherein at least the wedge member serves as a frictional adjustment mechanism configured to exert an adjustable frictional force against the orthodontic wire, including a range of sliding frictional forces in which the orthodontic wire is slidable relative to the bracket and at least one non-sliding frictional force that prevents sliding of the orthodontic wire in use when the orthodontic wire is subject to typical orthodontic forces,
    wherein movement of the wedge member along the transverse axis is not configured to cause movement of the clip along the transverse axis, and
    wherein movement of the clip along the transverse axis is not configured to cause movement of the wedge member along the transverse axis.

2. The orthodontic device of claim 1, wherein the frictional adjustment mechanism is adjustable to apply a continuously variable frictional force against the orthodontic wire.

3. The orthodontic device of claim 1, wherein the wedge member is configured to exert a non-sliding force against the orthodontic wire to prevent sliding that is at least 50 cN.

4. The orthodontic device of claim 3, wherein the wedge member is configured to exert a non-sliding force against the orthodontic wire to prevent sliding that is in a range of 100 cN to 2000 cN.

5. The orthodontic device of claim 1, further comprising the orthodontic wire.

6. The orthodontic device of claim 1, wherein the wedge member includes one or a plurality of tooling apertures sized to receive a tool to adjust the frictional force against the orthodontic wire.

7. An orthodontic device comprising:
    a bracket having a retention cavity sized and shaped to receive and support an orthodontic wire, the retention cavity extending along a lateral axis of the orthodontic device; and
    a frictional adjustment mechanism comprising a clip and a wedge member that cooperate to exert an adjustable frictional force against the orthodontic wire, the clip and the wedge member to be coupled to the bracket and movable along a transverse axis that is non-parallel relative to the lateral axis,
    wherein the frictional adjustment mechanism is configured to exert a range of sliding frictional forces in which the orthodontic wire is slidable relative to the bracket and at least one non-sliding frictional force that prevents sliding of the orthodontic wire in use when the orthodontic wire is subject to typical orthodontic forces,
    wherein movement of the wedge member along the transverse axis is not configured to cause movement of the clip along the transverse axis, and
    wherein movement of the clip along the transverse axis is not configured to cause movement of the wedge member along the transverse axis.

8. The orthodontic device of claim 7, wherein the frictional adjustment mechanism is configured to exert a non-sliding force against the orthodontic wire to prevent sliding that is at least 50 cN.

9. The orthodontic device of claim 8, wherein the frictional adjustment mechanism is configured to exert a non-sliding force against the orthodontic wire to prevent sliding that is in a range of 100 cN to 2000 cN.

10. The orthodontic device of claim 7, wherein the frictional adjustment mechanism is adjustable to apply a continuously variable frictional force against the orthodontic wire.

11. The orthodontic device of claim 7, wherein, in use, the orthodontic wire is disposed between the wedge member and the clip with the wedge member disposed between the orthodontic wire and the bracket.

12. The orthodontic device of claim 7, wherein, in use, the orthodontic wire is disposed between the bracket and the wedge member, the wedge member disposed between the wire and the clip.

13. The orthodontic device of claim 7, wherein the wedge member includes a tapered wedge surface that engages the orthodontic wire, the wedge member having a thickness varying along at least a portion of the length of the wedge member.

14. The orthodontic device of claim 7, further comprising the orthodontic wire.

15. The orthodontic device of claim 7, wherein the wedge member includes one or a plurality of tooling apertures sized to receive a tool to adjust the frictional force against the orthodontic wire.

16. An orthodontic device comprising:
    a bracket having a retention cavity sized and shaped to receive and support an orthodontic wire, the retention cavity extending along a lateral axis of the orthodontic device;
    a clip to be coupled to the bracket, the clip configured to move along a transverse axis of the orthodontic device, the transverse axis non-parallel relative to the lateral axis; and
    a wedge member to be coupled to the bracket, the wedge member configured to move along the transverse axis,
    wherein the clip, the wedge member, and the bracket are configured to cooperate to exert an adjustable frictional force against the orthodontic wire, and
    wherein the wedge member has a tapered wedge surface angled relative to a vertical axis that is non-parallel relative to the lateral axis and the transverse axis, the wedge member having a thickness in the direction of the vertical axis and a length in the direction of the transverse axis, the thickness varying along at least a portion of the length of the wedge member.

17. The orthodontic device of claim 16, wherein the clip and the wedge member serve as a frictional adjustment mechanism adjustable to exert a range of sliding and non-sliding frictional forces against the orthodontic wire in use.

18. The orthodontic device of claim 17, wherein the frictional adjustment mechanism is adjustable to exert a non-sliding frictional force against the orthodontic wire that prevents sliding of the orthodontic wire when the orthodontic wire is subject to typical orthodontic forces.

19. The orthodontic device of claim 17, wherein the wedge member is configured to exert a non-sliding force against the orthodontic wire to prevent sliding that is at least 50 cN.

20. The orthodontic device of claim 19, wherein the wedge member is configured to exert a non-sliding force against the orthodontic wire to prevent sliding that is in a range of 100 cN to 2000 cN.

21. The orthodontic device of claim 16, wherein the clip, the wedge member, and the bracket are configured to cooperate to move between a plurality of operational modes, the plurality of operational modes comprises a first sliding mode in which the orthodontic wire is slidable relative to the bracket and a second locked mode in which the orthodontic wire is slidably locked relative to the bracket.

22. The orthodontic device of claim 21, wherein the clip and the wedge member serve as a frictional adjustment mechanism adjustable to apply a continuously variable frictional force against the wire.

23. The orthodontic device of claim 21, wherein, in the first sliding mode, the clip is configured to be positioned over the orthodontic wire to retain the orthodontic wire in the retention cavity of the bracket.

24. The orthodontic device of claim 21, wherein the wedge member in the first sliding mode is disposed at a first position along the transverse axis, and wherein the wedge member in the second locked mode is disposed at a second position along the transverse axis that is different from the first position.

25. The orthodontic device of claim 24, wherein in the second locked mode, the tapered wedge surface of the wedge member contacts and exerts a locking force against the orthodontic wire.

26. The orthodontic device of claim 25, wherein in the second locked mode, the orthodontic wire is vertically disposed between the clip and the wedge member, the wedge member and the clip cooperating to clamp the orthodontic wire.

27. The orthodontic device of claim 25, wherein in the second locked mode, the orthodontic wire is vertically disposed between the bracket and the wedge member, the wedge member disposed between the wire and the clip.

28. The orthodontic device of claim 16, wherein movement of the wedge member along the transverse axis is not configured to cause movement of the clip along the transverse axis, and wherein movement of the clip along the transverse axis is not configured to cause movement of the wedge member along the transverse axis.

29. The orthodontic device of claim 16, further comprising the orthodontic wire.

30. The orthodontic device of claim 16, wherein the wedge member includes one or a plurality of tooling apertures sized to receive a tool to adjust the frictional force against the orthodontic wire.

* * * * *